(12) United States Patent
Gatto

(10) Patent No.: US 7,603,308 B2
(45) Date of Patent: *Oct. 13, 2009

(54) SECURITY ANALYST ESTIMATES PERFORMANCE VIEWING SYSTEM AND METHOD

(75) Inventor: Joseph G. Gatto, San Francisco, CA (US)

(73) Assignee: StarMine Corporation, San Francisco, CA (US)

( * ) Notice: Subject to any disclaimer, the term of this patent is extended or adjusted under 35 U.S.C. 154(b) by 731 days.

This patent is subject to a terminal disclaimer.

(21) Appl. No.: 09/775,599

(22) Filed: Feb. 5, 2001

(65) Prior Publication Data

US 2002/0002520 A1 Jan. 3, 2002

Related U.S. Application Data

(63) Continuation of application No. 09/722,050, filed on Nov. 27, 2000, now Pat. No. 7,509,277, which is a continuation-in-part of application No. 09/524,253, filed on Mar. 13, 2000, now Pat. No. 7,167,838, which is a continuation-in-part of application No. 09/296,620, filed on Apr. 23, 1999, now Pat. No. 6,510,419.

(60) Provisional application No. 60/082,868, filed on Apr. 24, 1998.

(51) Int. Cl.
*G06Q 40/00* (2006.01)

(52) U.S. Cl. ...................... 705/36 R; 705/35

(58) Field of Classification Search ............. 705/35–37, 705/36 R

See application file for complete search history.

(56) References Cited

U.S. PATENT DOCUMENTS 3,270,190 A   8/1966   Lambert ................. 235/194

| | | | |
|---|---|---|---|
| 4,884,217 A | 11/1989 | Skeirik et al. | ............... 364/513 |
| 4,920,499 A | 4/1990 | Skeirik | ....................... 364/513 |
| 4,965,742 A | 10/1990 | Skeirik | ....................... 364/513 |

(Continued)

FOREIGN PATENT DOCUMENTS

| JP | 2000090150 A | 3/2000 |
|---|---|---|
| JP | 2004-046454 A | 2/2004 |
| WO | WO 94/06103 | 3/1994 |
| WO | WO 01/80124 A2 | 10/2001 |

OTHER PUBLICATIONS

Lobo et al. "Analysts Utilization of Historical Earnings Information", Managerial and Decision Economics, vol. 12, (1991) pp. 383-393.*

(Continued)

*Primary Examiner*—Narayanswamy Subramanian
(74) *Attorney, Agent, or Firm*—Pillsbury Winthrop Shaw Pittman LLP

(57) ABSTRACT

A method and system are provided for simultaneously displaying historical accuracy indicators for an analyst and the analyst's estimate for a future event, on an analyst by analyst basis, for a selected one or more analysts, wherein the historical accuracy indicators and analyst's estimate for a future event may involve one or more securities. Other information for simultaneous display may include one or more of historical performance indicators, analyst recommendation data, model information, and other current data, performance data and historical data, on an analyst by analyst basis, for a selected one or more analysts. Various display options may be available, such as displaying those analysts that have current estimates for a user selected security. Other viewing options may involve displaying data for a group of analysts for a current estimate for a user selected security. Other viewing options may be available and other information may be displayed.

45 Claims, 46 Drawing Sheets

U.S. PATENT DOCUMENTS

| | | | | |
|---|---|---|---|---|
| 5,006,992 | A | 4/1991 | Skeirik | 364/513 |
| 5,006,998 | A | 4/1991 | Yasunobu et al. | |
| 5,132,899 | A | 7/1992 | Fox | |
| 5,220,500 | A * | 6/1993 | Baird et al. | 705/36 R |
| 5,365,425 | A | 11/1994 | Torma et al. | 364/401 |
| 5,500,795 | A | 3/1996 | Powers et al. | 364/401 |
| 5,502,637 | A | 3/1996 | Beaulieu et al. | |
| 5,557,513 | A | 9/1996 | Frey et al. | 364/401 R |
| 5,608,620 | A | 3/1997 | Lundgren | |
| 5,613,072 | A | 3/1997 | Hammond et al. | 395/204 |
| 5,675,746 | A | 10/1997 | Marshall | 395/235 |
| 5,701,400 | A | 12/1997 | Amado | 395/76 |
| 5,749,077 | A | 5/1998 | Campbell | |
| 5,761,442 | A * | 6/1998 | Barr et al. | 705/36 R |
| 5,774,880 | A | 6/1998 | Ginsberg | 705/36 |
| 5,774,881 | A | 6/1998 | Friend et al. | 705/36 |
| 5,802,518 | A | 9/1998 | Karaev et al. | 707/9 |
| 5,812,988 | A | 9/1998 | Sandretto | 705/36 |
| 5,819,271 | A | 10/1998 | Mahoney et al. | 707/9 |
| 5,845,285 | A | 12/1998 | Klein | 707/101 |
| 5,852,811 | A | 12/1998 | Atkins | 705/36 |
| 5,864,871 | A | 1/1999 | Kitain et al. | 707/104 |
| 5,893,079 | A | 4/1999 | Cwenar | |
| 5,909,669 | A | 6/1999 | Havens | 705/11 |
| 5,911,136 | A | 6/1999 | Atkins | 705/36 |
| 5,918,217 | A | 6/1999 | Maggioncalda et al. | |
| 5,930,774 | A | 7/1999 | Chennault | 705/36 |
| 5,946,666 | A * | 8/1999 | Nevo et al. | 705/36 R |
| 5,948,054 | A | 9/1999 | Nielsen | |
| 5,950,176 | A | 9/1999 | Keiser et al. | |
| 5,956,691 | A | 9/1999 | Powers | 705/4 |
| 5,961,598 | A * | 10/1999 | Sime | 709/224 |
| 5,963,922 | A | 10/1999 | Helmering | 705/35 |
| 6,012,042 | A | 1/2000 | Black et al. | |
| 6,012,043 | A | 1/2000 | Albright et al. | |
| 6,021,397 | A | 2/2000 | Jones et al. | |
| 6,064,984 | A | 5/2000 | Ferguson et al. | 705/36 |
| 6,064,986 | A | 5/2000 | Edelman | |
| 6,073,115 | A * | 6/2000 | Marshall | 705/35 |
| 6,078,904 | A | 6/2000 | Rebane | 705/36 |
| 6,078,924 | A | 6/2000 | Ainsbury et al. | 707/101 |
| 6,119,103 | A | 9/2000 | Basch et al. | 705/35 |
| 6,125,355 | A | 9/2000 | Bekaert et al. | |
| 6,154,732 | A | 11/2000 | Tarbox | |
| 6,208,720 | B1 | 3/2001 | Curtis et al. | 379/114 |
| 6,236,980 | B1 | 5/2001 | Reese | |
| 6,253,192 | B1 | 6/2001 | Corlett et al. | 705/36 |
| 6,317,726 | B1 | 11/2001 | O'Shaughnessy | 705/36 |
| 6,370,516 | B1 | 4/2002 | Reese | 705/36 |
| 6,381,635 | B1 * | 4/2002 | Hoyer et al. | 709/207 |
| 6,510,419 | B1 | 1/2003 | Gatto | 705/36 |
| 6,606,615 | B1 | 8/2003 | Jennings et al. | 706/45 |
| 6,748,389 | B1 | 6/2004 | Cesare et al. | 707/100 |
| 6,792,399 | B1 * | 9/2004 | Phillips et al. | 705/36 R |
| 7,016,872 | B1 * | 3/2006 | Bettis et al. | 705/36 R |
| 7,249,080 | B1 | 7/2007 | Hoffman et al. | 705/36 |
| 7,251,624 | B1 | 7/2007 | Lee et al. | 705/35 |
| 7,539,637 | B2 | 5/2009 | Gatto | 405/36 R |
| 2002/0002524 | A1 | 1/2002 | Kossovsky et al. | 705/36 |
| 2002/0019791 | A1 | 2/2002 | Goss et al. | 705/36 |
| 2002/0022988 | A1 * | 2/2002 | Columbus et al. | 705/11 |
| 2002/0082966 | A1 | 6/2002 | O'Brien et al. | 705/36 |
| 2002/0169701 | A1 | 11/2002 | Tarbox et al. | 705/36 |
| 2003/0004766 | A1 | 1/2003 | Sandoval et al. | 705/7 |
| 2003/0023686 | A1 | 1/2003 | Beams et al. | 709/205 |
| 2003/0065600 | A1 | 4/2003 | Terashima et al. | 705/36 |
| 2003/0084059 | A1 | 5/2003 | Kelley et al. | 707/102 |
| 2004/0024656 | A1 | 2/2004 | Coleman | 705/27 |
| 2006/0178918 | A1 | 8/2006 | Mikurak | 705/7 |
| 2007/0162973 | A1 | 7/2007 | Schneier et al. | 726/22 |

OTHER PUBLICATIONS https://www.invesars.com/home.asp (printed Mar. 26, 2001).
I/B/E/S Internation Inc., Active Express.
The Journal of Finance, vol. XXXIII, Mar. 1978, No. 1.
The Predictive Value of Interim Reports for Improving Forecasts of Future Quarterly Earnings, Apr. 1978.
Financial Analysts Journal/Jan.-Feb. 1996 "Analyst Forecasting Errors and their Implications for Security Analysis: An Alternative Perspective".
The Journal of Portfolio Management "Analysts can Forecast Accuragely" Brown et al.
Journal of Forecasting, vol. 2 325-330 1983) "Perspective on Forecasting Research in Accounting and Finance".
Journal of Accounting Research, vol. 24 Supplement 1986 "Evidence on the Incremental Information Content of Additional Firm Dsisclosures made Concurrently with Earnings" Hoskin et al.
Financial Analysts Journal, Mar./Apr. 1997 "Earnings Suerprise Research: Synthesis and Perspectives" Brown.
The Journal of Finance, vol. LIV, No. 5 Oct. 1999, "What os the Intrinsic value of the Dow", Lee et al.
The Journal of Finance, vol. XLIX, No. 3 Jul. 1993 Market Integration and Prive Execution for NYSE-Listed Securities.
The Journal of Finance, vol. XLVIII, No. 2 Jun. 1993 "Summing Up".
The Journal of Finance, vol. XLVIII, No. 2 Jun. 1993 "Yes, Discounts on Closed-End Funds are a Sentiment Index".
The Review of Financial Studies 1993, vol. 6, No. 2 pp. 345-374 "Spreads, Depths, and the Impact of Earnings Information: An Intraday Analysis".
International Journal of Forecasting, vol. 11, No. 3 (1995) pp. 361-500.
Financial Analysts Journal, Jan./Feb. 1996.
Accounting Organizations and Society, vol. 21, No. 7/8/Oct./Nov. 1996.
Financial Analysts Journal Mar./Apr. 1997.
Journal of Accounting & Economics vol. 9 1987 (MSG.V. 9 No. 3).
Journal of Accounting & Economics vol. 9, No. 2 Jul. 1987.
The Accounting Review vol. 67, No. 4 Oct. 1992.
Financial Analysts Journal Nov./Dec. 1997.
The Journal of Canadian Academic Accounting Association, vol. 14, No. 1, Spring 1997.
The Journal of Canadian Academic Accounting Association, vol. 16, No. 1, Spring 1999.
Journal of Accounting Research vol. 23, No. 1 Spring 1985.
International Journal of Forecasting, vol. 9, No. 3 (1993) pp. 295-436.
"A Journal of Accounting, Finance and Business Studies" vol. 30, No. 1 Mar. 1994.
Journal of Accounting Auditing & Finance vol. 9, No. 4 (new series) Fall 1994.
The Journal of the Canadian Academic Accounting Association vol. 11, No. 1-1 Summer 1994.
The CPA Journal May 1995.
International Journal of Forecasting, vol. 12, No. 1 (1996) pp. 1-192.
Journal of Accounting Research vol. 25, No. 1 Spring 1987.
International Journal of Forecasting vol. 7, No. 3 (1991) pp. 257-408.
Journal of Accounting Research Col. 29, No. 2 1991.
The Accounting Review Quarterly Journal of the American Accounting Association vol. LX Apr. 1985 No. 2.
The Journal of Portfolio Management vol. 23, No. 4 Summer 1997.
Journal of Accounting Research vol. 38, No. 1 Spring 2000.
The Accounting Review, vol. 68, No. 3, Jul. 1993.
Journal of Accounting Research vol. 17, No. 2 Autumn 1979.
Journal of Business Finance & Accounting, vol. 19, No. 4 Jun. 1992.
The Journal of the Canadian Academic Accounting Association, vol. 14, No. 2 Summer 1997.
The Journal of Finance, vol. 46, No. 1 Mar. 1991.
Accounting Horizons, vol. 11, No. 4 Dec. 1997.
Accounting Horizons, vol. 13, No. 4 Dec. 1999.
Journal of Accounting and Economics vol. 25, No. 3 Jun. 1998.
Contemporary Accounting Research vol. 8, No. 1 Fall 1991.

CA Magazine Apr. 1996.
The Journal of Finance vol. 46, No. 2 Jun. 1991.
The Journal of Finance, vol. 55, No. 5 Oct. 2000.
Financial Analysts Journal, vol. 55, No. 5 Sep./Oct. 1999.
Journal of Accounting & Economics, vol. 15, No. 2/3 Jun./Sep. 1992.
Accounting Horizons, vol. 10, No. 3 Sep. 1996.
Accounting Horizons vol. 10, No. 4, Dec. 1996.
"Profiling From Predicting Earnings Surprise", Brown et al. 1998.
"Enhancing Earnings Predictability Using Individual Analyst Forecasts", Herzberg et al. Summer 1999.
"Do Stock Prices Fully reflect the Implications of Current Earnings for Future Earnings for ARI Firms" Brown et al. 2000.
"The Information Content of Analyst Stock Recomendations" Kirsche et al. Aug. 8, 2000.
http://www.findarticles.com/m4PRN/1999_Oct_14/56284107/p1/article.jhtml (printed Feb. 5, 2001).
http://my.zacks.com/?ALERT+www.zacks.com (printed Feb. 2, 2001).
http://www.cianet.com (printed Feb. 5, 2001).
http://www.factset.com (printed Feb. 5, 2001).
http://www.iexchange.com (printed Feb. 5, 2001).
http://www.validea.com/home/home.asp (printed Feb. 5, 2001).
http://www.bulldogresearch.com/default.asp (printed Feb. 5, 2001).
"Predicting Individual Analyst Earnings Forecast Accuracy", Brown et al. Sep. 29, 1999.
The Journal of Finance vol. XLIX, No. 1 Mar. 1994.
Brown et al., "Composite Analyst Earnings Forecasts: The Next Generation", *Journal of Business Forecasting,* Summer 1990, vol. 9, Issue 2.
Ho et al., "Market Reactions to Messages from Brokerage Ratings Systems", *Financial Analysts Journal,* Feb. 1998, vol. 54, Issue 1.
Lamonica, "The Best and Worst: Bloomberg's Second Annual Analysts Survey, and the Top Analysts Top Picks", *Financial World,* Jan. 30, 1996, vol. 165, Issue 2.
http://interactive.wsj.com/public/current/summaries/best00.htm (Jan. 5, 2001).
http://interactive.wsj.com/public/current/articles/SB963945297966625438.htm (Jan. 5, 2001).
http://interactive.wsj.com/public/current/articles/SB963945742428637569.htm (Jan. 5, 2001).
http://interactive.wsj.com/public/current/articles/SB963945478117361937.htm (Jan. 5, 2001).
http://interactive.wsj.com/public/current/articles/SB963944657420928118.htm (Jan. 5, 2001).
http://interactive.wsj.com/public/current/articles/SB963945615772798263.htm (Jan. 5, 2001).
Herzberg et al., "Enhancing Earnings Predictability Using Individual Analyst Forecasts", *The Journal of Investing,* Summer 1999.
Charles Schwab: Schwab Introduces Analytics Funds; Utilizes Quantitative Techniques to Seek Above-Market Returns.
Mozes et al., "Modeling Earnings Expectations Based on Clusters of Analyst Forecasts", *The Journal of Investing,* Spring 1999.
The Hulbert Financial Digest, Jan. 20, 2000, vol. XX, No. 5, 11 pages.
De Aenlle, Conrad, "Short-Sellers' Puzzle: Not Whether, but Which?", *International Herald Tribune,* Feb. 12, 1994, 2 pages.
White, Ron, "How Computers Work, Fourth Edition", Que Corporation, Sep. 1998, pp. 159 and 42-49 (12 pages).
Downes, John, "Dictionary of Finance and Investment Terms, Sixth Edition", Barron's Educational Series, Inc., 2003, pp. 594, 674, and 678 (5 pages).
"Dictionary of Business", Peter Collin Publishing, Credo Reference, Capitalization, 2001, 1 page.
"The Motley Fool", The Record, Bergen County, NJ, May 30, 1999, pp. b.03, (2 pages).
"Dow Jones Global Titans Indexes", Dow Jones & Company, Dec. 17, 2000, 1 page.
Unknown, Quote.com, Inc., May 7, 1998, http://web.archive.org/web/20000701-19960101re_/http://www.quote.com, 2 pages.
Unknown, Webster's New World Computer Dictionary, definition of "logarithmic graph", http://www.credoreference.com/entry.do?pp=1&id=3484634&secid=., © 2003, Wiley Publishing, Inc., 1 page.
Unknown, Academic Press Dictionary of Science and Technology, definition of "logarithmic scale", http://www.credoreference.com/entry.do?pp=1&id=3124817&secid=., © 1992, Academic Press., 1 page.
Ross, Stephen A., et al., "Fundamentals of Corporate Finance", Third Edition, © 1995, Richard D. Irwin, Inc., pp. 332-357.
Ross, Stephen A., et al., "Fundamentals of Corporate Finance", Third Edition, © 1995, Richard D. Irwin, Inc., pp. O-8 through O-14.
Bodie, Zvi, et al., "Investments", Third Edition, © 1996, Richard D. Irwin, Inc., pages are the inside front and back covers, page Nos. 1-4 were added, 6 pages.
Davis, Mark, "Trying to Find the Newsletter That's Right for You can be Daunting", *Buffalo News,* Mar. 2, 1999 (p. A7), 3 pages.
Hagstrom, Jr., Robert G., "The Warren Buffet Way; Investment Strategies of the World's Greatest Investor", © 1995, John Wiley & Sons, Inc., p. 4.

* cited by examiner

Contributor Search

| Analyst Name: | Dube | Search |
|---|---|---|

| Analyst Name | Analyst ID |
|---|---|
| Dube B | 18084 |
| Dube S | 7919 |
| Dubeau C | 18847 |

220

Ok    Cancel

StarModeler - [Contributors]

File  Options  Help

Contributors
- Analyst
- Broker
- Security

Stocks
- Stock Filters
- Stock Sets

Models
- Manage
- Backtest
- Results

History
- Chart
- Snapshot

Analysis
- Price Change
- Cons Change
- Consistency
- Performance

○ CUSIP  ○ Company Name  ○ Unique Ticker  ⊙ iListed Ticker

| CUSIP | Broker ID | Broker | Analyst... | Analyst Name |
|---|---|---|---|---|
| Ticker: AAPL [Apple Computer] | | | | AAPL |
| 03783310 | 7 | Deutsche Banc Alex. Brown - Us | 0 | Unknown |
| 03783310 | 7 | Deutsche Banc Alex. Brown - Us | 658 | Bradley O |
| 03783310 | 7 | Deutsche Banc Alex. Brown - Us | 1032 | Stahlman M |
| 03783310 | 7 | Deutsche Banc Alex. Brown - Us | 1040 | Jt. Rossi |
| 03783310 | 7 | Deutsche Banc Alex. Brown - Us | 1283 | Reid C |
| 03783310 | 7 | Deutsche Banc Alex. Brown - Us | 6867 | Rueppel P |
| 03783310 | 7 | Deutsche Banc Alex. Brown - Us | 7932 | Eskenazi S |
| 03783310 | 11 | Argus Research Corp. | 938 | Abramowitz W |
| 03783310 | 11 | Argus Research Corp. | 18158 | Electrical/Electro |
| 03783310 | 11 | Argus Research Corp. | 32713 | Office Equip. |
| 03783310 | 13 | Unknown | 30132 | Post-Technology A |
| 03783310 | 15 | Atlantis Investment Co. | 103 | Anderson A |
| 03783310 | 16 | Prudential Securities | 3106 | Brown K |
| 03783310 | 16 | Prudential Securities | 5963 | Wolk M |
| 03783310 | 16 | Prudential Securities | 33032 | Martin R |
| 03783310 | 16 | Prudential Securities | 40709 | Alexy K |
| 03783310 | 25 | Bateman | 677 | Young D |
| 03783310 | 25 | Bateman | 166 | Harris L |
| 03783310 | 28 | Bear, Stearns & Co. | 4047 | Kapka J |
| | | | 856 | Mcmanus J |

STARMINE
FOR THE SELL SIDE

Analyst: Sanger, A.

Current Data | Performance | Mine-ders | Lookup Analysts by Stock | Firmwide Performance Home | Options | Help | Log Out Donaldson, Lufkin & Jenrette Securities
BETA
Feedback to StarMine Current Data Summary
Data Through Jun-30-00

Sanger, A.

Your Value:
I/B/E/S Mean:

| | Recommendation | This Quarter | Next Quarter | This Year | Next Year | |
|---|---|---|---|---|---|---|
| BHI | 2.0 Buy / 2.0 Buy | NA / NA | NA / NA | $-0.34 / $-0.45 | $0.65 / $0.53 | Performance |
| BJS | 1.0 RI Buy / 1.8 Buy | 0.08 / 0.07 | 0.15 △ / 0.14 | 0.49 / 0.45 | 1.00 △ / 1.03 | Performance |
| CAM | 3.0 Mkt Performance / 1.8 Buy | 0.30 / 0.31 | 0.43 △ / 0.44 | 1.33 / 1.34 | 2.25 / 2.20 | Performance |
| DO | 2.0 Buy / 2.0 Buy | 0.35 / 0.35 | 0.43 / 0.43 | 1.61 △ / 1.58 | 2.50 / 2.48 | Performance |
| DRQ | 2.0 Buy / 2.2 Buy | 0.09 / 0.07 | 0.17 / 0.16 | 0.67 / 0.62 | 1.80 / 1.57 | Performance |
| ESV | 3.0 Mkt Performance / 2.4 Buy | 0.16 △ / 0.10 | 0.20 △ / 0.19 | 0.75 / 0.72 | 1.45 / 1.30 | Performance |
| FLC | 3.0 Mkt Performance / 1.9 Buy | 0.11 △ / 0.10 | 0.18 △ / 0.18 | 0.57 / 0.57 | 1.50 / 1.63 | Performance |
| GLM | 2.0 Buy / 1.7 Buy | -0.20 / -0.19 | -0.09 / -0.07 | -0.58 / -0.52 | 0.55 / 0.83 | Performance |
| GRP | 2.0 Buy / 1.2 Strong Buy | 0.15 △ / 0.14 | 0.14 △ / 0.16 | 0.60 △ / 0.61 | 1.35 △ / 1.26 | Performance |
| GW | 2.0 Buy / 2.0 Buy | 0.02 △ / 0.01 | 0.09 △ / 0.07 | 0.25 △ / 0.20 | 0.90 △ / 0.91 | Performance |
| HAL | 3.0 Mkt Performance / 2.4 Buy | -0.02 / -0.03 | 0.00 / 0.00 | -0.02 / -0.05 | 0.15 △ / 0.14 | Performance |
| MDR | 2.0 Buy / 2.8 Hold | 0.11 / 0.15 | 0.20 / 0.23 | 0.64 / 0.81 | 1.35 / 1.54 | Performance |
| NBR | 2.0 Buy / 1.4 Strong Buy | NA / 0.07 | NA / 0.04 | 0.31 / 0.29 | 0.80 △ / 0.80 | Performance |
| NE | 3.0 Mkt Performance / 1.6 Buy | 0.15 / 0.15 | 0.24 / 0.23 | 0.82 / 0.79 | 1.75 △ / 1.56 | Performance |
| NTG | 2.0 Buy / 1.5 Strong Buy | 0.16 △ / 0.14 | 0.30 / 0.30 | 1.08 / 1.08 | 1.85 / 1.87 | Performance |
| PDE | 2.0 Buy / 1.6 Buy | 0.16 △ / 0.14 | 0.21 △ / 0.20 | 0.67 / 0.64 | 0.90 / 0.85 | Performance |
| | | -0.05 / -0.03 | -0.04 / 0.01 | -0.10 / -0.03 | 1.00 / 1.15 | Performance |

FIG. 31

| Name | Rating | Count |
|---|---|---|
| Ossad, S. | ★★★★★ | 10 |
| Looby, R. | ★★★★★ | 12 |
| Nichols, M. | ★★★★★ | 12 |
| Sulam, M. | ★★★★★ | 18 |
| Egger, B. | ★★★★★ | 11 |
| Kiggen, J. | ★★★★★ | 37 |
| Bedekar, M. | ★★★★★ | 11 |
| Bhutani | ★★★★★ | 1 |
| Buck, E. | ★★★★★ | 15 |
| Hindelong, J. | ★★★★★ | 26 |
| Galvin, T. | ★★★★ | 2 |
| Mcmurry, D. | ★★★★ | 5 |
| Blount, H. | ★★★★ | 13 |
| Nejmeh, G. | ★★★★ | 23 |
| Scott, T. | ★★★★ | 8 |
| Passoni, S. | ★★★★ | 10 |
| Ross, E. | ★★★ | 3 |
| Miccliche, M. | ★★★ | 3 |
| Imam, H. | ★★★ | 2 |
| Schaeffer, P. | ★★★ | 10 |
| Karaoglan, A. | ★★ | 10 |
| Halper, S. | ★★ | 22 |
| Smith, D. | ★★ | 2 |
| Blackstock, J. | ★★ | 14 |
| Comeau, E. | ★★ | 10 |
| Carpenter, S. | ★★ | 12 |
| Solotar, J. | ★★ | 13 |
| Kulju, K. | ★★ | 15 |
| Leibowitz, D. | ★★ | 2 |
| Longley, A. | ★★ | 18 |
| Cohen, D. | ★★ | 27 |
| Jones, G. | ★ | 1 |
| Balter, J. | ★ | 32 |
| Orenbuch, M. | ★ | 9 |
| Bhutani, J. | ★ | 1 |
| Meyer, J. | ★ | 12 |
| Launer, C. | ★ | 21 |
| Weinstein, E. | ★ | 1 |
| Halper | ★ | 2 |
| Potamianos, P. | | 14 |
| Petersik, B. | ★ | 3 |
| Mccarthy | ★ | 19 |
| Bradshaw, D. | ★ | 20 |

FIG. 38B

STARMINE
FOR THE SELL SIDE

Analyst: [-Select One-▼]  Lookup Analysts by Stock

Current Data  Performance  Mine-ders
3820    3822        3824       3816

Firmwide  Mine-ders
Performance
         3826    3828

Ticker: [AAPL]  [Look Up Analyst]
        4810    4812

Home | Options | Help

[Home | Options | Help | Log Out]

Donaldson, Lufkin & Jenrette Securitie
BETA
Feedback to StarMine

DISCLAIMER

STARMINE
FOR THE SELL SIDE

Options

| Home | Options | Help | To StarMine.com | Log Out |

5010

5012
Default startup page:
● Firmwide Mine-ders
○ Analyst Current View for [--PLEASE CHOOSE--▶]

5014
Data View Options:
☐ Exclude Inactive Analysts

[Submit]
5016

Version 1.00.022

DISCLAIMER

Home | Options | Help | To StarMine.com

FIG. 41

SECURITY ANALYST ESTIMATES PERFORMANCE VIEWING SYSTEM AND METHOD

CROSS-REFERENCE TO RELATED APPLICATION

This application is a continuation of, U.S. application Ser. No. 09/722,050, filed Nov. 27, 2000, now U.S. Pat. No.7,509,277, which is a continuation-in-part of U.S. application Ser. No. 09/524,253, filed Mar. 13, 2000, now U.S. Pat. No. 7,167,838, which is a continuation-in-part of U.S. application Ser. No. 09/296,620, filed Apr. 23, 1999, (which issued as U.S. Pat. No. 6,510,419 on Jan. 21, 2003),which claims priority from U.S. provisional application Ser. No. 60/082,868, filed Apr. 24, 1998, which are incorporated by reference.

FIELD OF THE INVENTION

The invention relates to a system and method for displaying simultaneously, on an analyst by analyst basis, for selected analysts, an indication of historical accuracy and the analyst's estimate for a future event (e.g., earnings, revenue, target price, cash flow, etc.); and for displaying simultaneously an indication of historical performance (e.g., track records) and analyst's recommendations for a future event, on an analyst by analyst basis.

BACKGROUND OF THE INVENTION

Many individuals and institutions analyze financial data, financial instruments, such as equity and fixed-income securities, and other things, at least in part to predict future economic events. Such individuals may include, for example, security analysts. The role of the security analyst is generally well-known and includes, among other things, issuing earnings estimates for securities, other financial estimates concerning future economic events (e.g., revenue), recommendations on whether investors should buy, sell, or hold financial instruments, such as equity securities, and other predictions. Security analyst estimates may include, but are not limited to, quarterly, semi-annual, and annual earnings estimates for companies whether or not they are traded on a public securities exchange.

Security analysts generally predict a stock's quarterly or annual earnings well in advance of the time the actual earnings are announced, and from time to time, update their predictions. These predictions are recorded, for example, in the Institutional Brokers Estimates Service ("IBES") database and other commercial databases. The IBES Detail History is complete in its record of estimates and actuals, but limited in its summaries and reports. While IBES provides a summary history database with summary-level information per security per fiscal period (or month), it does not provide daily summaries.

Many investors use the simple average of analysts' estimates, often referred to as the "consensus," to predict a stock's earnings, and to make investment decisions based on the consensus earnings estimate. However, this consensus is a naïve average created by placing equal weight on each analyst's estimate, regardless of whether the estimate was created recently or months ago, regardless of whether the analyst is a seasoned veteran with a great track record or a rookie, regardless of any historical bias, and regardless of other factors that may be relevant.

Usually more than one analyst follows a given security. Analysts often disagree on earnings estimates and recommendations and, as a result, analysts' earnings estimates and recommendations often vary.

A number of financial information services providers ("FISPs") gather and report analysts' earnings estimates and recommendations. At least some FISPs report the high, low, and mean (or consensus) earnings estimates, as well as mean recommendations for equity securities (as translated to a FISP's particular scale, for example, one to five). In addition, FISPs may also provide information on what the earnings estimates and recommendations were seven and thirty days prior to the most current consensus, as well as the differences between the consensus (e.g., consensus growth or consensus P/E) for a single equity security and that of the relevant industry. Moreover, for some clients, FISPs provide earnings estimates and recommendations on an analyst-by-analyst basis. An advantage of the availability of analyst-level estimates and recommendations is that a client may view the components of the mean estimate or recommendation by analyst. Various drawbacks exist, however, with these approaches and other known techniques.

For example, prior approaches include a software program that displays all current estimates. For a particular fiscal period, for a particular security, the software provides the ability to simply "include" or "exclude" each estimate or recommendation from the mean. This is problematic for several reasons. First, commercially available databases of estimates and recommendations contain "current" data on thousands of stocks. Each stock may have estimates from 1 to 70 or more analysts. In addition, each analyst may provide estimates for one or more periods. The data may be updated throughout the day. Manually dealing with this volume of information may be time consuming and tedious.

Another drawback is that with current techniques, if an individual were inclined to determine which estimates (or recommendations) should get more weight, and which estimates should get less or no weight, the large volume of analysts makes it extremely difficult to determine which analysts provide more useful information than others. Current techniques lack sufficient ability to intelligently measure historical analyst performance and beneficially use such measurements.

Another drawback is that while it is possible to imagine various weighting systems or algorithms, it is difficult to effectively implement or test them. Current systems do not provide the ability to effectively devise new estimate (or recommendation) weighting algorithms; nor do they provide the ability to easily test a historical performance.

Another drawback with current techniques is that there are limited tools for easily and effectively analyzing historical estimates and recommendations. While the data is available, oftentimes unique code is written to conduct a specific analysis. Changing the analysis often requires rewriting code.

These and other drawbacks exist with existing systems.

SUMMARY OF THE INVENTION

The present invention provides a method and system for simultaneously displaying historical accuracy indicators for an analyst and the analyst's estimate for a future event, on an analyst by analyst basis, for a selected one or more analysts wherein the historical accuracy indicators and analyst's estimate for a future event may involve one or more securities. The analyst's estimates may include quarterly or fiscal earnings estimates, revenue projections, security's target price, cash flow projections, financial predictions and other future earnings and other events. The one or more securities may include a set of securities in an industry, a sector, a set followed by a particular analyst, a brokerage firm, a user selected set of securities or other defined grouping. Historical accuracy indicators may include performance ratings based on various performance metrics. Historical accuracy indicators may also include relative accuracy scores where an analyst's accuracy rating may be compared to that of other analysts.

Various display options may be available. For example, displaying historical accuracy indicators for an analyst and the analyst's estimate for a future event, on an analyst by analyst basis, for a selected one or more analysts may further involve displaying analysts that have current estimates for a user selected security. Other viewing options may involve displaying historical accuracy indictors and estimate data for a group of analyst (such as the top analysts, analysts with predetermined track records, etc.) for a current estimate for a user selected security. Other viewing options may be available and other information may be displayed.

The present invention further provides a method and system for simultaneously displaying historical performance indicators and analyst recommendation data, on an analyst by analyst basis, for a selected one or more analysts. Other viewing options may include simultaneously displaying a graphical indication of analyst's current estimates as compared to other calculated measurements (e.g., consensus, high, low, etc.). Viewing options may also include selected a group of analysts, such as top analysts based on historical performance. Other factors may be defined in viewing other selected groups of analysts.

The present invention further provides a method and system for simultaneously displaying historical accuracy indicators, current estimate data and model information, on an analyst by analyst basis, for selected analysts. According to another embodiment of the present invention, a user may define a model that may be applied to current (and other) estimates to generate an enhanced composite estimate that may be used in predicting various aspects of future events. Model information that may be displayed may include exclusion factors, weighting factors and other information related to models used to generate enhanced composite estimates of the present invention.

Another feature of the present invention may involve commingling analyst performance indicators with current estimate data where analyst identifiers (e.g., name) and analyst association identifiers (e.g., brokers, affiliations, etc.) may be omitted. For example, while historical performance indicators and current estimate data may be displayed, one or more analysts may not be identified by name. In another example, some analysts may be identified by name and others may not be identified by name where historical performance indicators and current estimate data may be displayed for each selected analyst. Other variations may be implemented.

These embodiments of the invention are accomplished according to various embodiments and aspects of the invention, as described below. The various features and functions of the invention may be used alone or in combination to form a system and method for displaying simultaneously, on an analyst by analyst basis, for selected analysts, an indication of historical accuracy and the analyst's estimate for a future event; for displaying simultaneously an indication of historical performance and analyst's recommendations for a future event, on an analyst by analyst basis.

BRIEF DESCRIPTION OF THE DRAWINGS

FIG. 3 illustrates an example of a Contributor search screen according to an embodiment of the present invention.

FIG. 7 illustrates an example of a Contributors/Security module according to an embodiment of the present invention.

FIG. 13 illustrates an example of a Model/Manage module according to an embodiment of the present invention.

FIG. 29 is an example of list of alerts triggered on a selected date according to an embodiment of the present invention.

FIG. 31 is an example of current data summary information for a selected analyst according to an embodiment of the present invention.

FIGS. 38a and 38b are an example of performance data for a firm or other entity according to an embodiment of the present invention.

FIG. 39 is an example of screen for entering a ticker according to an embodiment of the present invention.

FIG. 41 is an example of an options screen according to an embodiment of the present invention.

DETAILED DESCRIPTION OF THE PREFERRED EMBODIMENTS

Figure 1:
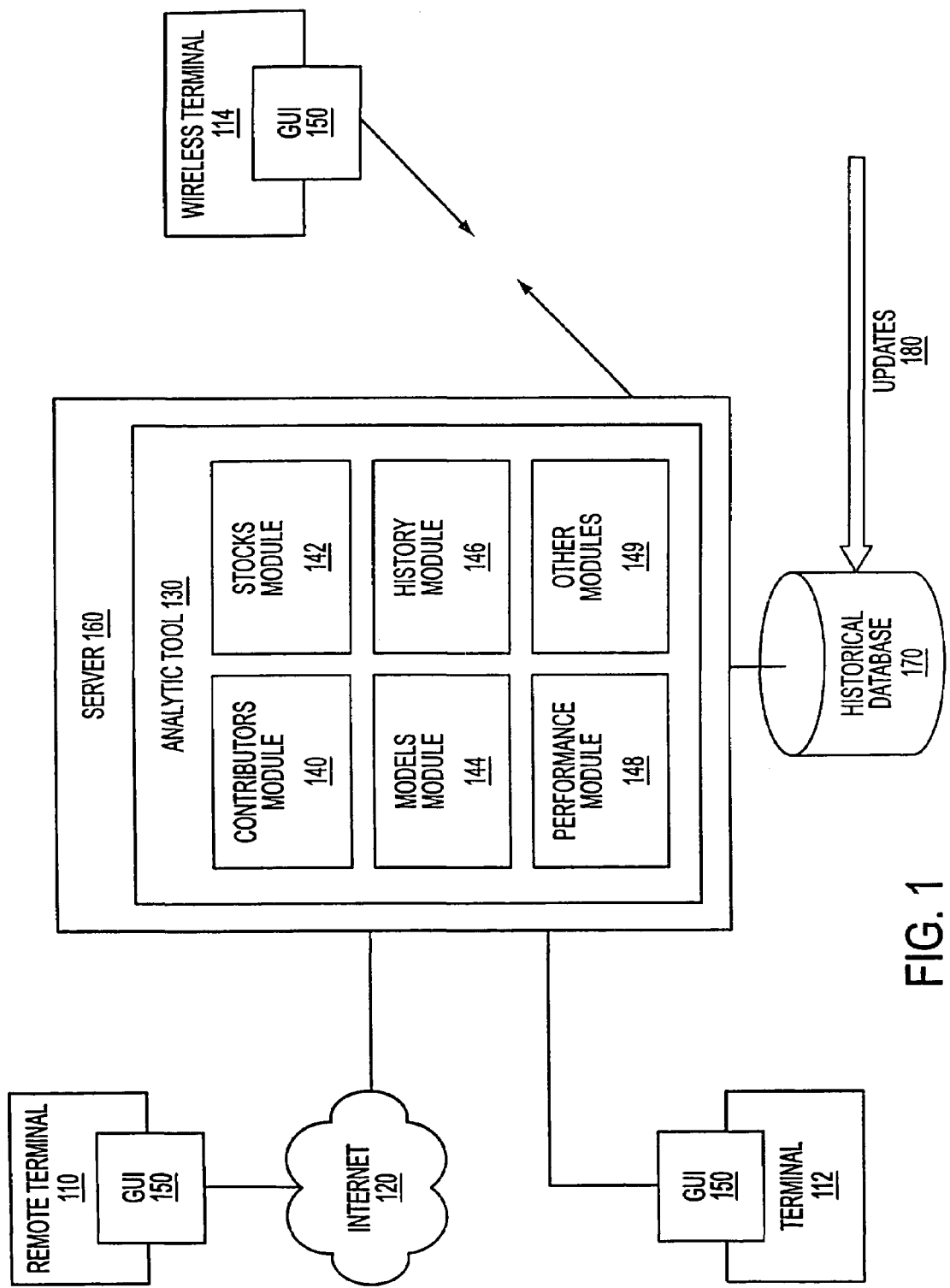
FIG. 1 illustrates a block diagram overview of an embodiment of the present invention.

With reference to FIG. 1, one embodiment of the invention comprises a computer implemented system and method for use with a historical database pertaining to predictions from a plurality of sources. The predictions may include one or more of analysts or broker estimates of earnings for a security, buy/sell/hold recommendations, revised estimates, stock price target estimates, and other predictors. The sources may include security analysts, institutions (e.g., brokerages), combinations thereof, calculations and other sources. For simplicity, in many cases, this specification refers to analysts estimates. It is to be understood that the invention is not so limited.

As shown in FIG. 1, an example of such a system may include at least one historical database 170 operatively connected to server 160. Historical database 170 may receive updates 180 so that the most recent information and estimates are maintained by the system. Historical data relating to predictions from a plurality of sources related to securities (or other items) are stored in database 170. The predictions may include earnings estimates, revisions to such estimates, and other information, along with actual reported earnings. Preferably, server system 160 is programmed with software that implements the various features and functions described herein. In operation, one or more users may access the system through an interface.

By way of example, the server may be a web server and the user interface may comprise a web browser. Other client/server and network configurations may be used. According to one embodiment, the interface comprises a graphical user interface (GUI) 150. Preferably, the GUI may display various modules and functions available to the user. The GUI 150 may be displayed via a terminal 112, such as a PC or other user terminal, networked to the server 160. The user may also access server 160 through GUI 150 displayed on remote terminal 110 via the Internet 120. Also, the user may access server 160 through GUI 150 displayed on wireless terminal 114, such as a wireless phone, PDA, or portable computer.

Analytical tool 130 comprises software that enables the user to perform various functions and features described herein. It enables analysis, use and display of the data in database 170. The analytical tool 130 preferably comprises a processor.

Analytical tool 130 may include Contributors module 140, Stocks module 142, Models module 144, History module 146, Performance module 148 and other modules 149. In another embodiment of the invention, a Lookup module may be used in place of a Contributors module. One or more of the modules can be combined. For some purposes, not all modules are necessary.

Figure 2:
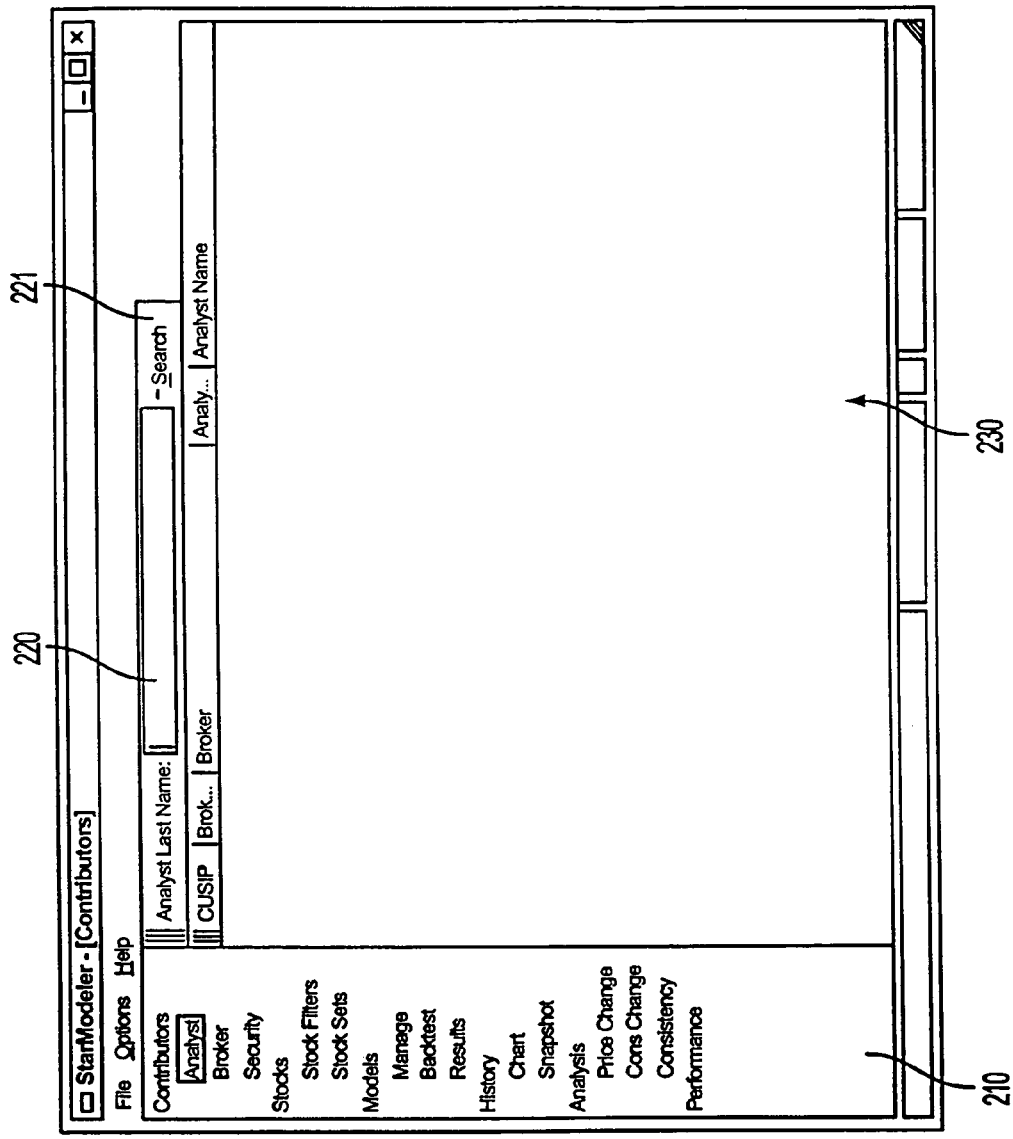
FIG. 2 illustrates an example of a Contributor/Analyst module according to an embodiment of the present invention.

FIG. 2 illustrates an example of a screen display that a user may see in GUI 150 according to one aspect of the invention. The display screen comprises a Navigator pane 210 that provides various options to the user. For example, as shown the options may include the ability for the user to select from among a plurality of modules. Under the Contributors module, the user may select a contributor from one or more of an analyst, broker, security, or other categories.

Under the Stocks module, the user may define stock filters and group stocks into stock sets to facilitate testing of models and for other purposes. Under the Models module, the user may create, manage, edit and perform other functions for models. The models may be used to generate enhanced composite estimates, backtest the model using the historical database, and view results of the backtest.

Under the History module, historical estimate and actual data may be viewed in chart format, snapshot format, or otherwise. For example, according to one embodiment, the chart view displays user selected estimates and actual data (e.g., earnings) graphically as time series data. The snapshot view displays detailed data in tabular format for a selected "As Of Date." Under the Analysis module, the user may analyze estimates according to price change, consensus change, and consistency. Under the Performance module, the user may analyze analyst and/or broker accuracy and performance, aggregated by analyst, broker, ticker, or any combination thereof. In each of the above identified modules, other options may be available to the user.

Under the Contributors module, the user may locate analysts, brokers and stocks and review their associations with each other and for other purposes. The Contributor module may be used to review information about analysts, brokers, and stocks in a general way. For example, a user may select the Contributors/Analyst module in Navigator 210, as shown in FIG. 2. The user may search by analyst and view the stocks covered by that analyst, and the brokerages for which the analyst has worked. The user may enter an Analyst's Name in analyst name bar 220 and select (e.g., click on) the search button 221. Also, when entering an analyst's name, the user may select a search option where the system will search an analyst name that begins with, contains, ends with, or exactly matches the entered string. The user may also use wild cards when searching for analysts. Main Display window 230 will display the results.

With reference to FIG. 3, for example, if the user enters a name that has more than one match, such as "Dube", preferably all names that correspond to the entered string 220 and their analyst ID will be displayed. The user may then select the desired analyst from the list of matches (e.g., by clicking on the desired analyst).

Figure 4:
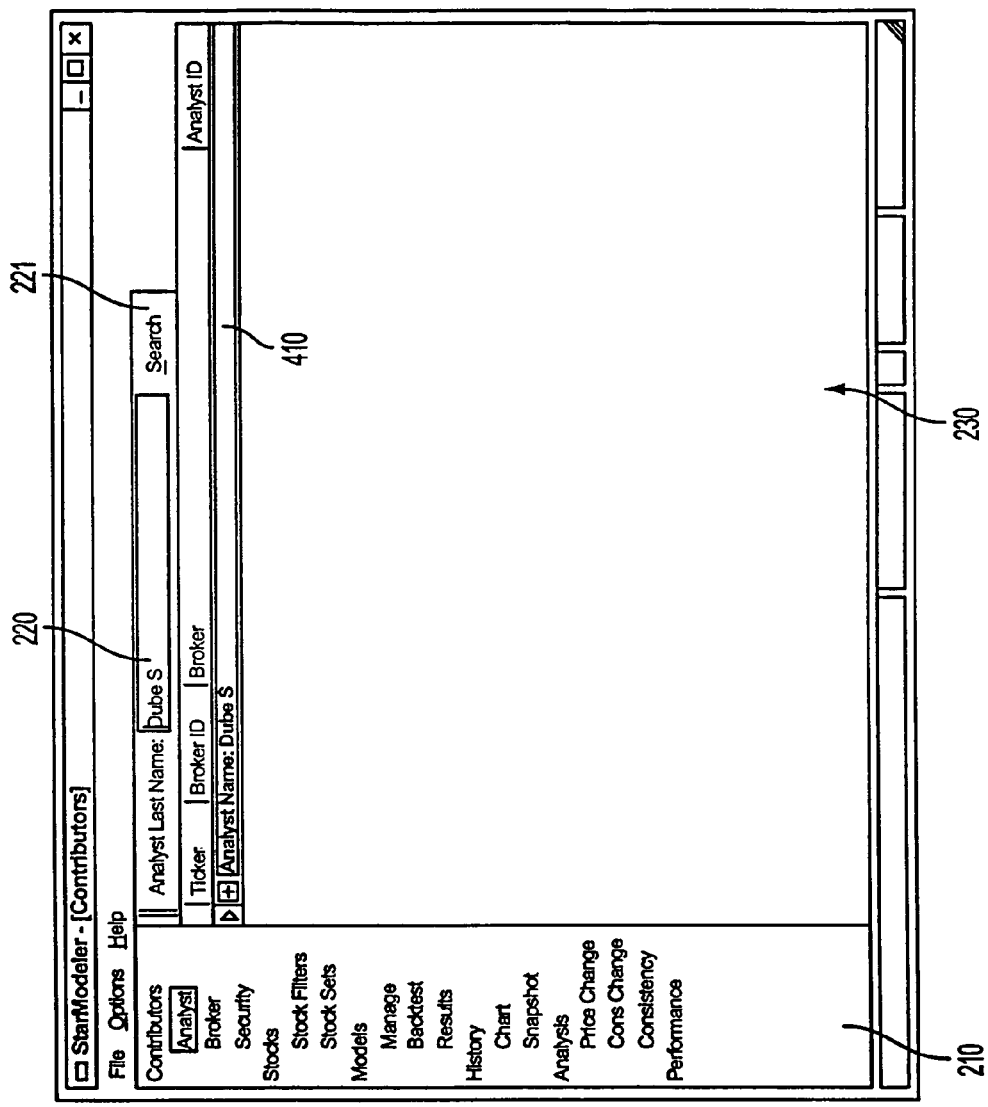
FIG. 4 illustrates another example of a Contributor/Analyst module according to an embodiment of the present invention.
Figure 5:
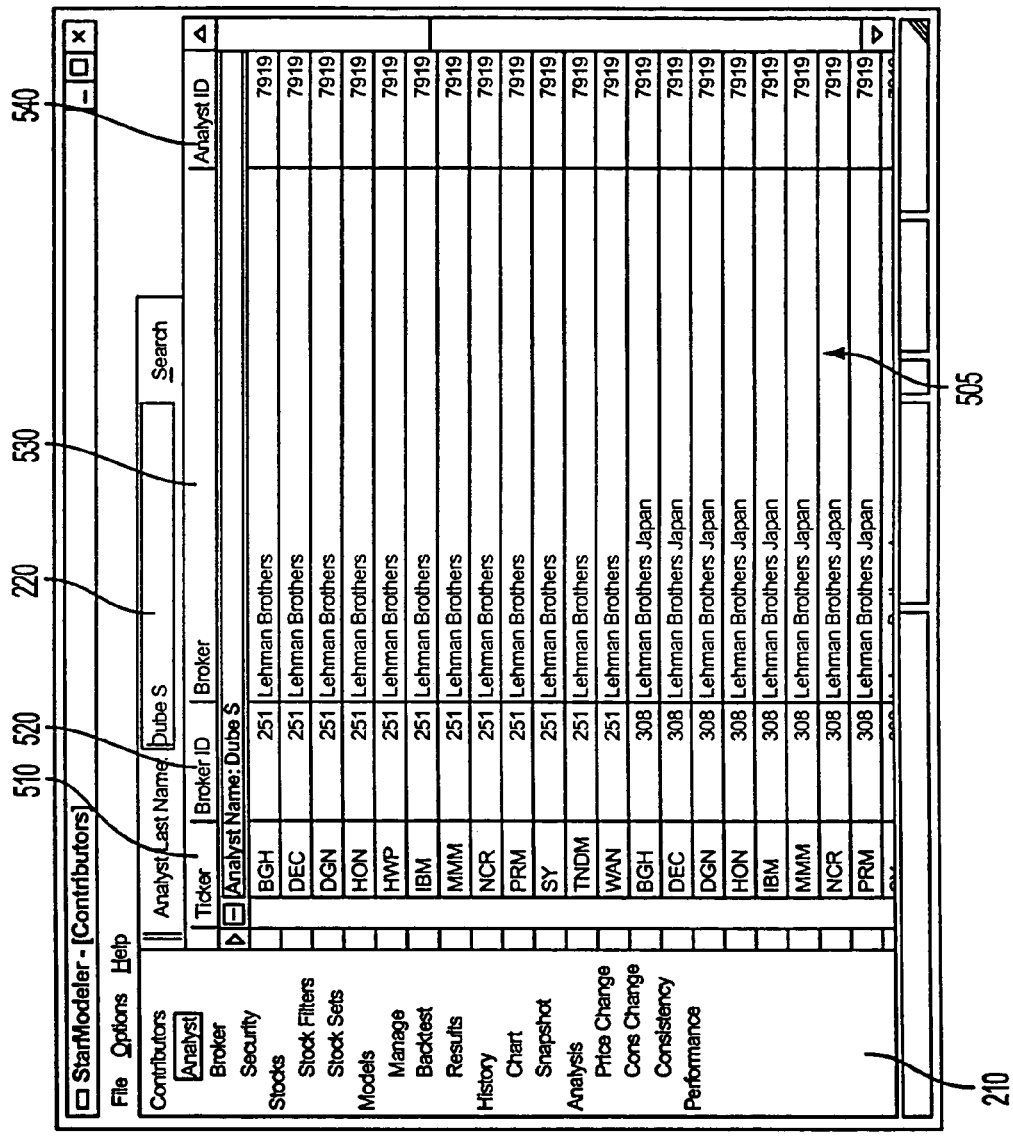
FIG. 5 illustrates an example of results of a Contributor/Analyst module according to an embodiment of the present invention.

As shown in FIG. 4, a resulting grid displays the selected analyst matching the search criteria in Main Display window 230. Clicking the plus-sign button next to the analyst's name in line 410 (or through other selection mechanisms) causes the system to display the analyst's record, as shown in FIG. 5. The grid 505 displays a list of the stocks for which estimates have been created by the selected analyst (in this example "Dube S") and other information. For example, grid 505 may include a list of stocks by Ticker 510, Broker ID 520 and Broker name 530 for brokers with which the analysts is or has been associated when estimates were made, the analyst ID 540, and other desired information. A user can click any column head to sort the table, then click again to reverse-sort. The Contributor/Analyst module thus enables a user to search by analyst and find the stocks and brokers associated with that analyst.

Figure 6:
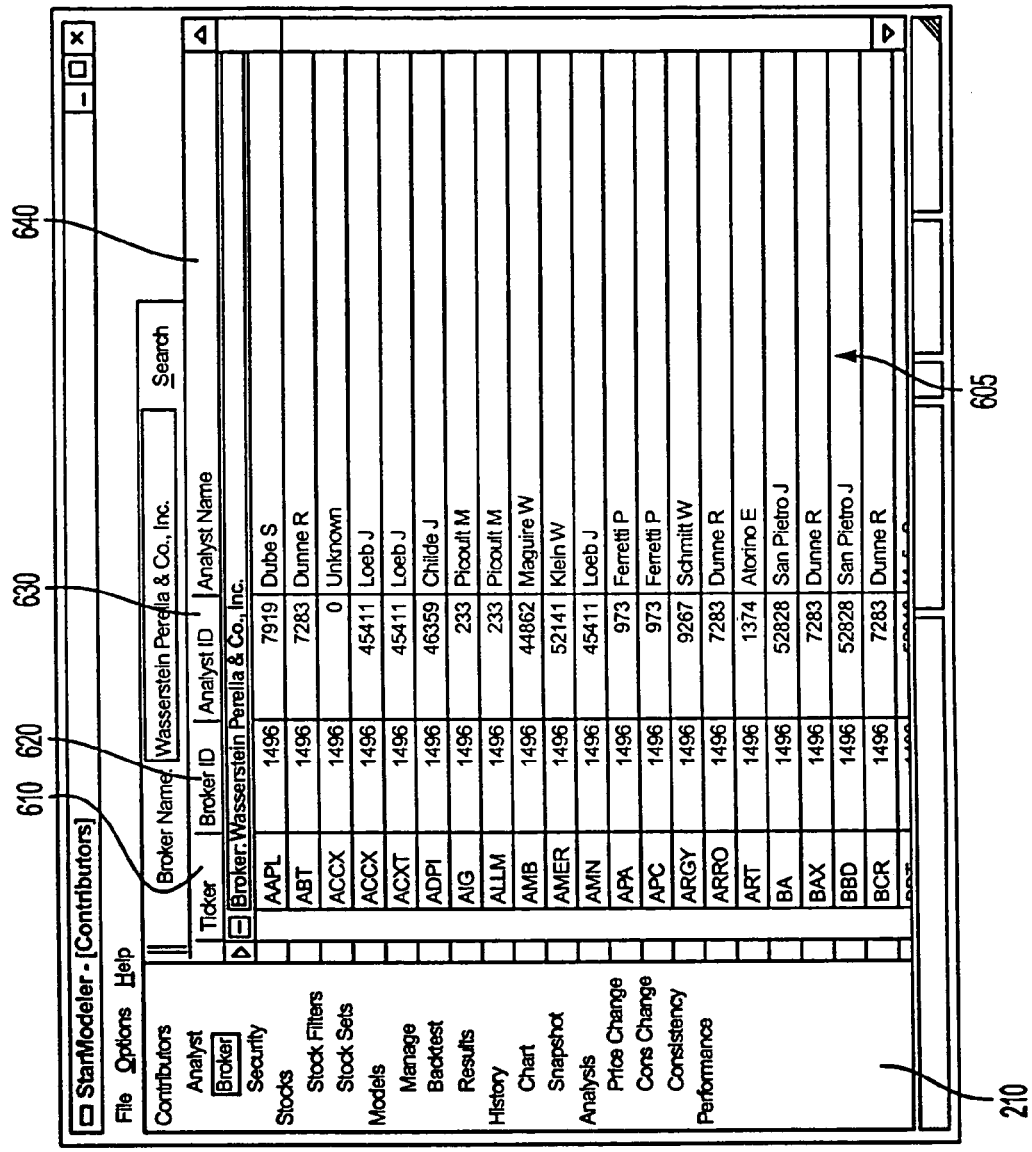
FIG. 6 illustrates an example of a Contributors/Broker module according to an embodiment of the present invention.

Similarly, the user may choose to search by broker. For example, as shown in FIG. 6, a user may select the Contributors/Broker module in Navigator 210, search by broker and view a list of analysts associated with the selected broker, as well as other information, as shown in grid 605. For example, grid 605 may display a list of the stocks for which estimates have been created by the selected broker. The grid includes a list of stocks by Ticker 610, Broker ID 620, Analyst ID 630, analyst name 640, and other desired information. A user can click any column head to sort the table, then click again to reverse-sort. Thus, the Contributor/Broker module enables a user to search by broker and find the stocks and analysts associated with that broker.

As shown in FIG. 7, by selecting the Contributors/Security module in Navigator 210, a user can search for a particular security via text box 760. Once a user selects a stock (or other security), a list of the analysts and brokers who have issued estimates for this stock may be displayed along with other information, as shown in gird 705. The search can be done by CUSIP, Company Name, Unique Ticker (e.g., FISP Identification), or Listed Ticker. If a company has changed ticker symbols it is useful to aggregate over a unique ticker. For example, when America OnLine moved from the NASDAQ to the NYSE, its ticker symbol changed. Other modes of searching for a ticker are also available. Clicking the plus-sign button next to the stock (not shown) will cause the system to display estimate details and show a minus sign next to the security. The system will display in grid 705, for example, a list of all analysts and brokers that have made estimates for that stock and other information. For example, the system may display CUSIP number 710, Broker ID 720, Broker Name 730, Analyst ID 740, analyst name 750, and other information.

In another embodiment of the invention, a Lookup Module enables the user to call up analysts, brokers and stocks, and review their associations with each other. For example, when an analyst is selected from a Lookup/Analyst module, the resulting grid displays the analyst's association with brokers, and the stocks for which the analyst has created estimates. When a broker is selected from a Lookup/Broker module, list of stocks estimated by that broker and the analysts who estimated each stock will be displayed. When a stock is selected from a Lookup/Security module, a list of analysts and brokers who have prepared estimates for this stock will be displayed. Also, start date, end date, id numbers, and other information may be available in each view.

Under the Stocks module, the user may create and apply Stock Filters and Stock Sets. A Stock Filter is a set of screening rules specified by a user to identify a group of stocks satisfying the rules. For example, a stock filter may include rules specifying stocks with a market capitalization in the top 500 of all stocks and a PE ratio less than 20. Stock filters may be used to update the list of stocks to be included in an analysis on a periodic basis. A stock set is a group of stocks, determined by a stock filter, manually or otherwise, that is saved under an assigned name. A user creates stock sets by creating a stock set name and adding stocks to it. A user can copy another stock set under a new name, and make changes to the list of stocks. Stock sets are stored on a system server. According to one embodiment, in a multi-user environment, stock sets may be created by an Owner and only accessible to that owner (e.g., a company) or others who are given access to a company's stock sets.

When a user wants to test a model against a group of stocks in the Models/Backtest module, the user calls up the name of the stock set they want to use. The model is tested against all stocks in the set in a single operation.

Figure 8:
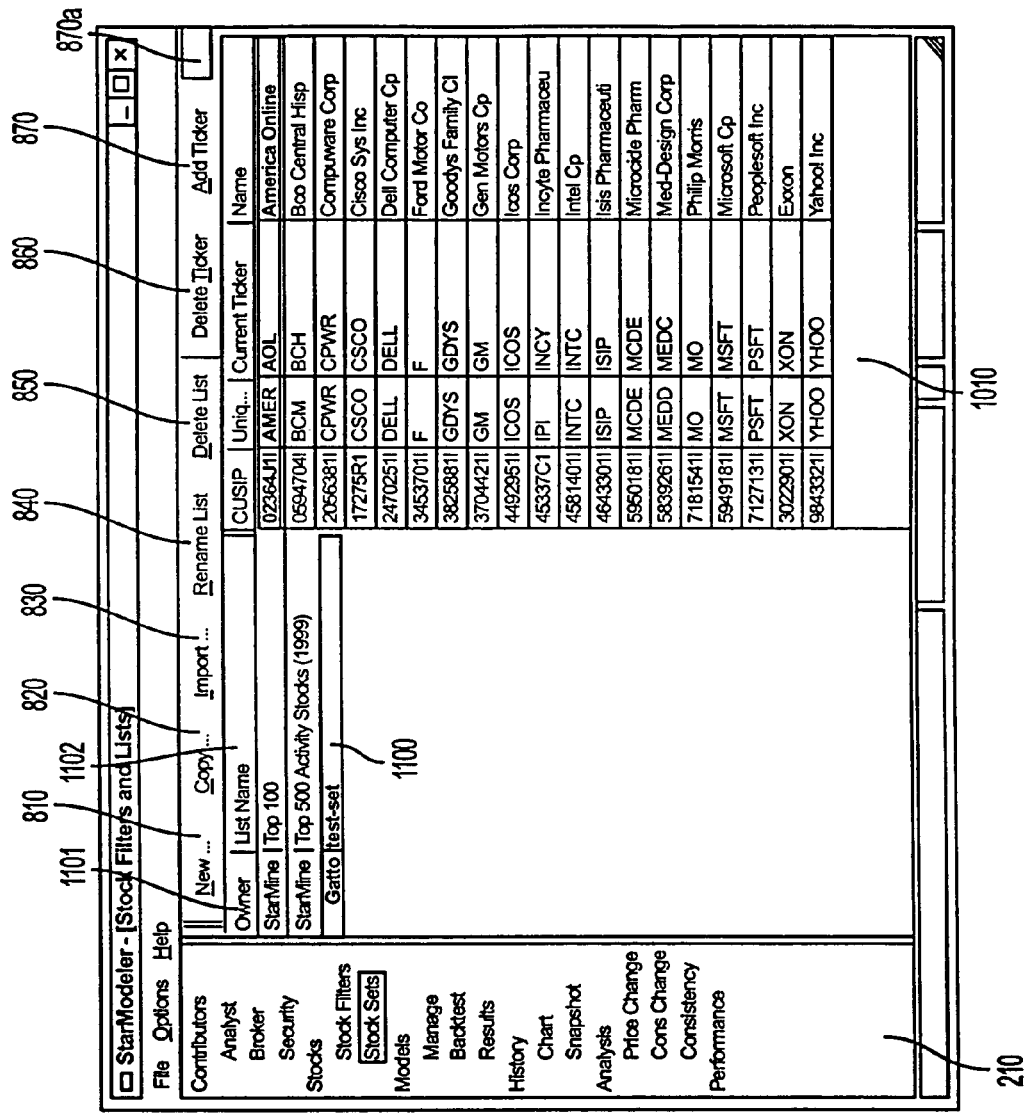
FIG. 8 illustrates an example of a Stocks/Stock Sets module according to an embodiment of the present invention.

FIG. 8 illustrates a screen display illustrating an example of what a user may see when the Stocks/Stock Sets module is selected. A portion of the display may list stock sets by owner names (1101) and stock set names (1102). For example, as shown, all or some stock sets owned by the web-site operator (e.g., Starmine) may be available to all users or certain users. Stock sets created by the user (e.g., Gatto) may also be available. In the example, the user has selected the "test-set" list 1100. This causes the Stock Display window 1010 to display the stocks of stock set "test-set." The displayed information may include, for example, the CUSIP, unique ticker, current ticker, name and other desired information.

Among other things, the Stock Set feature makes it easy for a user to group stocks into "sets" and call up those sets during the backtesting process or for other purposes. Thus, a model can be tested against all the stocks in the set, in one operation.

To create a stock set:
1. From the Navigator 210, a user can select Stocks/Stock Sets.
2. By clicking New 810 on the menu bar, a New Stock Set Name dialog box will appear.
3. By typing the name of the new stock set, the new Stock Set list name will be displayed with the owner's name.
4. With a stock set name selected, the user can type into the text box 870a or otherwise add the tickers the user wants to add to the stock set. By clicking Add Ticker 870 after entering a stock name, the added tickers will be displayed in the list shown in Stock Display window 1010. To delete a ticker, the user can select it and click the Delete Ticker 860 button.

The user also has the option to rename a stock set under Rename List 840, copy a stock set under Copy 820, import a list from another source under Import 830, and delete a list under Delete List 850. Other options to customize stock sets and filters are also available.

Figure 9:
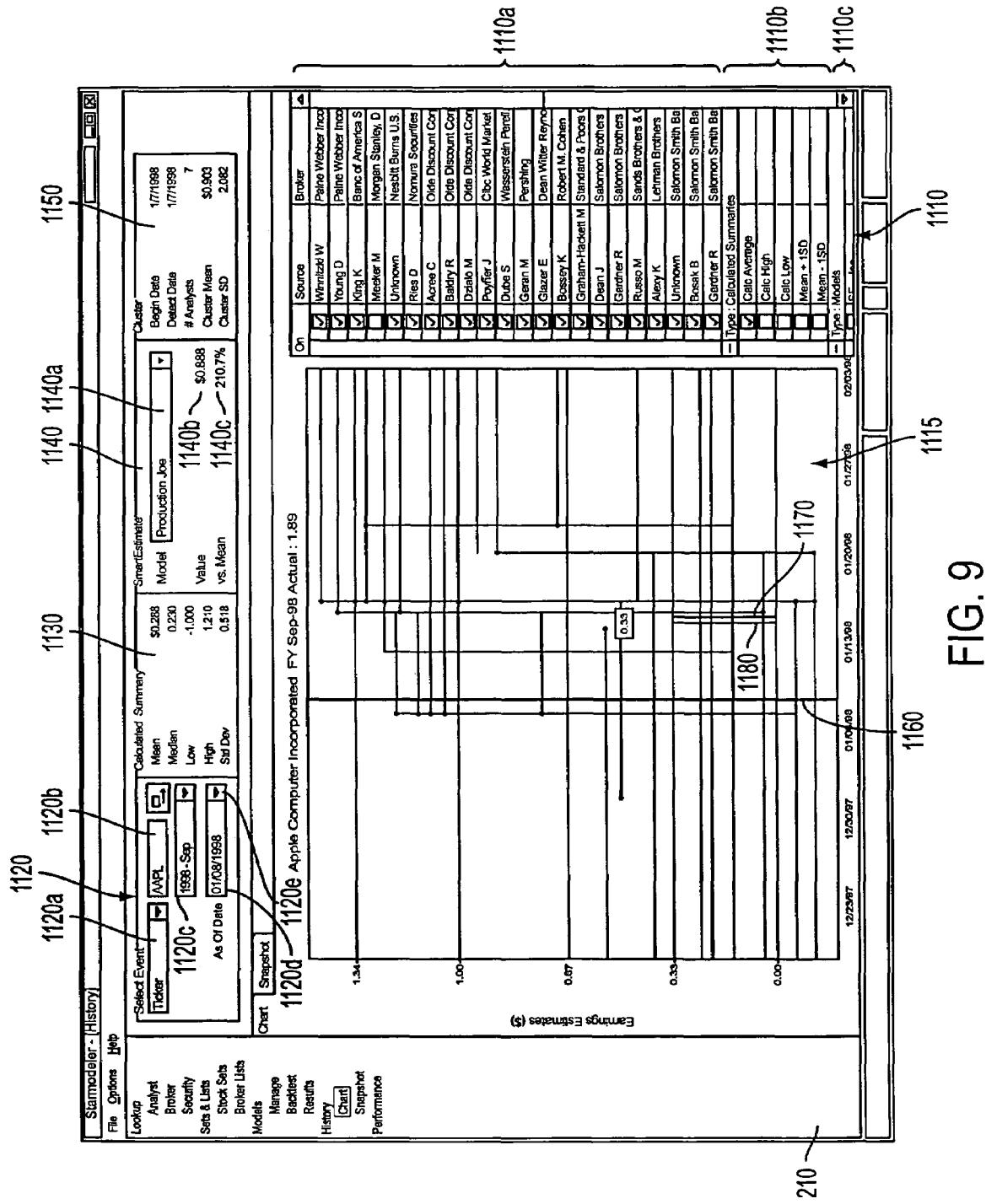
FIGS. 9 and 10 illustrates an example of a historical chart view according to an embodiment of the present invention.

As shown for example in FIG. 9, another aspect of the invention is the History module. The History module includes at least a History/Chart module and a History/Snapshot module. The History/Chart module displays for a selected stock and event, a graphical representation of historical estimates (and other information) as a time series over a selected time period. The History/Snapshot module displays in a grid format details of estimates (and other information) for the selected stock and event for a selected "As Of Date". A user may easily toggle back and forth between chart and snapshot view. In both views, the software provides the user great flexibility in controlling the data to be included in the view, including the analyst or analysts data to be displayed, the calculated or derived values (e.g. high estimate, low estimate, mean), any enhanced composite estimates or other sources. Various other user selections described herein give the user powerful analytic ability.

The History/Chart module displays a graphical representation of the historical performance of a selected security including selected analysts' estimates and revisions, actual reported earnings and other information. When the user selects a stock, an earnings event, an event period (e.g., annual or quarterly) and an event date, estimates and revisions are charted as a time series display, preferably along with the actual reported earnings of the selected stock for the event. The chart enables the user to visually analyze historical data for an event along with different analysts' estimates for an event. It enables a user to graphically identify analyst's whose estimates were close to the actual earnings and, importantly, how soon before the reported earnings an analyst made that estimate. The chart view also allows the user to simultaneously display calculated or derived values for display as a time series. For example, a user can select a model and view estimates generated by applying the model at any point in time prior to the period report date. Thus, a user can visually compare the model estimates to a consensus estimate or other source. The user also may selectively view one or more analysts' estimates simultaneously with one or more of an average, high or low estimate.

Figure 10:
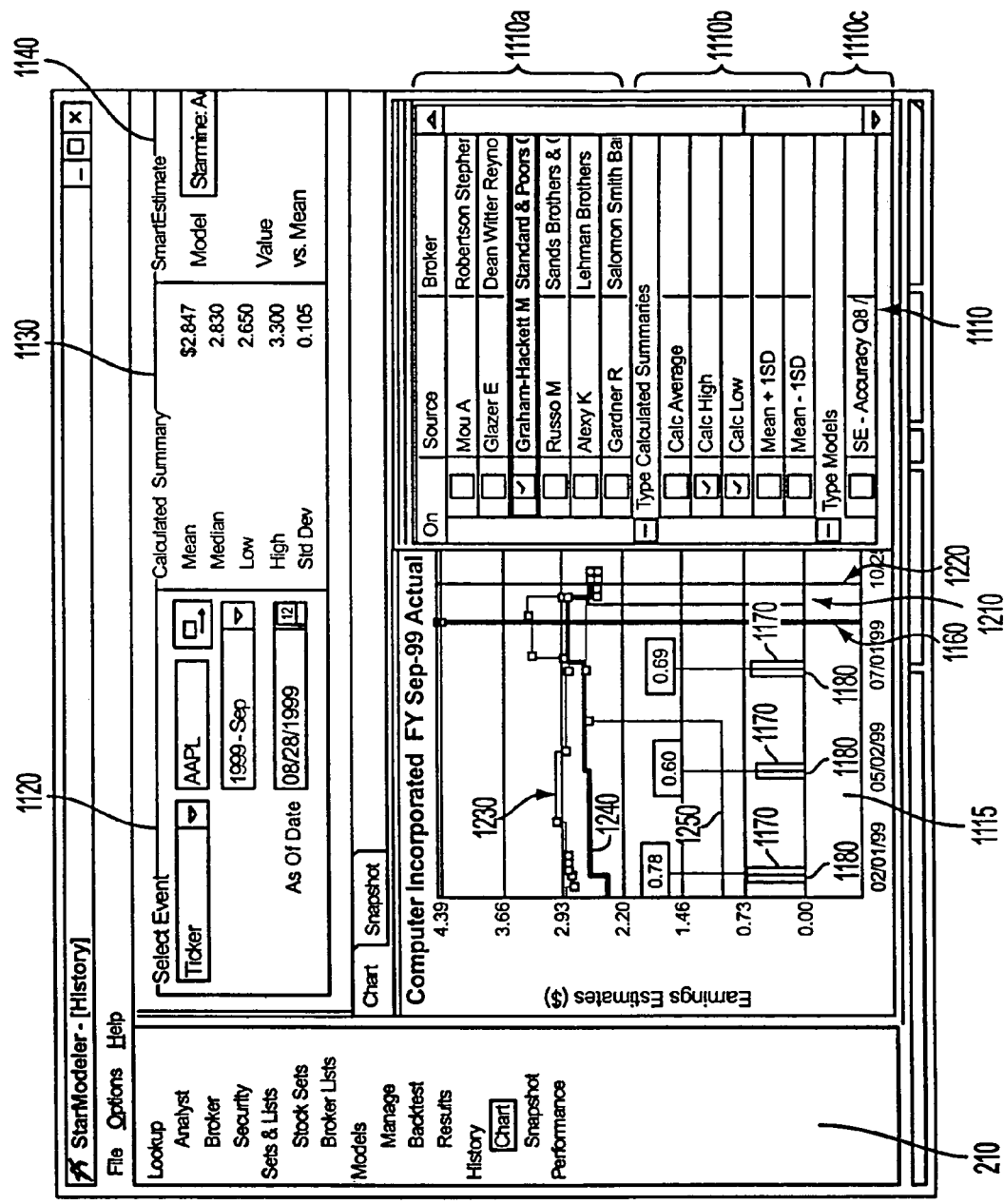
Figure 12:
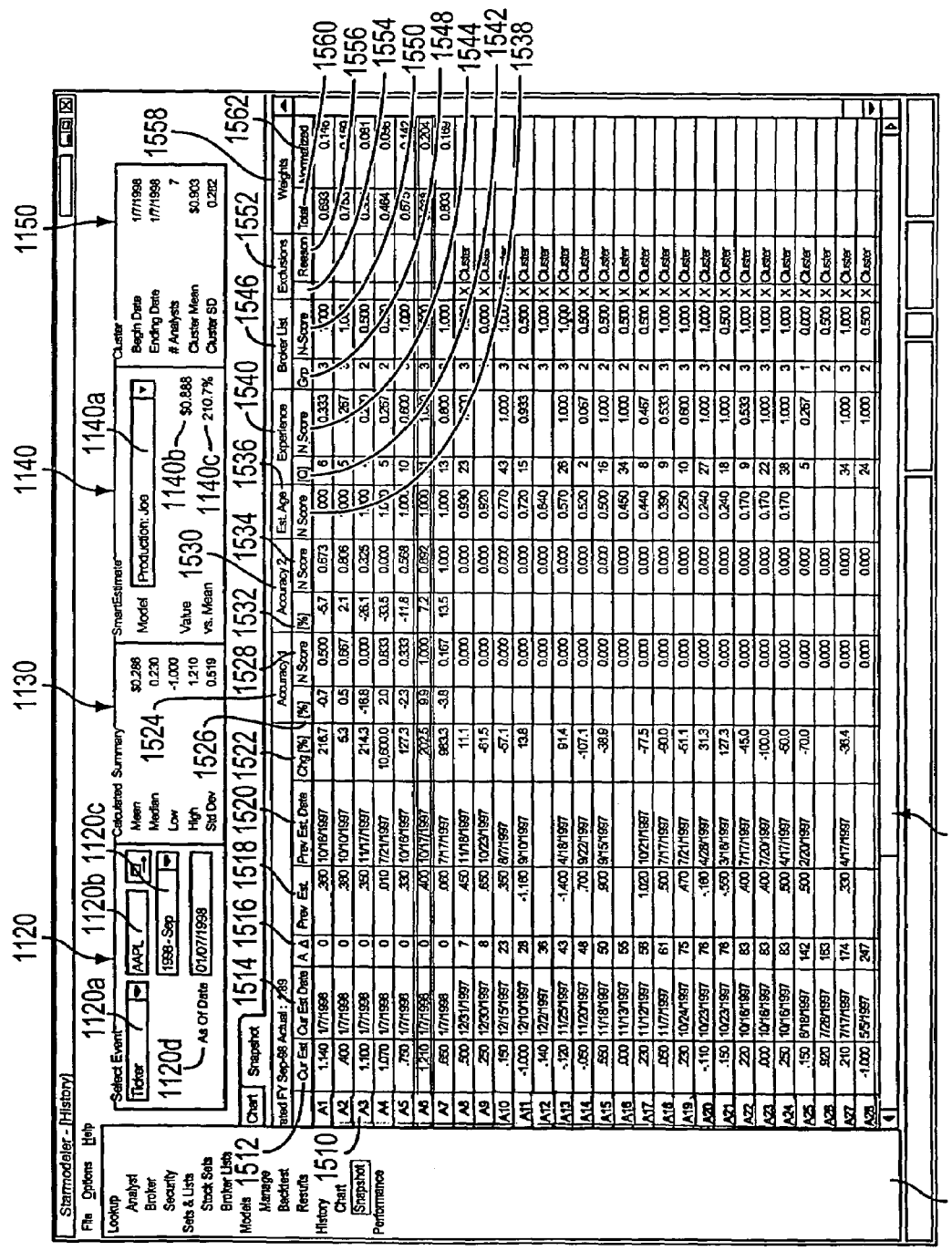
FIG. 12 illustrates an example of a snapshot view according to an embodiment of the present invention.

FIGS. 9 and 10 illustrate examples of History/Chart modules. FIG. 12 illustrates an example of a History/Snapshot module. According to one embodiment, both views may have certain common display elements. For example, both views may include the Navigator 210. Both may also include a Selected Event area 1120, a Calculated Summary area 1130, a Model Selection area 1140, a Cluster area 1150, a Main Display window 1115, and other desired information.

In Select Event area 1120, the user may select a security and earnings event, the security may be selected by Ticker, Unique Ticker (e.g., FISP Identification), Company Name, CUSIP number, or other category using text box/drop down list 1120a. In FIG. 9, the user has chosen to select the security by ticker, for example. In text box 1120b, the user may enter the ticker (or other information to identify the security). In this example, the user has selected Apple Computer by entering AAPL. In box 1120c, the user may select the event period type (e.g., annual or quarterly) and event date (e.g., a year or quarter-ending June-99). In this example, the user has selected the quarter ending September 1998. The user may also select an "As Of Date" at 1120d. As detailed elsewhere herein, calculated and derived values are calculated and displayed as of the "As Of Date".

The user may select the "As Of Date" in various ways. For example, under the Select Event area 1120, the user may click the Calendar icon 1120e to display a Calendar and pick a date by clicking double arrows for years, single arrow for months, and finally a day of the month from the displayed month. Alternatively, the user may manually type a date in the "As Of Date" box 1120d. In the History/Chart module, the user may drag an "As Of Date" bar (e.g., 1160) to a desired date displayed in Main Display window 1115. Bar 1160 graphically indicates the "As Of Date". Also, the user may simply click on the X-axis on the desired date and the "As Of Date" bar 1160 will move to that date. Other ways of changing the "As Of Date" may also be available. In each case, the displayed "As of Date" will be changed to the selected date.

In the example of FIG. 9, the "As Of Date" is Jan. 18, 1998, as shown by vertical bar 1160 and indicated in box 1120d. The "As Of Date" enables the user to specify a specific date for detailed analysis, e.g., the date for which historical information is calculated and displayed in the snapshot view. Summary information as of the "As Of Date" may be calculated and displayed in Calculated Summary area 1130. For example, Calculated Summary area 1130 may display summary information such as the mean estimate, median estimate, low estimate, high estimate, standard deviation, or other calculated or derived information with respect to the estimates, as of the "As Of Date".

In Model Selection area 1140, a user may select a model (created using the Models module described elsewhere herein) which when applied against analyst estimate data, creates an enhanced composite estimate that can be displayed in the chart or snapshot view. This enables a user to analyze, test, and compare the results of the selected model with selected analysts, consensus and other estimates or other information. In Model Selection area 1140, the user may select a model from a model list shown by clicking on a drop down window at 1140a. At 1140b, the value of the selected model's estimate as of the "As of Date" may be shown and the deviation from the mean may be shown at 1140c (e.g., as a %, actual or other difference). Other comparisons and information may be used and displayed to assist the user in analyzing the selected model's estimates and identify the significance of it.

Cluster information may be displayed in Cluster area 1150. As detailed below, a cluster is a group of estimates satisfying user specified criteria. When new information about a company becomes available, some analysts may promptly revise their estimates. A group of such revisions may constitute a cluster. Such revised estimates tend to be more accurate than estimates made before the clusters. Cluster information displayed in Cluster area 1150 may include a begin date, detect date, number of analysts, cluster mean, cluster standard deviation, and other information. Clusters assist users in identifying potentially significant trends and changes in estimates.

Main Display window 1115 may display estimate data in either chart or snapshot format, as selected by the user. Where the user selects a chart format, Source Selection panel 1110 may display a list of sources, or group of sources, which may include analysts, brokers and other potential sources in Source section 1110a, calculated averages, calculated high, calculated low, and other calculated summaries in Calculated Summaries section 1110b, and selected models in Models section 1110c. Other sections may also be available to display other relevant information.

With reference to FIG. 9, for example, once a stock, event and time frame are selected, the selected analyst's estimates and revisions are charted as a time series display along with actual reported earnings for the stock. Other features and options may also be selectively displayed. For example, using Source Selection panel 1110, the user may conveniently select and deselect individual sources, including analysts, calculated or derived summary data (e.g., high, low, and consensus estimate) and enhanced composite estimates generated by one or more models. Thus, the user may simultaneously view a times series of earnings estimates for one or more selected analysts or other sources for a selected security and predetermined earnings event.

From the Source Selection panel 1110, the user can select, in Source section 1110a, a check box of the analyst whose estimate history the user wants to display. For example, the user may click on the check box to activate the source. Preferably, a unique identifier for each analyst or source is used for that source's time series. For example, according to one embodiment, each check box in source selection panel has a semi-unique color and a line the same color as the check box area appears on the chart, showing the analyst's estimate history for that stock. The user can select/deselect as many analysts as the user want individually, or as a group. To select all analysts, or to deselect them, the user may right-click anywhere in the Analyst list and use a Show/Hide command that enables a user to show all or hide all analysts.

The user can select a calculated estimate, for example, to compare an analyst's estimate record with the consensus or other calculated estimate, in Calculated Summaries section 1110b. For example, the user may compare analysts' estimates with a calculated average, a calculated high, a calculated low, a mean plus standard deviation, a mean minus standard deviation, and other calculated estimates.

The time series is generally displayed as a step function comprising a plurality of nodes, data points or data markers, connected by horizontal lines. The nodes, data points or data markers represent start dates, revision dates, or end dates. The selection of a node (e.g., by clicking on it) may cause a display of data associated with that node, data point, or data marker, including one or more of the sources, the value of the estimate corresponding to that node, data point or data marker and other information. Discontinuities in a time series may be graphically displayed.

A discontinuity may occur if an analyst stops covering a security then restarts. The discontinuities may be displayed as a gray mark, for example, in the time series. To facilitate reading and interpreting the graph, each source's earnings estimate may be displayed in different colors (or other designator, such as symbols, different line type or line width, etc.) and a legend to correlate the various time series to the corresponding source.

When two or more time series are displayed (e.g., a contributor's time series and a calculated estimate time series) the present invention may provide a mechanism to ensure the visibility of both when for a given time period the numbers are the same value. For example, the graphical interface user may display one of the time series (e.g., consensus) as a thicker line than the other, where the thicker line is in the background and the thinner line is in the foreground. In this way, even if the values are the same for a given time period, both lines will be visible. Additionally, a selected source's time series may be displayed as a thicker line to easily focus on that source's time series. In the example of FIG. 9, calculated average is shown as a thicker line thereby indicating that this feature was selected.

Various display control features may be provided to enable a user to control the display in Main Display window 1115. For example, the user may select from various viewing options by right clicking in the chart view. For example, the user may use the right click option to select a different time frame in Main Display window 1115. The user may display data corresponding to selected time intervals before the report date in increments of one month to two years, or Maximum for the longest available time frame. For example, Vertical Max view displays the widest discrepancies of the lines on the y-axis. The chart will then redraw the Main Display window 1115 to display the time period the user selected. The right click option may also provide Get High Analyst and Get Low Analyst options. The user may view an Analyst Name, Broker Name, Estimate Date, Estimate Value, and other information regarding the high analyst and low analyst. The user may also select to view the mean on the report date as well as the mean value. Other options include the ability to export the history to a file, save the chart to a clipboard, print the chart, and other options. The user may also select to view a corresponding price chart that may appear as a separate chart directly below and time correlated to the chart view of estimate data, as discussed in greater detail below in FIG. 11. The options available through the right click mouse button may also be made available through other selection means.

The user also has the ability to narrow in on a section of Main Display window 1115. For example, the user may box a portion of the Main Display window 1115 (e.g., by holding down the left mouse button to draw a box around an area) to view estimate data in greater detail in chart format. This feature is useful when estimate data from different sources are displayed closely together so that it becomes difficult to differentiate the estimates in chart format.

Additionally, other information may also be displayed, such as actual reported earnings, which may be shown through vertical Earnings bar 1170 on the corresponding dates the earnings were reported. Previously reported earnings may also be shown as a vertical bar indicating the actual reported earnings. Mean estimate bar 1180 indicates the mean value of the previously reported earnings on the report date. The value of the bar may be shown above the Earnings bar 1170 and/or Mean bar 1180.

FIG. 10 illustrates a chart view of an identified analyst compared to a calculated high and calculated low. In this example, analyst Graham-Hackett M has been selected as indicated by the checked box in Source section 1110a to display this analyst's estimates for AAPL stock, as shown in Select Event area 1120. FIG. 10 displays a calculated high shown by line 1230, a calculated low shown by line 1250, and estimates provided by the identified analyst, shown by line 1240. In this example, the user may visually compare Graham-Hackett's estimates with the actual reported amount as indicated by Actual bar 1210. A Period bar 1220 may be displayed as a thinner line or other indicator. The Period bar 1220 signifies the end of a period. In this example, the position of the Period bar 1220 indicates that the period for that quarter has ended just after the actual earning was calculated, as shown by the Actual bar 1210. Earnings bars 1170 indicate previous reported earnings for each quarter. When the height of Mean bars 1180 are compared to the height of Earnings bars 1170, the user may easily see that the mean values were slightly lower than the actual earnings in this particular window of time. The "As Of Date" bar 1160 indicates a date of Aug. 28, 1999. The Calculated Summary data in area 1130 along with the Value, vs. Mean in area 1140, and Cluster information (not shown) are displayed to the user where these values are current as of the "As Of Date".

Figure 11:
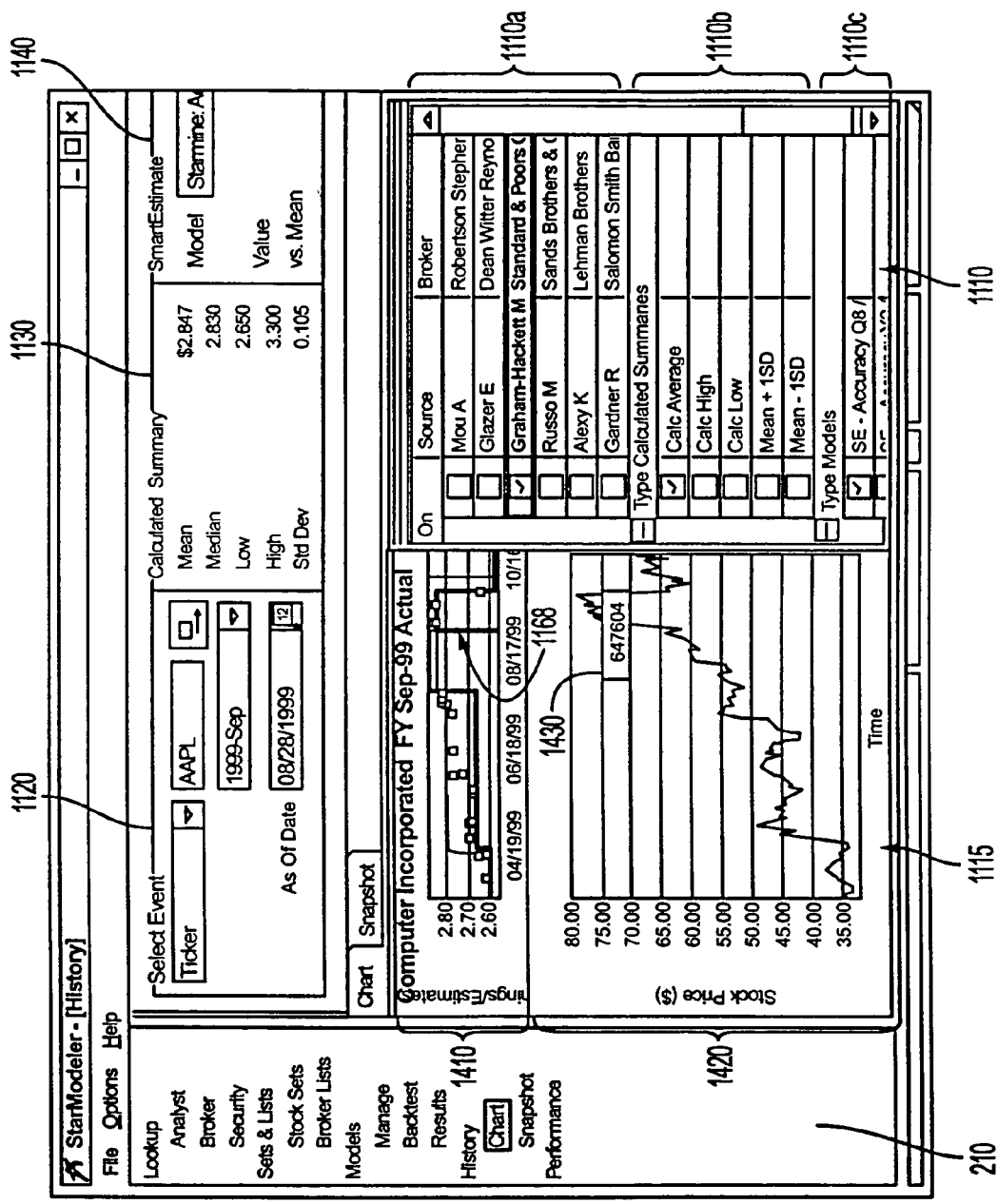
FIG. 11 illustrates an example of a Price Chart view according to an embodiment of the present invention.

FIG. 11 illustrates a Price Chart option that may be invoked through a right click option or other selection means. FIG. 11 illustrates that a time series display of the price of the security in juxtaposition with the time series of earning estimates for the security. This is particularly useful to see if there is any correlation between estimates and revisions thereto, and stock price movement. By selecting the Price Chart option, estimate data displayed in chart format is displayed in Chart window 1410 and the corresponding stock prices are displayed in Price Chart 1420, in Main Display window 1115. The user may drag the Chart window 1410 by holding down the right mouse button (or other dragging mechanism) to view estimates of other time frames thereby changing the times series view. The stock prices shown in Price Chart 1420 correspond to the time series estimates in Chart window 1410. Thus, as the user drags the Chart window 1410 to change the time frame, the stock prices displayed in Price Chart 1420 accordingly follow the user's change in time frame. In addition, the stock price for the "As Of Date" may be displayed in Stock Price box 1430 in Price Chart 1420. When the user selects a new "As Of Date", the stock price of the new "As Of Date" will be displayed in Stock Price box 1430.

FIG. 12 illustrates an example of a snapshot view. In contrast to the chart view which provides a time series view, the snapshot view enables the user to focus on a single date (the "As Of Date"). For that date, the user may view various data, metrics, and other information associated with the estimates current on that date.

The snapshot view is a powerful tool that provides significant detail for a given date in one view. Among other things, the view provides a clear breakdown of estimate data, source performance and attribute information and other information on an analyst by analyst basis. Detailed data regarding various factors e.g., factors used to calculate weights assigned to each analyst's estimate may also be displayed on a factor by factor basis.

For example, FIG. 12 shows a display wherein a snapshot view shows source, current data, historical data, factor-related data and other information. Under source column 1510, analyst information may be displayed as represented by A1-A28, which may include analyst's name, broker information and other source information. In addition, one or more analysts may be identified by a symbol, letter, number, or other identifier (e.g., A1-A28). Thus, the present invention provides the ability to associate estimate data (e.g., current data, performance data, historical data, and/or other data) with anonymous analysts by using identifiers where analyst name and analyst association names (e.g., brokers, etc.) may be omitted. The snapshot view may also show current and historical estimate data as well as other information. For example, under current estimate data, the snapshot view may show current estimates column 1512, current estimate date column 1514, estimate age column 1516 and other current estimate data. Historical estimate data may also be displayed including previous estimate column 1518, previous estimate date column 1520, change from last estimate to current column 1522 and other historical information.

The snapshot view simultaneously displays performance, attribute data, exclusion data and factor weights on a source by source basis. For example, performance data may be provided under Accuracy 1 column 1524, Accuracy 2 column 1530, Estimate Age column 1536, and other forms of performance data. Under each performance column, the actual score attributed to that performance as well as an N-score may be displayed. For example, under Accuracy 1 column 1524, the percentage of accuracy is displayed in column 1526 and an N-score is displayed in column 1528. In another example, under Accuracy 2 column 1530, the percentage of accuracy is displayed in column 1532 and an N-score is displayed in column 1534. In another example, under Estimate Age column 1536, the N-score assigned by user-defined criteria may be displayed in column 1538.

Attribute data may be provided under Experience column 1540, Broker List column 1546, and other types of attribute data. Under each attribute data, attribute information and an N-score may be displayed. For example, under Experience column 1540, the number of periods (e.g., quarters) an analyst has provided an estimate is displayed in column 1542 and the score assigned to the number of periods an analyst has provided an estimate is provided in column 1544. In another example, under Broker List column 1546, the group that the broker has been assigned to is displayed under column 1548 and the N-score assigned to that group is displayed in column 1550.

Exclusion data is also displayed in the snapshot view. For example, the user may view which analysts were excluded as clusters by examining Exclusion column 1552. In this example, the user may easily see the estimates excluded by a model and the reason for the exclusion. The example of FIG. 12 shows a cluster has been detected. Thus estimates outside the cluster are excluded under the clusters exclusion factor as indicated by an "x" mark, or other identifying mark in column 1554. Other estimates may be excluded for other reasons where the reasons are displayed under the reason column 1556.

The snapshot view as shown in FIG. 12, enables the user to view current analyst data commingled with a plurality of data values and N-scores for a selected model on an analyst-by-analyst (or source-by-source) basis. The user may readily compare the current analyst data for each analyst for a given stock with the elements that comprise the model, such as factors, N-scores, Exclusions and Weights. The user may also sort by the factors that are of particular interest to the user in defining and refining a model. For example, by sorting the estimates in the order of most recent estimate, the user may view estimates in the order of recency.

It will be appreciated that viewing the historical estimates of a plurality of analysts in the manner described above may often provide a context within which an individual source's estimates and revisions may be better understood, such as by providing insight into an analyst's estimate revision patterns and the relative accuracy of those revisions over time as they relate to a company's actual reported earnings. As such, this historic information may be valuable in appraising future revisions made by an analyst to his current estimates, and in deciding whether to act, or to not act, based upon the revisions. The visual display in chart view can clearly illustrate a bias error pattern of individual analysts such that, patterns, if any, in an analyst's earnings estimations may be investigated and analyzed. Other advantages exist.

According to another embodiment of the present invention, the user may create a model that can be applied to analysts' estimates for one or more stocks or stock sets to create an enhanced composite estimate for the stock or stocks. The enhanced composite often improves the ability to predict a quantity being estimated, such as company earnings, revenue, cash flow, buy/sell/hold recommendations or other predictions. According to one embodiment, the model preferably comprises one or more of user defined exclusions, rules, selected factors with user specified rules for assigning a factor score (N-score) to each source or non-excluded source, and Factors Weights that are applied to each factor. Preferably, the user can identify certain exclusions by which certain data items (e.g., estimates), contributors (e.g., analysts and brokers), or other sources are excluded from consideration for a particular model (e.g., if a source's estimate is older than a certain number of days, or if an analyst has not covered a stock for a minimum number of periods). Based on the exclusions, factors, rules, and Factor Weights, the model is applied to current estimates to create an enhanced composite estimate. The model may be backtested against historical data (visually and/or analytically), refined, and when desired put in production mode. In production mode, the model is run against current data to generate current enhanced composite estimates (e.g., nightly or other frequencies). Various analysis of the current enhanced composite estimate may be made to identify significant situations (e.g., where the enhanced composite estimate generated by a model deviates from the consensus estimate (or other bench mark) by certain user specified criteria.

Figure 13:
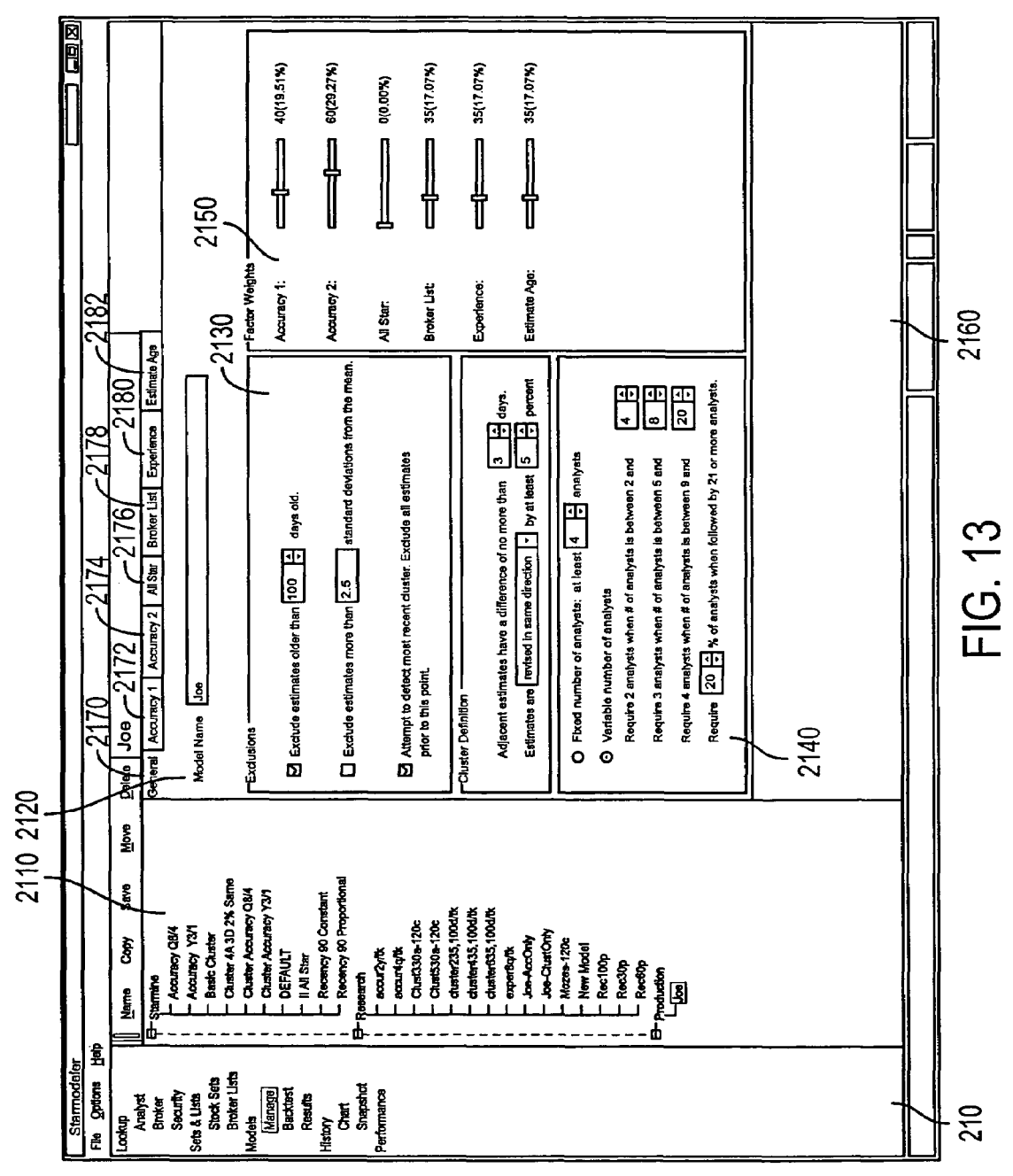

With reference to FIG. 13, Models functions are accessed from the Models/Manage module in Navigator 210, as shown, includes options to manage models, backtest models and show results. The Models/Manage module enables a user to create, edit, move, copy, delete or perform other functions on a model. As user creates a model by naming the model, specifying exclusion rules (including cluster definitions), identifying model factors, defining scoring rules, and assigning factor weights to the factors. The user may also perform other model managing functions such as saving a model, copying a model, moving a model and deleting a model.

A Models Folder window 2110 preferably contains model libraries and model names. Other organizational techniques and systems may be used. Models Folders window 2110 displays the available models to the user. Models classified under Research may be in the process of being tested. Models classified under Production are in actual use to calculate enhanced composite estimates. Other categories are also available to the user for classification.

The Models/Backtest module enables a user to test and refine models for accuracy and other criteria. The Models/Results module displays the results of the Backtests to the user. In addition, the user may visually test models through the History/Chart and History/Snapshot modules.

An example of how a user may create a model and how the model is used will now be explained. A user may create a model by identifying various exclusions and factors to be taken into account in the model and the Factor Weight to be assigned to each factor. Other steps and options may be used. According to one embodiment, the user may specify exclusions using an exclusions template 2130 as shown in FIG. 13. For each selected factor, a user may specify rules by which each non-excluded analyst is assigned an N-score (normalized score). The user can assign a Factor Weight to each factor to place greater emphasis on one or more factors for a given model. For each model, the analyst's N-score for each factor is multiplied by the Factor Weight to generate a Weighted N-score. These Weighted N-scores are summed for each analyst to generate a Total Factor Score for each analyst. The actual Total Weight for an analyst's current estimate is determined by normalizing the analyst's Total Factor Score, i.e., dividing it by the sum of the Total Factor Scores for all analysts. In this way, the sum of the Total Weights will equal 1.

For example, in one model a user may specify certain exclusions that will exclude certain analysts or estimates. Then assume the user selects three factors F1, F2, and F3 to use in the model. Next, the user may specify rules for each factor to assign N-scores for each non-excluded analyst. Then the user assigns Factor Weights to each of the three factors. For exemplary purposes, assume that based on these rules, three analysts A1, A2, and A3 are assigned the following N-scores and Factor Weights as detailed below.

| FACTOR | ANALYST | ANALYST N-SCORE BY FACTOR (N) | FACTOR WEIGHT (W) |
|---|---|---|---|
| F1 | A1: | N1 = 0.7 | F1W = 0.6 |
|  | A2: | N2 = 0.2 |  |
|  | A3: | N3 = 0.1 |  |
| F2 | A1: | N1 = 0.5 | F2W = 0.3 |
|  | A2: | N2 = 0.5 |  |
|  | A3: | N3 = 0.5 |  |
| F3 | A1: | N1 = 1.0 | F3W = 0.1 |
|  | A2: | N2 = 1.0 |  |
|  | A3: | N3 = 1.0 |  |

Factor Weights ("FW") may be assigned for each factor depending on the relative importance as determined by the user. For example, for this model, the user determined Factor 1 to be most important and assigned it a Factor Weight of 0.6. Factor 2 was assigned Factor Weight of 0.3 and Factor 3 was assigned a Factor Weight of 0.1. The analysts' N-scores for each factor is then multiplied by the Factor Weight and those Weighted N-scores are summed for each analyst to generate a Total Factor Score for each analyst.

For $A1$, Total Factor Score=$(0.7 \times 0.6)+(0.5 \times 0.3)+(1.0 \times 0.1)=0.67$ For $A2$, Total Factor Score=$(0.2 \times 0.6)+(0.5 \times 0.3)+(1.0 \times 0.1)=0.37$ For $A3$, Total Factor Score=$(0.1 \times 0.6)+(0.5 \times 0.3)+(1.0 \times 0.1)=0.31$ The Total Factor Score for each analyst is then divided by the sum of the Total Factor Scores for all analysts to determined a Total Weight. In this example, the sum of the Total Factor Scores for all analysts is: 0.67+0.37+0.31=1.35.

Thus, the Total Weight for analyst is calculated as follows:

For $A1$, Total Weight=0.67/1.35=0.496

For $A2$, Total Weight=0.37/1.35=0.274

For $A3$, Total Weight=0.31/1.35=0.230

To generate the enhanced composite estimate in this model, these analysts' current estimates are multiplied by the analysts' Total Weight.

For example, assume A1 has a current estimate of 1.50, A2 has a current estimate of 1.20 and A3 has a current estimate of 1.25. The calculated mean equals (1.50+1.20+1.25)/3=1.317. However, if the model described above is applied to the estimates, the enhanced composite estimate equals $(1.50 \times 0.496)+(1.20 \times 0.274)+(1.25 \times 0.23)=1.36$. Thus, the enhanced composite estimate differs from the consensus by 0.11 or nearly 10%. This may signal that the stock is undervalued.

With reference to FIG. 13, a more detailed explanation of how models are created will now be provided.

To create a model, from the Navigator 210, the user can select Models/Manage. The general appearance of the display will include the Navigator 210, a Models folders section 2110, a Main Display window 2160 including an Exclusions area 2130 (or other mechanism to enable selection display of various factors and other criteria relating to models) and a Factor Weights display and selection mechanism 2150. A tool bar (or other mechanism) will also be displayed to enable a user to select one or more of New, Copy, Save, Move, Delete or other functions.

By clicking New on the menu bar, a dialog box will appear with a text box for entering the name of the user's new model. The user can type the name of the new model. As shown, the user has entered the name "Joe". The model name appears in a model name header in box 2120.

The user can define the factors for the new model, as detailed below.

By clicking Save, the new model is saved to the server (or elsewhere). By default, the new model may be saved in the Research Library as shown in Models Folders window 2110.

One aspect of the invention is the great flexibility offered to users in defining the factors for a model. For example, FIG. 13 illustrates an example of a screen for defining a model according to one embodiment. According to an embodiment, for each factor that the user may select from, a corresponding tab number is provided. When the user selects a tab, a factor template is displayed in Main Display window 2160. The user may also define Factor Weights in Factor Weights area 2150. For example, a user may assign Factor Weights for a given model for various factors such as one or more of Accuracy, All Star rating, Broker List, Experience, Estimate Age, and other factors attributes or performance metrics (e.g., Accuracy 1 and Accuracy 2, or other metrics). The user may assign relatively greater or lesser importance or weight to a Factor. One mechanism for doing this is sliding scale bars as shown in Factor Weights area 2150. By sliding scale bars to the right (for more importance) or left (for less importance). By assigning a zero weight to a factor, the user can effectively exclude a factor from a particular model.

The factors are elements of a model that enables a user to filter out or place less weight on weak analyst estimates and include or place more emphasis on ones which based on historical data, likely will be more accurate. Factors may be based on known predictors of estimate accuracy. For each factor, the user may define the rules for assigning a value for each factor. For example, the user may define rules for determining relative error percentage with respect to Accuracy 1. In addition, the user may also assign an N-score to each factor. For example, in assigning an N-score to an All Star factor, the user may assign an N-score of 1.00 to an analyst with All Star status while providing 0.25 to an analyst with non-All Star status.

In the example of FIG. 13, the user has defined a model by first assigning a model name (e.g., "Joe") under General tab 2170. The user may specify certain exclusion factors in Exclusion area 2130. For example, various exclusion factor options may be presented to the user. The user can select (e.g., by check box) exclusion factors to be used and can customize each option by specifying user selected exclusion factor criteria on a model-by-model basis. For example, as shown in FIG. 13, the displayed exclusion factors include: (1) estimates that are older than a user-specified number of days; and (2) estimates that are more than a number of standard deviations from the mean. This system may also give a user an option to detect clusters (detailed below). Other exclusion factors may be provided or created by a user. For example, an exclusion may be provided for estimates older than a user-specified amount of time before or after a company's last earnings report date. In the example of FIG. 13, as shown in Exclusions area 2130, the user has selected the exclude days old factor and cluster detection. In the exclude days old factor, the user has specified 100 days as the cut-off. One advantage of the modular nature of the invention is that in creating models a user can view estimate data while creating a model to assist in deciding on user-specified values. In this example, the user has not selected the exclude standard deviations factor in Exclusion area 2130, so it is not used in this model.

Another aspect of the invention is the ability to define and use cluster detection factors. The user may define clusters and cluster factors in Cluster Definition area 2140. A cluster is a grouping of estimates or revisions made by one or more different contributors satisfying certain conditions, e.g., estimates or revisions made within a certain interval of time or other conditions. Clusters can assist users in identifying potentially meaningful trends, changes in conditions, or other occurrences. For example, if a number of analysts suddenly revise estimates, those estimates may be based on recent news. Clusters can be used to help identify more meaningful estimates. Preferably, a user may define the criteria by which the user wants to define a cluster. For example, the user may specify the maximum time between one estimate and another estimate of another analyst for the two estimates to be considered part of the same cluster or cluster candidate. In FIG. 13, for example, a cluster definition template is displayed to facilitate the definition of a cluster. As shown, the time between estimates has been defined as 3 days in Cluster Definition area 2140. Further parameters may be specified by the user in qualifying a cluster candidate as a cluster. For example, parameters may include enabling a user to specify restrictive, qualifying criteria on revisions including the condition that only revisions in the same direction (or any direction) qualify, or that only revisions of at least a user-specified magnitude qualify. In addition, the user may specify the minimum number of new estimates or qualifying revisions that are required to define a cluster. The number of new estimates or qualifying revisions may either be a fixed number of analysts or a variable number of analysts, for example, depending on the number of analysts with active estimates for the event as of the day for which the enhanced composite estimate is being calculated. The user may specify the number of analysts needed to define a cluster as a function of the number of analysts, or a percentage of analysts, following the stock. Further, an exclusion factor may include a user-selectable option to exclude estimates that are older than the date of the last-detected user-defined cluster.

FIGS. 14-18 further illustrate examples of how a user can select factors for inclusion in a model, define rules and N-score criteria for the factor and other features. For example, with reference to FIG. 14, the user may specify various selections associated with a first performance metric, referred to as Accuracy 1, by clicking on the Accuracy 1 tab 2172. The factor's potential components and other information will appear in Main Display area 2160. The user can select details in the text boxes, check boxes, etc. Preferably, a template is displayed including a performance Metric Definition area 2210 and a N-score definition area 2220.

As shown, the Accuracy 1 metric may be used to calculate each analyst's (or source's) average Relative Error % according to user specified criteria. For example, as shown, the user may select: the number and type of fiscal periods (e.g., years, quarters, etc.); the minimum number of periods of coverage for an estimate to be included; and a window of time (e.g., number of months) prior to a report date to limit the estimates to be included for this metric. The algorithm for the average Relative Error % (and other metrics used as factors) may be created and stored in the Performance Module, described elsewhere herein.

Based on these user specified parameters, each non-excluded analyst's average relative error percentage may be calculated. This metric may be converted to an N-score for this factor based on user specified rules as set forth in the N-score Definition area 2220. The N-score area 2220 enables certain analysts to be excluded (or give a zero score for this factor) and allows other analysts to be given a score by error rank.

In this example, an N-score may be assigned by Error Score, Error Rank, equally to all or a user specified number of top qualifying analysts (based on relative error percentage), or other options in N-Score area 2220.

Figure 14:
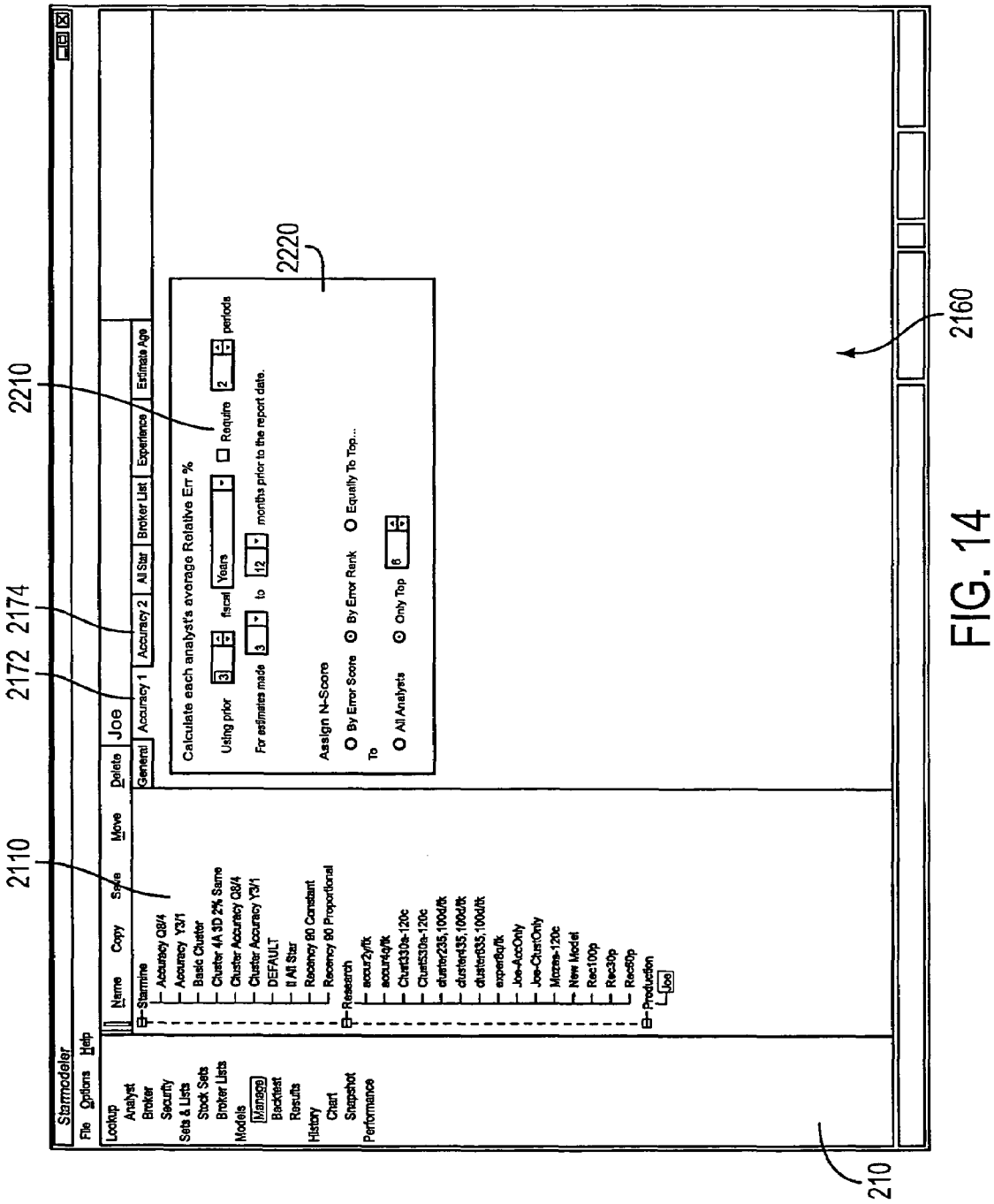
FIG. 14 illustrates an example of an Accuracy factor according to an embodiment of the present invention.

In the example of FIG. 14, a user has the option to use other performance metrics or evaluation parameters (e.g., a second accuracy metric as shown by Accuracy 2 tab 2174. Elsewhere in this application is a description of Performance metrics. One or more of these metrics and other metrics may be used in creating models. Preferably, each has a corresponding tab that when selected displays a template similar to that shown in FIG. 14 but customized for the particular metric.

Figure 15:
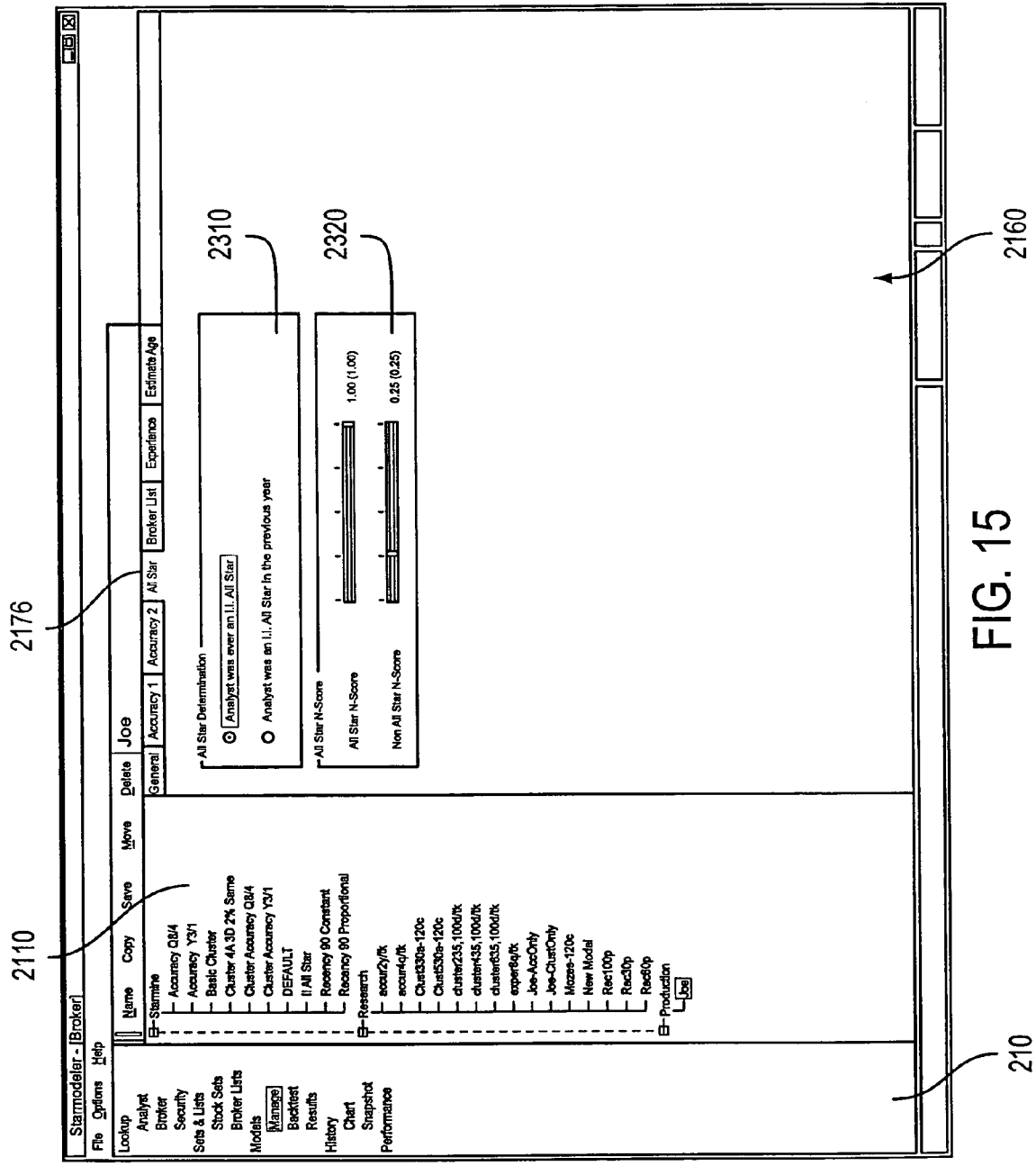
FIG. 15 illustrates an example of an All Star factor according to an embodiment of the present invention.

In addition to performance metrics, a model may include one or more analyst and/or broker attributes. Examples of such attributes may include All Star qualification, Broker List affiliation, Experience, and Estimate Age. Other attributes that may bear on estimate performance may be used. As shown in FIG. 15, for example, a user may include as a Factor Weight an All Star (or other) rating, by selecting All Star tab 2176. An All Star rating is a known rating given to some analysts by Institutional Investors based on a published analyst survey. If this factor is used, in All Star Determination area 2310, the user may specify the criteria relating to an All Star rating. As shown, the criteria may include whether the analyst was ever an All Star or whether the analyst was an All Star the previous year. Specific N-score may be assigned to All Stars and non-All Stars based on the parameters selected in All Star N-Score area 2320. For example, analysts meeting the All Star criteria specified in All Star Determination area 2310 may be given an N-score of 1 for this factor and those not meeting the criteria may be given a lower score (e.g., 0 or 0.25).

Figure 16:
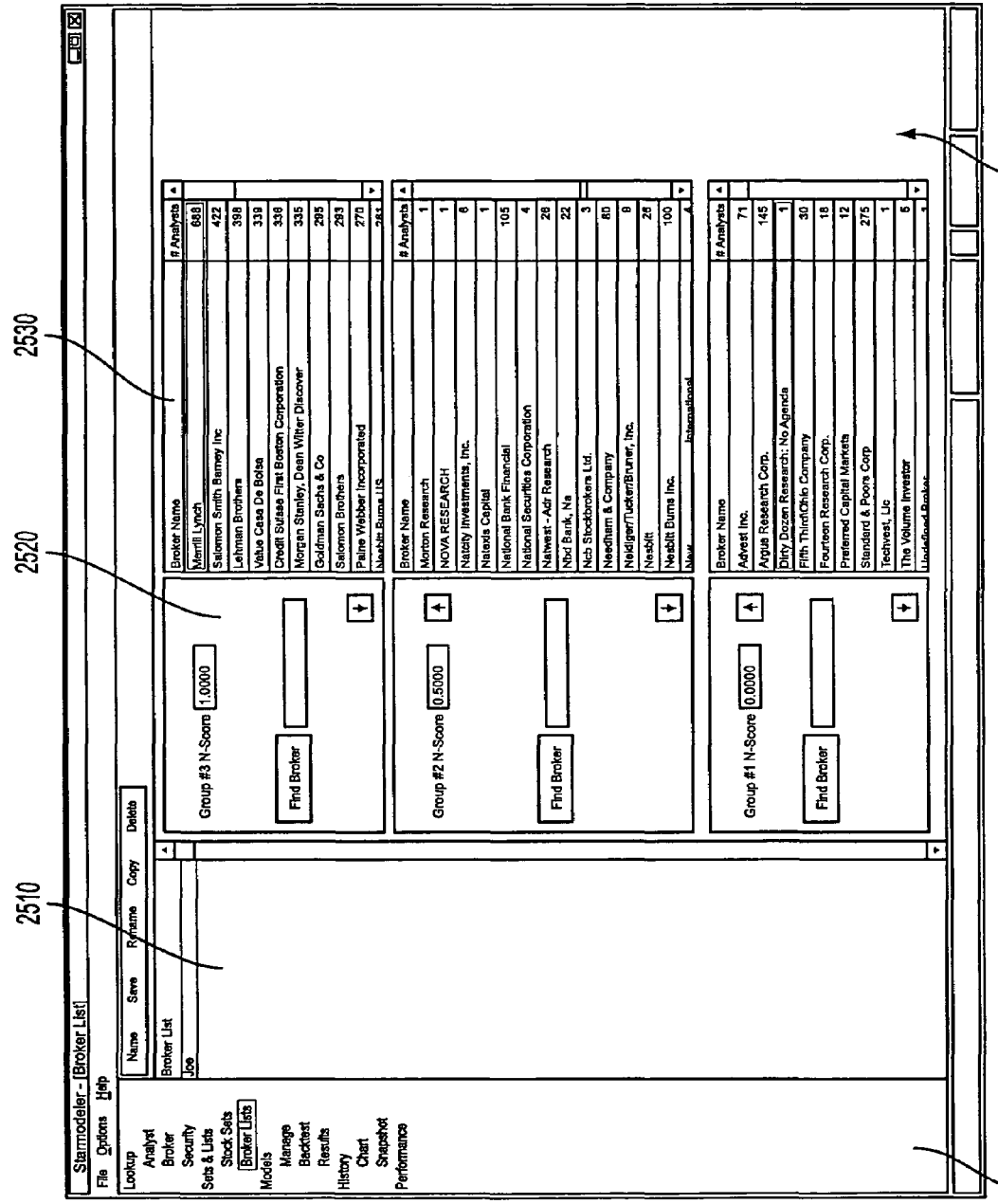
FIG. 16 illustrates an example of a Broker List factor according to an embodiment of the present invention.

As shown in FIG. 16, the user may include a Broker List factor in a model by selecting Broker List tab 2178 (FIG. 13). The Broker List attribute takes into account attributes of a particular broker (e.g., a broker with whom an analyst works). As shown, a user may create and store multiple broker lists (e.g., in Broker List Folders area 2510). Each broker list includes a list of brokers selected by a user, grouping criteria for grouping brokers in the list of brokers and rules for assigning an N-score to each group. A user may divide broker lists by size, reputation, historical accuracy, affiliation with a stock (e.g., market maker, etc.), or other criteria. FIG. 16 illustrates a Broker List definition screen including Broker List Folders area 2510 from which a user may select a broker list or to which a newly created list may be saved. In Group N-Score area 2520, the user may designate N-score values for each group. In Broker Name/Info area 2530, the user may view the brokers and other information (e.g., size, status, historical metrics, etc.). User specified rules may be created to group brokers or it can be done manually. Other techniques may also be used. In the example of FIG. 16, the brokers in Group #3 are assigned an N-score of 1.000, the brokers in Group #2 are assigned an N-score of 0.5000, and the brokers in Group #1 are assigned an N-score of 0.0000.

For example, larger brokerage firms or firms with better reputations may be classified in Group #3 and given a higher N-score. The user may assign N-scores to each broker or group of brokers and store the set of N-scores in a broker list for use in other models.

Figure 17:
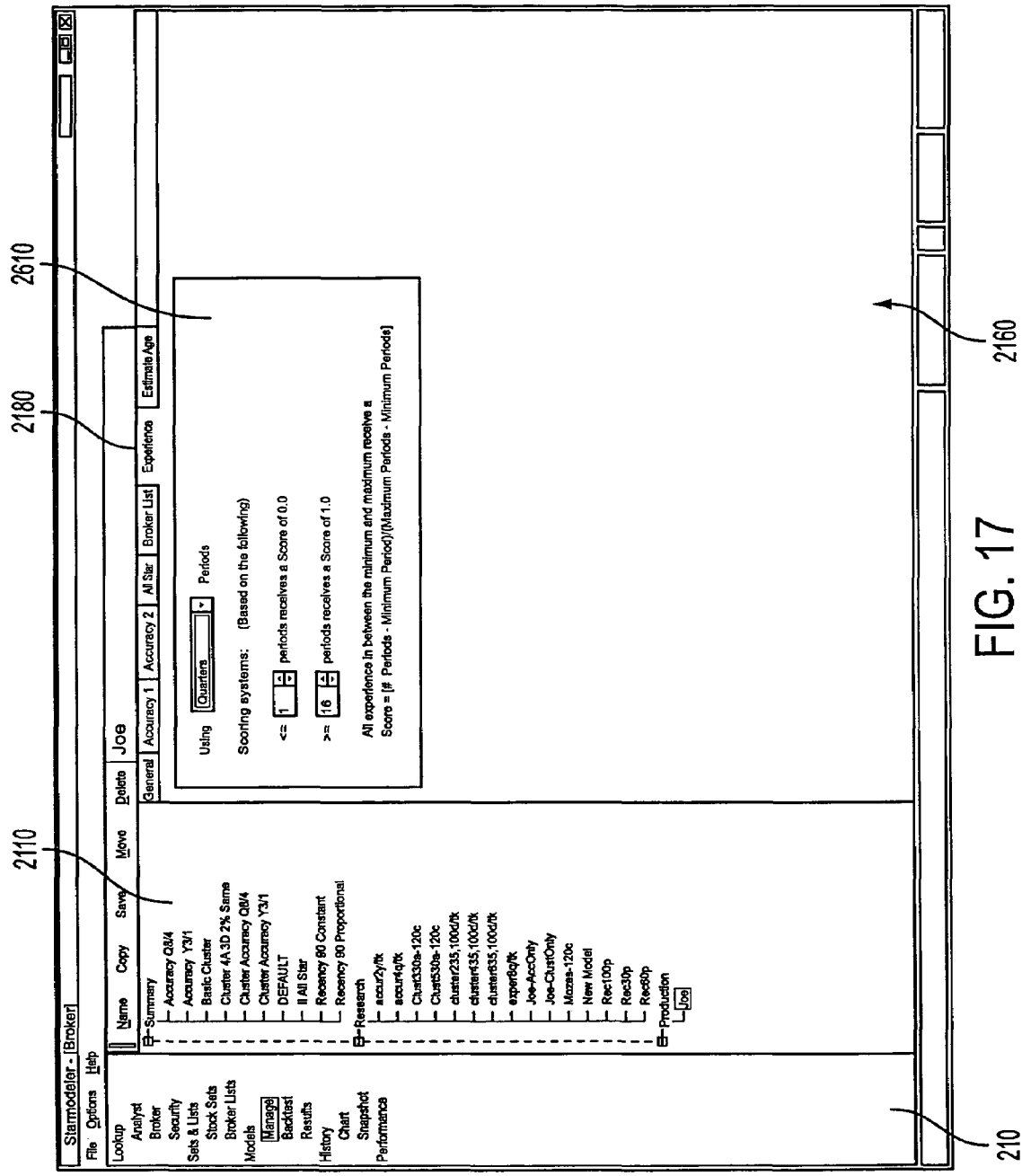
FIG. 17 illustrates an example of an Experience factor according to an embodiment of the present invention.

Another factor that may be used in creating a model is an analyst's experience (generally, with a particular stock, within a particular industry or other criteria), by selecting Experience tab 2180 (FIG. 13). As shown in FIG. 17, through Experience Definition area 2610, the user specify rules and criteria to assign an N-score to analysts based on the analyst's experience. For example, the score can be based on a designated period type, such as number of years or quarters for which the analyst has made estimates for a particular security. For example, the user may define a scoring system based on the amount of time an analyst has followed a stock, whereby if an analyst has estimates for less than a first selected number of periods, the analyst receives a score of 0.0 for this factor and if the analyst has estimates for greater than a second selected number of periods, the analyst receives a score of 1.0 for this factor. Optionally, analysts with experience between the first and second numbers of periods may be assigned a pro-rated score. For example, the N-score for each analyst may be defined as using the following formula:

N-score=(#Periods−Minimum Periods)/(Maximum Periods−Minimum Periods).

In this case, the #Periods is the number of periods for which the analyst has covered the stock, Minimum and Maximum periods correspond to the first and second user-selected number of periods. Other functions for converting the number of periods of analyst coverage for a security into an N-score for the contributor experience factor for each analyst may also be used.

Figure 18:
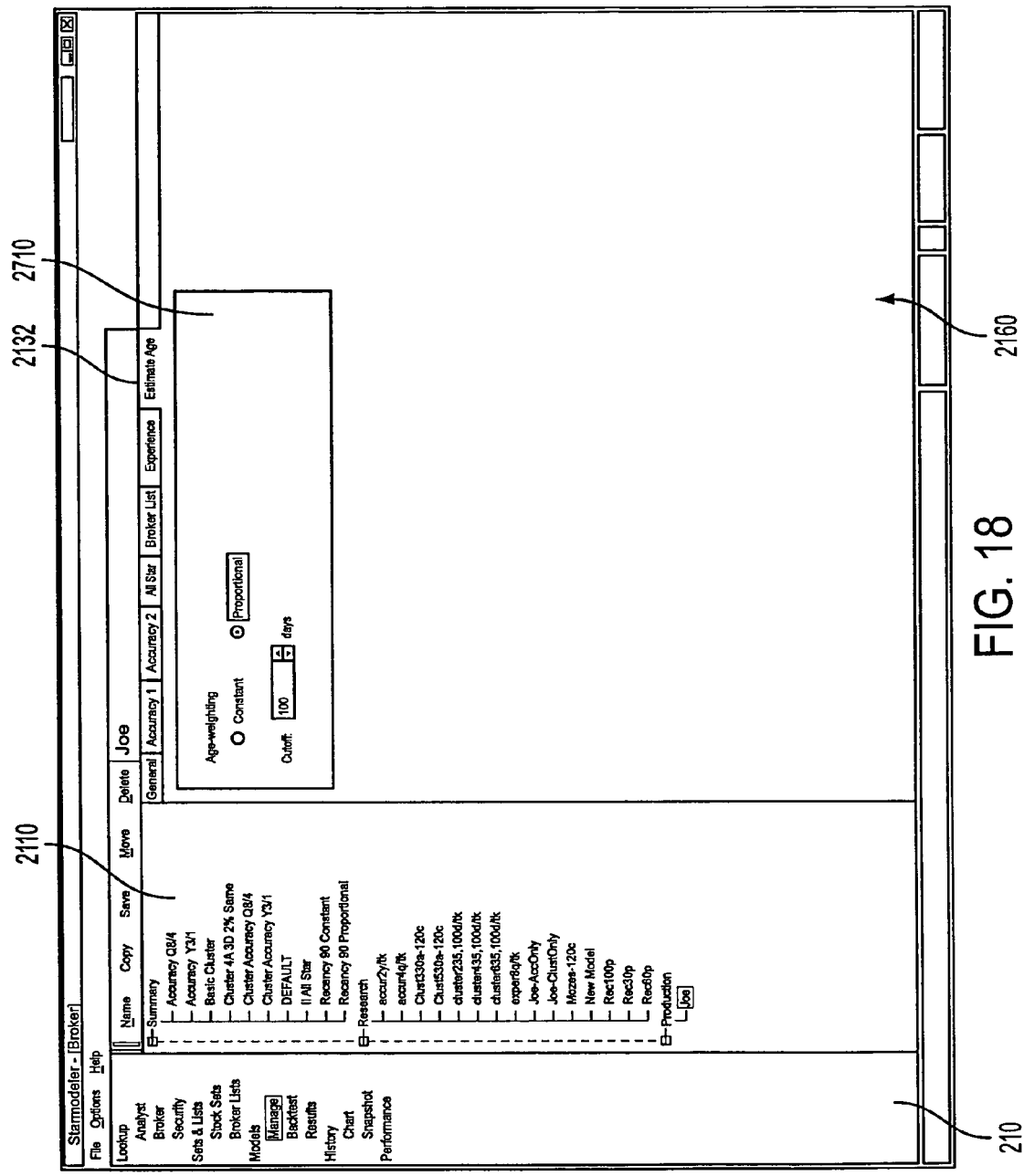
FIG. 18 illustrates an example of an Estimate Age factor according to an embodiment of the present invention.

As shown in FIG. 18 the user may include Estimate Age (or recency) as a factor, by selecting Estimate Age tab 2182. For example, a recency factor may exclude estimates from earnings calculations if they are older than a specified number of days. This may be based upon the assumption that a more recent estimate is likely to be based upon relatively new and accurate information which may affect a company's earnings potential and, therefore, is more likely to be predictive of a company's actual earnings. When applying the model with the recency factor to historical data, the resulting estimate typically is more accurate in predicting a stock's earnings because it has excluded old, less reliable, estimates. Age-weighting may be defined as constant or proportional with a user-defined cutoff in Estimate Age area 2710. Thus, the user may filter out estimates that are older than the number of days specified. By choosing constant age weighting, the same or similar weight is given to all non filtered estimates, for this factor. By choosing proportional age weighting, less weight may be assigned to older estimates on a sliding scale.

Other factors may be assigned user-defined weights for more accurate results. For example, a leadlag score factor may be assigned a weight by the user. The leadlag score factor is the number of leading estimates minus the number of lagging estimates over the total estimates. The scoring system may involve assigning a score of 0.0 or 1.0 depending on whether an analyst's leadlag score is lower or greater than a user defined number. In addition, the mean time between revisions may be included as a factor. This factor filters out estimates of analysts who revise estimates infrequently or relatively infrequently compared to other analysts. For example, an analyst with a mean time between revisions of less than 80 days may receive a score of 1.0 while an analyst with a mean time between revisions of more than 120 days may receive a score of 0.0.

A user may specify adjustments to be made to one or more non-excluded estimates, where the adjustments are based on one or more factors, such as historical analyst bias, historical aggregate analyst bias as a function of time prior to period report date, analyst's firm's relationship with the security's issuer, the security's historical performance relative to consensus estimates, or other factors.

Based on the historical information for each analyst, an adjustment factor may be calculated. The adjustment factor may represent an analytical "bias" which may or may not be incorporated into each analyst's earnings estimate, for a particular security, over a given period of time. For example, an analyst who has, over a specified time period, issued earnings estimates for a particular company that were, in hindsight, on average 5% too high, might be assigned an adjustment factor of 0.95, such that the analyst's issued estimate over the specified time period is reduced by five percent. Conversely, an analyst who has historically issued estimates over a specified time period that were, in hindsight, on average too low might be assigned an adjustment factor of 1.10 for that performance analysis set, such that his actual reported estimate for that time period is effectively increased by ten percent.

Although the adjustment factor calculated for any given performance analysis set may be stored in the system's database, adjustment factors may be generated in real time in response to user-defined inputs. As indicated above, the calculation of an adjustment factor may be based, at least in part, upon a comparison of the historical earnings estimates issued by an analyst, for a given security followed by that analyst, over a particular time period. A user may define analysis parameters and metrics such that the determination of an adjustment factor may take into account an analyst's historical percentage error as compared to actual earnings, generally available consensus earnings estimates, custom composite adjusted earnings estimates, or other metrics.

The user may also assign a scaling factor to be applied in the calculation of the adjustment factor for a given performance analysis set. For example, a user may define a performance analysis set such that, for that analysis set, a particular analyst is shown to have issued estimates that were on average 20 percent greater than actual earnings. The user may then assign a scaling factor, such as 0.5, to be multiplied by the 20 percent error. Thus, the effective adjustment factor for that user-defined performance analysis set reflects a 10 percent and not a 20 percent adjustment-i.e., an adjustment factor of 0.9, rounded to the nearest tenth. Thus, in this particular example, the user "discounted" the analyst's earnings estimate bias as indicated by the system's calculations. A formula for the calculation of the adjustment factor is set forth below:

[1/(1+(Error metric*Scaling factor))]

The adjustment and weighting factors described above may be used alone or together to calculate a custom composite estimate to arrive at a more accurate estimation of a company's earnings. According to one embodiment, a custom composite estimate is calculated by multiplying an analyst's current earnings estimate (for a given security, and event) by its corresponding adjustment and weighting factors for that given performance analysis set. The results for each estimate for each analyst of interest may then be summed to arrive at the custom composite estimate. Thus, the calculation of a custom composite estimate provides investment managers and others with an improved method for determining the accuracy of an analyst's earnings estimates and predicting the actual earnings of a company over any given period of time.

Under the Models/Manage module, the user may perform managing functions to maintain models. Such managing functions include for example, saving, copying, editing, moving, and deleting models.

The user can save models using commands in the Models/Manage module.

The user can use the Save function to save changes in an existing the model, or save new models. To save a model:

1. From the Navigator 210, the user can select Models/Manage.

2. The user can select a model from Models Folder window 2110, or create a new model.

3. The user can create a new model or make the desired changes.

4. The user can click Save on the menu bar to save the selected model to a desired folder.

Models may be stored on a server so that authorized colleagues and other individuals may access these models. When a user runs a model against the historical database, the server applies the factors to the estimates specified by the user and produces an estimate based on the model. In addition, once a model has been designed, the user may apply the model to a range of stocks, such as a defined stock set. The user may then be provided with a full listing of performance metrics for analysis of the model's accuracy. Because historical data where the actual earnings are known is being used, accuracy is easily determinable.

In another embodiment of the invention, once one or more models are created, these models may be backtested against historical data. Resulting performance analysis sets and corresponding custom composite estimates may then be stored in the system's database for later retrieval. In this way, a user may test such models by applying them over any previous time period, thereby essentially creating a "virtual analyst" whose hypothetical prospective performance may be compared with the historical performance of a single or plurality of analysts, or even the average historical consensus estimates for any previous time period. By conducting such tests a user may refine a model to better predict earnings.

The backtesting capability verifies a model's viability against a range of stocks, analysts, and historical periods. The backtesting capability enables the user to measure the estimating performance of one or more models by calculating an extensive range of error metrics for the model. Over specified time periods and individual or groups of stocks, the user may measure the accuracy of the model using relative error percentages and by a variety of additional metrics. When performing a backtest, the present invention calculates what the estimates would have been at each sampling point in time against the stocks in the user's set, calculates the error metrics, then presents the results in grid format so that accuracy, consistency, and availability may be easily assessed, compared to each other and compared to the calculated average of the then-current estimates.

Figure 19:
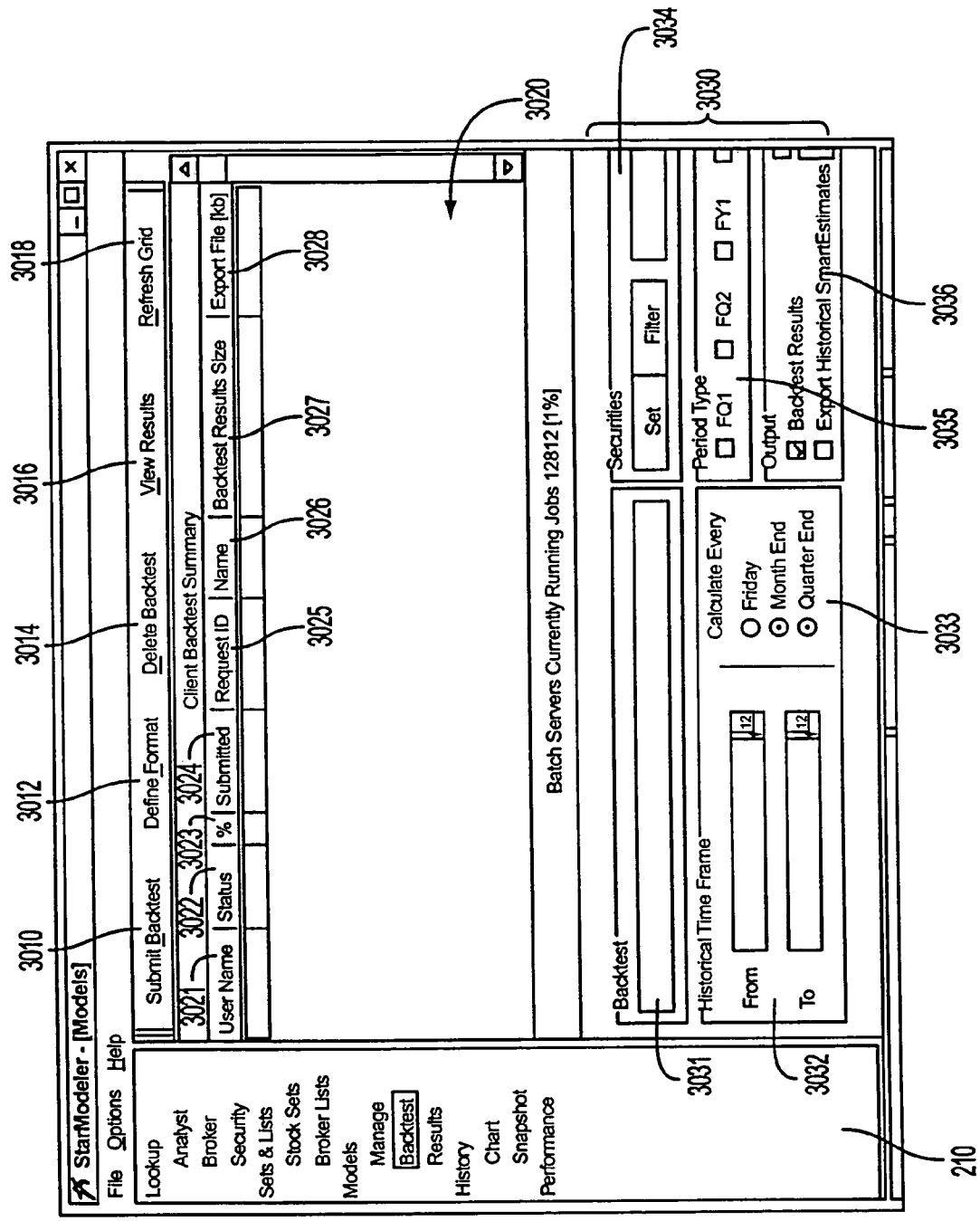
FIG. 19 illustrates an example of a Models/Backtest module according to an embodiment of the present invention.

With reference to FIG. 19, the backtester provides details about what models the user wants to test, on which stocks, and over what historical time frame. Other criteria may also be specified. Once a user has created a model and stock sets to test them against, the Models/Backtest module may be used to submit the models for testing on the server using the historical database. Testing may be a batch operation at system location so each job will be queued with others. The grid in this screen shows the user the progress of the job and status of the batch server. Test results are saved on the server. To download the results, the user may select a test row and click View Results.

In FIG. 19, a user may run a backtest by selecting Models/Backtest module from Navigator 210. Various options are available to the user. For example, the user may select Submit Backtest 3010, Define Format 3012, Delete Backtest 3014, View Results 3016, Refresh Grid 3018, and other options. Backtest Summary area 3020 displays backtest information such as the name of the user who has submitted the test in User Name column 3021, the status of the job in Status column 3022, percentage of the job that is completed in % Completed column 3023, date and time the job was submitted in Submitted column 3024, an identifier assigned by the server to the job in Request ID column 3025, the name assigned to the particular backtest in Name column 3026, the file size (e.g., in KB) of the backtest in Backtest Results Size column 3027, and if the export option was used, the size of the TXT file created for export in Export file column 3028. Other information may also be available.

Backtest Summary area 3030 provides details about the currently selected backtest. This area may be read-only. To resubmit a backtest with changes, the user may right click on the backtest name and select Resubmit. The Backtest Summary area 3030 provides the information such as the backtest name in bar 3031, Historical time frame in area 3032, how often the backtest is calculated in area 3033, and the stock set or filter used, if any in area 3034. In addition, the period type in area 3035, output details in area 3036, and other information are displayed.

Figure 20:
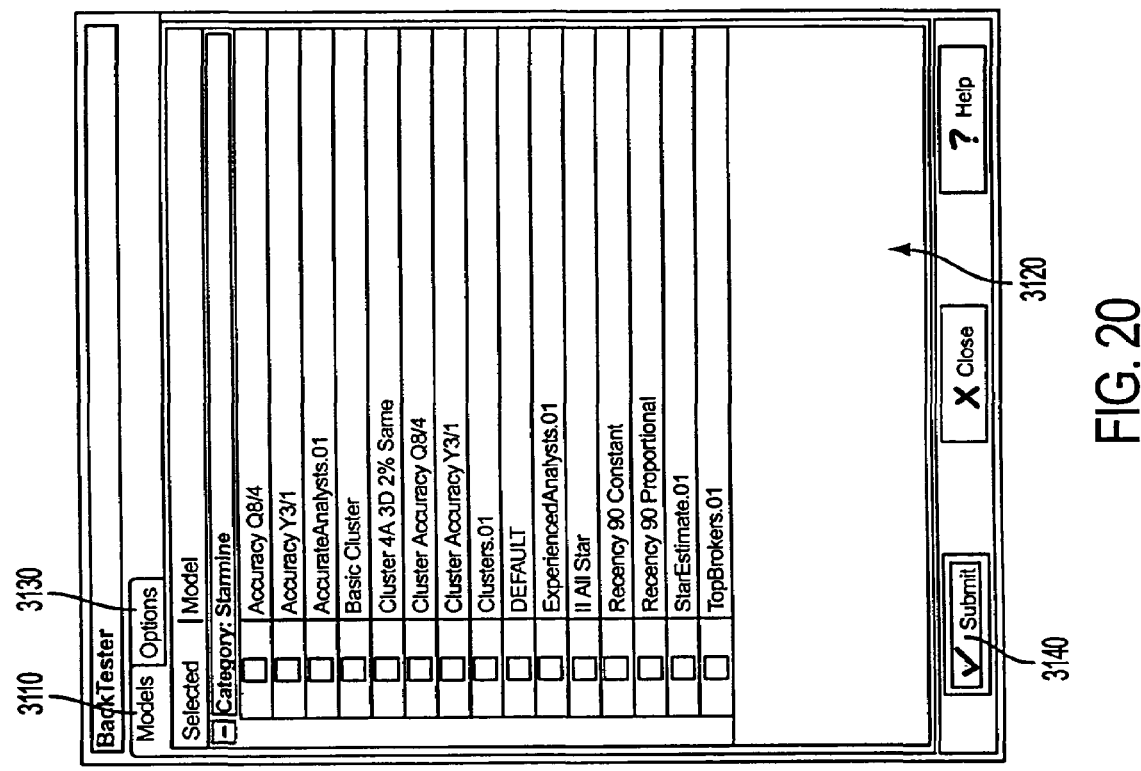
FIGS. 20-21 illustrate an example of a Backtester according to an embodiment of the present invention.
Figure 21:
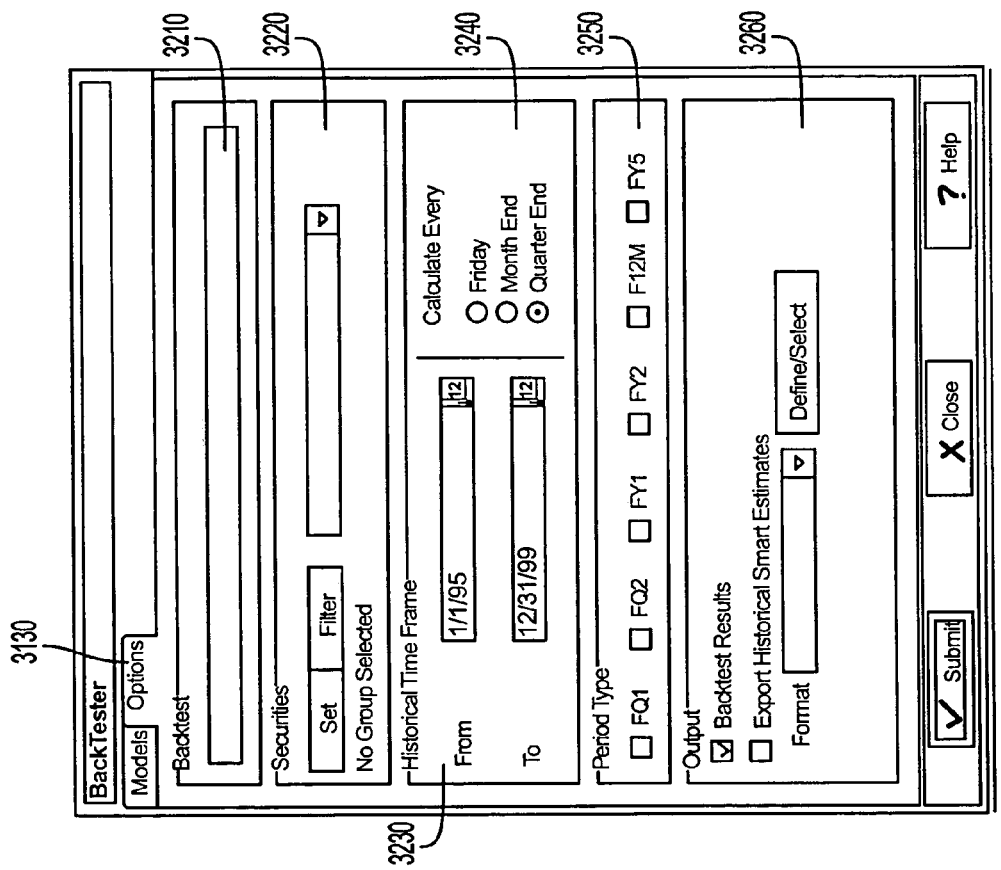

To run a backtest, the user may select Submit Backtest 3010 to display Backtester screen as shown for example, in FIG. 20, where the user may enter parameters of the test. Under Models tab 3110, the user may select the model to backtest in Backtester display 3120. By selecting the Options tab 3130, an Options screen as shown in FIG. 21 will be displayed. The user may enter a name for the backtest in Backtest bar 3210. If a name is not entered, the system will create one. In Securities area 3220, the user may select a stock set or filter to be used in the backtest. In Historical Time Frame area 3230, the user may specify the range of the backtest. In Calculate Every area 3240, the user may select how frequently the error statistics are to be sampled. The backtester will calculate enhanced composite estimates between the time frame identified in Historical Time Frame 3230 for every "As Of Date" on Friday, the calendar month end, or the calendar quarter end, or other period. In Period Type area 3250, the user may select the fiscal period type for the backtest. At a given "As Of Date", the backtester can create enhanced composite estimates for the next reported fiscal quarter after the "As Of Date" (FQ1), the next reported fiscal quarter after FQ1 (FQ2), the next reported fiscal year after the "As Of Date" (FY1), the next reported fiscal year after FY1 (FY2), other period types or period aggregations may also be available. In Output area 3260, the backtest results may be automatically stored in the server. When the user chooses to review the results, the results are automatically copied to the data directory on the user's workstation. The user may create a tab- or comma-delimited flat file for analysis by the user's own software by selecting the Export box in Output area 3260. This enables the user to further analyze the data in spreadsheet, database, or other software applications. The user may click on the Define/Select button to bring up a Field Specifier window, where the user may select the fields and format for an export file of backtest results.

Returning to FIG. 20, after the user has specified the parameters of the backtester under Models tab 3110 and Options tab 3130, the user may click the submit button 3140. The backtest parameters and data are then submitted to the server. When the test has been run, a Complete message will appear under Status column 3022 when the test is complete. The user may view the test results by right-clicking on the test summary row in Backtest summary area 3020 (FIG. 19).

Figure 22:
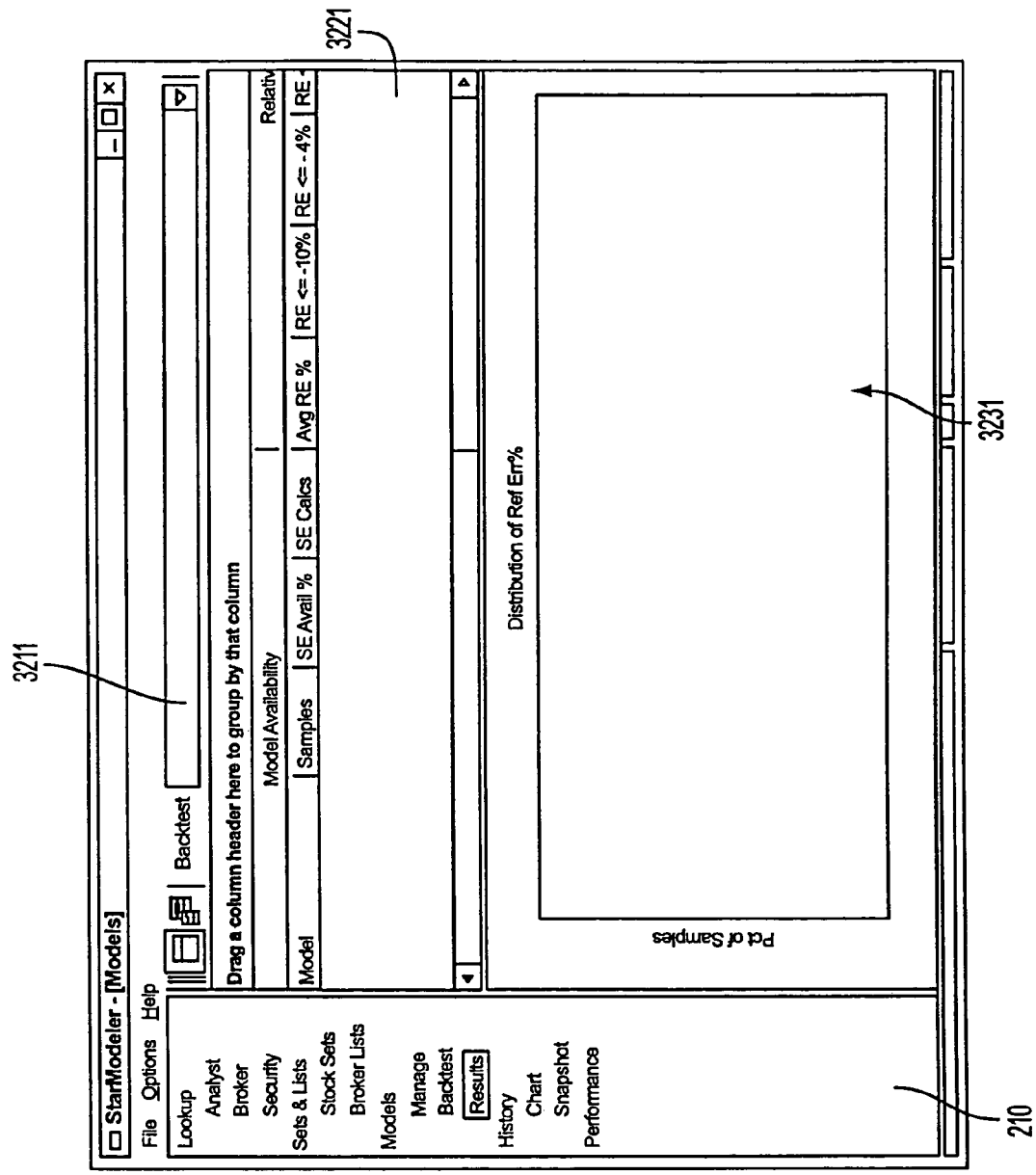
FIG. 22 illustrates an example of a Models/Results module according to an embodiment of the present invention.

To view the results of a backtest, the user may select Models/Results module in Navigator 210. In another example, the user may select View Results 3016 from Models/Backtest module as shown in FIG. 19. The name of the backtest is displayed in Backtest box 3211 (FIG. 22). From a View Format drop down list (not shown), the user may select viewing options of the results. For example, the user may select Summary Form where summary information of the models and data are displayed. The user may select to view the results by model which groups the results by model with lists of securities and data. The user may select to view the results by stock where the stocks are grouped with lists of models and data. The user may view the results in an ungrouped format which provides a sortable list of models and stocks. In Data area 3221, the user may view result information regarding Model Availability, Relative Error %, Outlier Performance, and other information. For example, under Model Availability, the user may view Number of samples, Estimate Availability, Number of Estimate Calculations, and other information. Under Relative Error %, the user may view the Average Relative Error Percentage and the percentage of model samples that have a Relative Error % in a defined range (e.g., less than or equal to −10%). Under Outlier Performance, the user may view the percentage, number of model samples where the estimate is 0.5 standard deviations from the mean and of these samples, the percentage that were eventually closer to the reported earnings than the mean. Other information may also be displayed. The user may also view the results in a chart format in Distribution chart 3231 which shows distribution of the current stock's or model's error metrics.

To find out quickly whether the user's new model is more accurate than the consensus, the user can test it against historical data for a single stock and compare its accuracy with the consensus in the History Chart.

Figure 23:
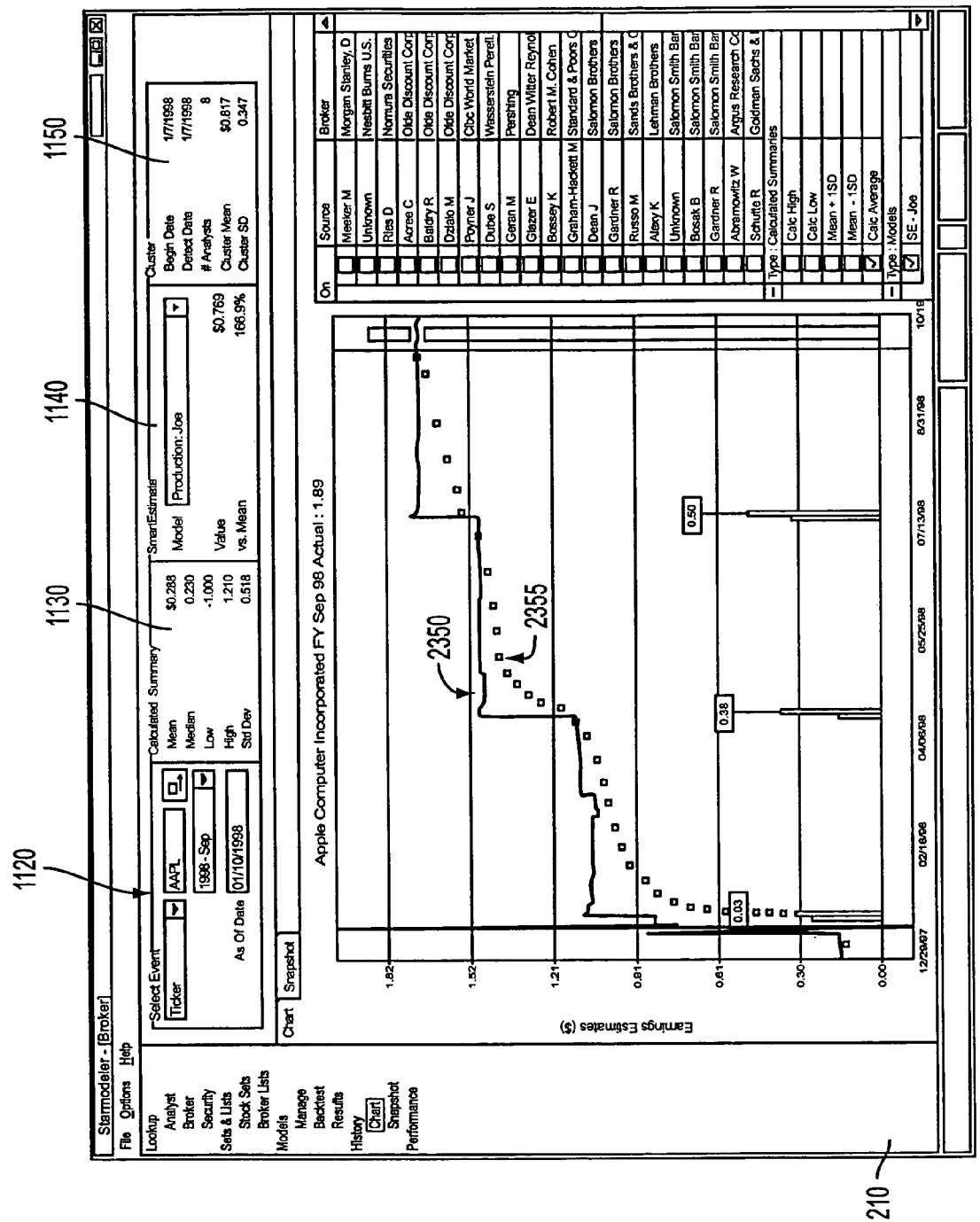
FIG. 23 illustrates an example of a model applied to historical data according to an embodiment of the present invention.

The present invention enables a user to visually test a model as applied to historical data. FIG. 23 illustrates a model applied to historical data. In this example, the user has selected "Production: Joe" as the model, as shown in Model Selection area 1140. The results of the model as applied to the time frame indicated by the chart are shown in a designated color (the bolder line 2350 in FIG. 23). The user may compare the model with the calculated average (shown as line, or other estimate, shown in the chart by a different color (the lighter line 2355 in FIG. 23). Although the two lines are similar in trend, appearance and final estimate, the model as applied to the historical data provides valuable information to the user. For example, the model as applied to the historical data shows increases (or jumps) in estimates before the increases in the calculated average. In other words, the model leads the consensus in estimate increases. In the example of FIG. 23, the model estimate jumped to 1.50 close to Apr. 6, 1998 while the calculated average estimate jumped to 1.50 close to Jul. 13, 1998. Similarly, the model estimate jumped to 1.65 shortly after Jul. 13, 1998 while the calculated average estimate jumped close to October, 1998. Thus, estimate and prediction information may be made available to the user several months in advance.

When developing a model, the user may chart its estimate record for any stock's historical data and find out instantly if the model is outperforming the consensus. By examining the chart lines closely, weak areas in the model may be detected. The user may then go back and refine the model, and chart again.

In another embodiment of the invention, alert services may be available to users. A user may define alert conditions and parameters to enable the system to inform the user of the occurrence of events and conditions. For example, when a model is applied and an estimate exceeds the calculated average, or other factor, by a user-defined amount, the user may receive an alert or notification of such an event. Alert criteria may be entered by the user; selected from a list of possible conditions; created and defined through the use of templates and filters or any combination thereof. Alert duration may also be defined where the user may select a time period of activation. For example, the user may select to activate a particular alert for one fiscal quarter or for different fiscal periods within a fiscal year.

At the occurrence or fulfillment of user defined conditions and parameters, the system of the present invention may process the user defined alerts and inform the user through various mechanisms. For example, alerts may be sent to the user by wireless communication (e.g., electronic mail) or other mechanisms. Other modes of communication may include cell phone, fax, PDA, and Internet. The present invention when applied to stock estimates may serve to alert and inform the user of events that may persuade a user to purchase or sell a particular stock. According to one embodiment, a web site operator using the software of the present invention may offer a subscription service based on issuance of alerts. Other uses may be made of the enhanced composite estimates.

Figure 24:
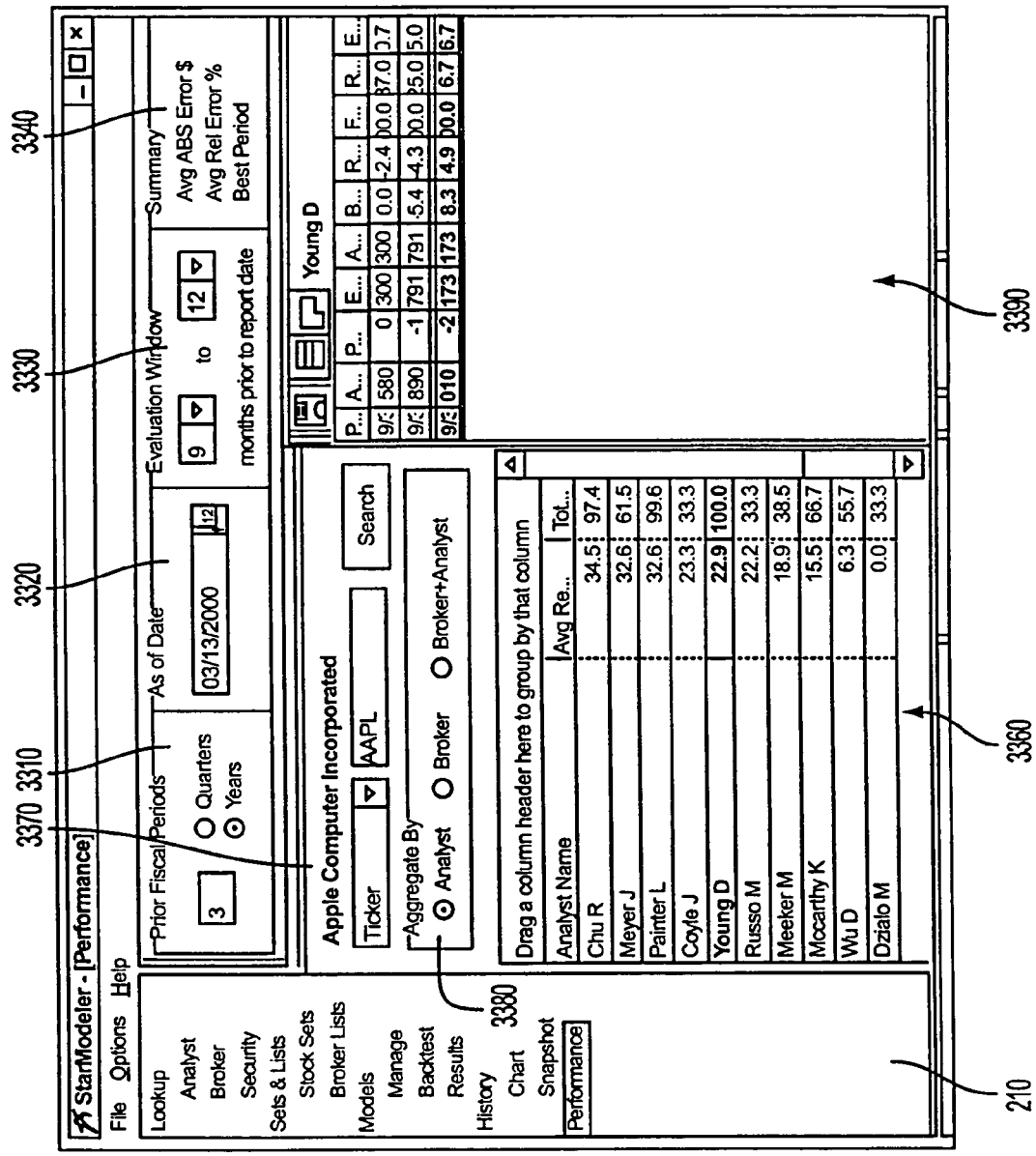
FIG. 24 illustrates an example of a Performance module aggregated by Analyst according to an embodiment of the present invention.

With reference to FIG. 24, the performance module enables a user to measure and compare analysts' performance, in absolute terms, and relative to other analysts, in estimating stock earnings. This feature is particularly useful when a user wants to determine how well the analysts in a brokerage house are doing, or which analyst has the best performance for a ticker, industry or other stock set. The performance module also provides error metrics in summary and detailed form for the analyst whose performance is being measured. The error metrics may include, for example, a raw error metric, a relative error metric, a bias error metric, a user-defined error metrics and other metrics.

A user can search by analyst or company (by ticker, company name, CUSIP, or unique ticker), and aggregate by ticker, broker and broker/ticker—or analyst, broker, and broker/analyst, respectively. Results may be displayed in a grid containing various error metrics and may further be sorted by any column head with a click on the title. The graphic display of performance may be shown on a color chart.

A hierarchical sorting facility lets a user group summary or detail search results. Detail search results can be saved for further analysis.

An overview of FIG. 24 is described below.

1. From the Navigator 210, the user can select the Performance module.

2. From Search area 3370, the user can select a security for which to search. In this example, the user has elected to aggregate results by analyst.

3. If desired, the user can update search criteria at the top of the screen: Number and type of prior Fiscal Periods in Periods area 3310, "As Of Date" in Date area 3320 and a time frame in Evaluation area 3330. The invention will update the Summary Grids 3360 based on the new criteria. For the selected "As Of Date," summary metric details will appear at Summary area 3340.

4. The user can aggregate the findings in Aggregation area 3380 by selecting Analyst, Broker, or Broker+Analyst. The Summary Grid 3360 will update accordingly.

5. The user can select an analyst (e.g., D. Young) for further study in Data Screen 3390. The user can examine the detailed calculations that created them. Details behind selected summary calculations appear in Data Screen 3390. The user can rearrange the detail grid by moving its column headings. The user can right-click on a detail line for further options.

A user can aggregate the summary information by analyst, broker, or a combination of the two. When a user selects a summary line (e.g., an analyst), a complete range of error metrics is displayed in the Data Screen 3390 for further analysis.

One example of the significance of the aggregation feature is typified when an analyst switches from one brokerage firm to another. If a user selects to aggregate by analyst, all of the analyst estimates, regardless of which brokerage team the analyst is affiliated with at the time the estimates is made, may be sampled. In other circumstances, a user may wish to aggregate by broker, particularly if the user is trying to discern any pattern or trends with respect to broker bias with respect to a particular security. The ability to aggregate by broker/analyst pair is also a useful and powerful tool in that users may determine different historical performance characteristics for a particular broker/analyst pair. For example, if a particular analyst moves from one brokerage to another, any institutional bias that creeps into the analyst's estimates may be more readily discerned.

Figure 25:
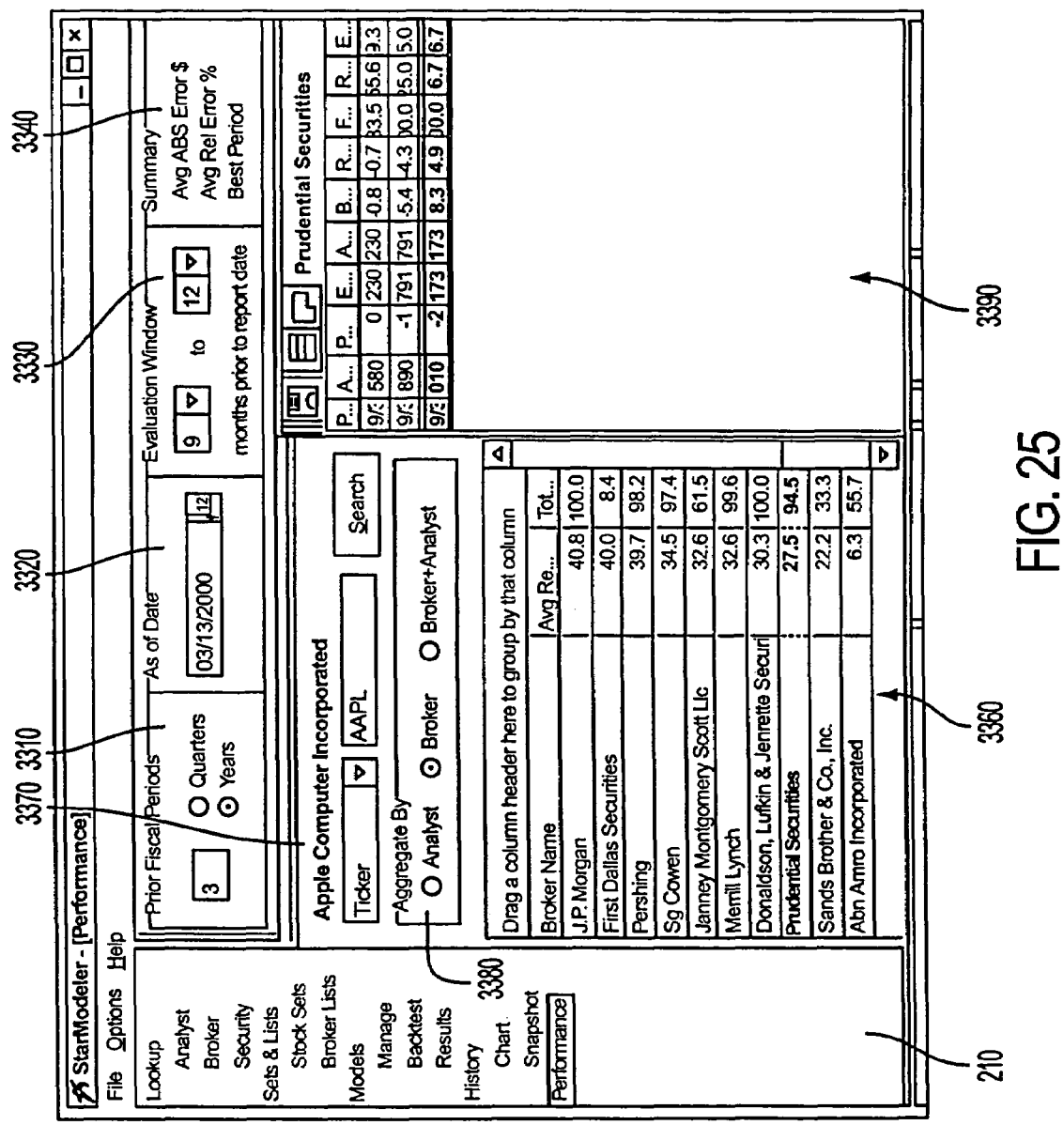
FIG. 25 illustrate an example of a Performance module aggregated by Broker according to an embodiment of the present invention.
Figure 26:
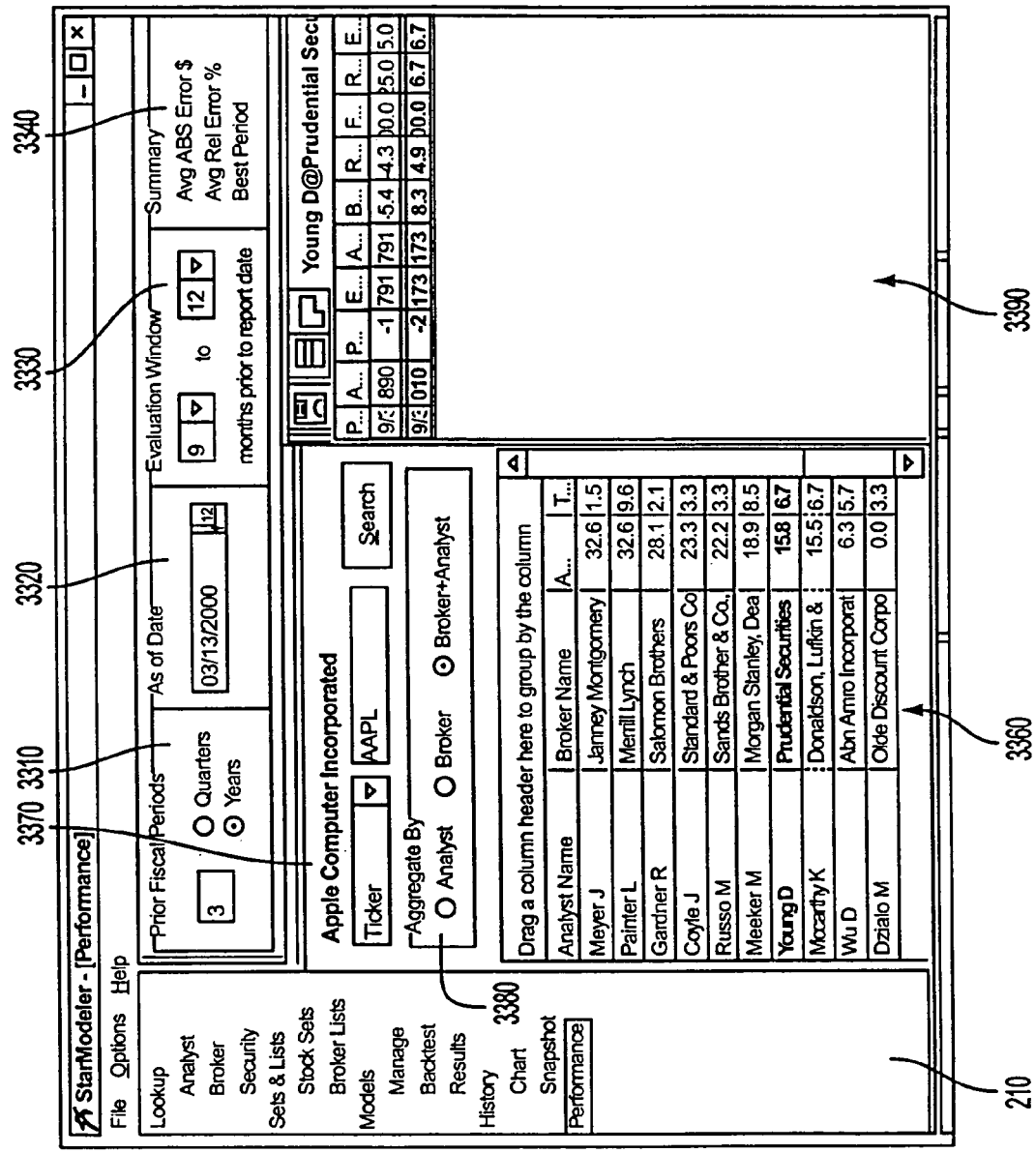
FIG. 26 illustrate an example of a Performance module aggregated by Broker and Analyst according to an embodiment of the present invention.

FIGS. 24-26 illustrate examples of performance screens and historical performance data where data related to the selected ticker or analyst may be aggregated by analyst (FIG. 24); broker (FIG. 25); or broker and analyst combination (FIG. 26). Other views are also available. By selecting the Performance module in Navigator 210, the user may view the performance of particular analysts, brokers, and other combinations. For example, the user may select a particular security (e.g., as shown AAPL) in Search area 3370. To provide great flexibility in the type and amount of data viewed, the user may select the number and type of fiscal periods to be analyzed as well as the type of fiscal periods, such as quarterly estimates or fiscal year estimates, in Periods area 3310. The user may select the "As Of Date" in Date area 3320. Other options may be applicable to other securities.

The number of prior fiscal periods enable a user to specify over how many periods the data should be viewed prior to the "As Of Date." For example, the user may set the numbers sufficiently high to enable a meaningful sampling of periods. However, the flexibility provided enables the user to review as many or as few periods as desired. The "As Of Date" enables the user to specify a cut-off period for an individual performance analysis.

Another useful feature that provides flexibility is the Evaluation Area 3330. A user may elect the time frame prior to the reporting dates over which to view data. In the example shown, the evaluation area goes from a beginning date selected by the user of 9 months to an end date selected by the user of 12 months. Therefore, in this case, estimates from 9 to 12 months prior to the report date will be analyzed. This enables a user to analyze performance by selected time bins to see if some analysts are more accurate farther out or closer in to when earnings are reported.

The user may view summary data information in Summary area 3340. This information may include, for example, Average Absolute Error, Average Relative Error percentage, and other relevant summary information. A Summary Metric box (not shown) may enable a user to select summary metrics to be displayed (e.g., it may be set to Relative Error percentage).

Once the user has selected the number and type of fiscal quarters, the "As Of Date," a ticker and the aggregation method, various types of information may be displayed, preferably on a single screen. For example, as shown in FIG. 24, each analyst with estimates satisfying the criteria specified by the user for a given security are displayed in Aggregation Display 3360. In the performance view shown, out of the list of analysts displayed, a user may select one to obtain more detailed information in Aggregation Display 3360. For example, in FIG. 24, analyst "The Young D" is selected, as shown highlighted. As a result, the detailed data for "The Young D" is simultaneously displayed under a Data Screen 3390. Various fields and types of information displayed in association with the analyst's name may be user specified, such as Period End Date, Actual Reported Earnings/Share, Period Number, Error in Dollars, Absolute Error in Dollars, Bias Error Percentage, Relative Error Percentage, Analyst's follow percentage for the selected ticker, Relative Error Percentile, Error Percentile, and other information. As shown, the period end date, the number of previous periods, earnings information (e.g., actual) in various performance matrix.

In FIG. 25, the user may elect to aggregate by broker in Aggregate area 3380. A list of brokers for the selected ticker is displayed in Aggregation Display 3360. By selecting a broker, detailed data for that broker is displayed in Data Screen 3390. In FIG. 26, the user may elect to aggregate by broker and analyst pair in Aggregate area 3380. A list of broker and analyst pairs for the selected ticker is displayed in Aggregation Display 3360. By selecting a specific pair, detailed information for that pair is displayed in Data Screen 3390.

Some advantages of the features discussed above are that it enables a user to view performance data over one or a number of periods. When viewing performance over a number of periods, the user may view aggregate metrics over those periods and/or metrics on each period individually. Thus, if a user desires to view for one stock the multiple contributors, the user can select the stock and see each contributor (analyst, broker or analyst/broker pair) who has estimated earnings for this stock in the selected fiscal periods (e.g., the last 3 fiscal years). Alongside each contributor is summary or aggregate performance measures. If the user clicks on one of the contributors for selected stock, the graphical user interface displays the contributor's period by period performance for that stock for each of the periods in the designated set of periods.

When displaying a list of contributors who have published estimates for a stock over the given time period and time frame (e.g., contributors who have made at least one estimate in the last 3 fiscal years), it is often convenient to limit display to only those analysts who have current estimates. The option to toggle between showing all contributors with an estimate and only those with the current estimate may be provided. If, on the other hand, the user desires to analyze a particular contributor's performance over each of the securities followed by that contributor, the system provides the flexibility to do this as well.

For example, in FIG. 26, for the selected contributor/stock pair, the information pertaining to Mr. Young's performance for AAPL while at Prudential Securities can be shown in Data Screen 3390.

According to another embodiment of the present invention, a Relative Accuracy Score ("RAS") may be used to measure the performance of one or more equity analysts' earnings estimates. The performance of other sources may also be measured. Performance measurements may include the accuracy of one or more analyst (or other source) in making predictions for one or more earnings event (e.g., stock predictions) where predictions may include earnings estimates, buy/sell recommendations and other forecasts.

The RAS of the present invention is a relative measure wherein analysts (or other sources) may be compared against each other (or other predetermined sources). One or more sources may be compared to a predetermined number of other sources, which may include one or more analysts and other sources of estimates, for a defined earnings event (e.g., a stock or a set of stocks) for a defined period of time. A user may selectively determine one or more sources for comparison. For example, a single analyst may be selected to compare estimates for a single stock event over various periods of time. A user may selectively determine one or more earnings event. For example, one or more analysts (or other sources) may be selected to compare the performance of one or more analysts over various stock events. Stock events may further include an industry, sector or other defined categories. A user may also selectively determine a period of time. For example, one or more analysts (or other sources) may be selected to compare the performance of one or more earnings events over a defined period of time. The defined period of time may include a single day, a single fiscal quarter, a defined number of past fiscal quarters or years, a comparison of selected fiscal quarters or periods, or other one or more user defined time periods.

Analysts may be compared against other analysts or other sources where the RAS may take into account one or more of the relative error of analysts, the variance of errors, the average error of analysts, the value of actual earnings for a predetermined period (e.g., a particular date, period, fiscal year), and other considerations. The RAS may be applied to an earnings estimate on a stock (or other earnings event) at a given point in time; to an analyst on a given stock (or other earnings event) over a period of time (e.g., one or more of fiscal quarters or years); to multiple fiscal periods; to multiple stock/analyst/period triples, or other defined periods. Analysts or other sources may also be compared with respect to an industry, for a single an earnings event (e.g., stock), for some or all stocks (or earnings events) covered by one or more analysts or sources.

According to one example, RAS may be defined for a single point in time for a single analyst on a single stock. The RAS calculation may further be applied to other time periods, analyst (or source) groupings, and other earnings events. According to an embodiment of the present invention, the RAS may be calculated as a fraction where the numerator gives the basis for comparison and the denominator dictates the scaling of the numerator value.

According to another embodiment of the present invention, a rating system may be used to rate analysts' performance, based on one or more performance metrics. For example, the rating system may use the RAS values as the basis or at least part of the basis for determining the rating. RAS values may be mapped, either for a single event or aggregated over multiple events or other combination, to a rating system. A range of RAS values may be designated to correspond to a particular rating or grade thereby indicating degrees of accuracy and performance.

The present invention may implement a rating system wherein a percentage of analysts or other sources are assigned a rating, which may be used to signify the analyst's performance for a defined earnings event for a defined time period. Symbols may be used to represent degrees of accuracy or other performance metric. For example, one symbol (out of a possible 5 symbols) may represent low accuracy while five symbols (out of a possible 5 symbols) may represent high accuracy. Varying number of symbols in between one and five may also represent varying degrees of accuracy (or other performance metric). Also, a different symbol or color may be used to represent different degrees of accuracy. For example, a red colored symbol may represent one degree of accuracy while other colors and/or symbols may represent other varying degrees of accuracy. Other symbols, such as letters (e.g., grades), checkmarks, or circles may be used. Also, the scores may be divided into different ranges. For example, RAS values may be divided into smaller groups so that a 10 star rating is available to the most accurate scores. In another example, RAS values may be divided into larger groups, so that a 3 star rating is an indication of an accurate score. Other ratings and ranges may also be used. The number of stars may serve as a visual method of representing relative analyst performance. Other variations and illustrations exist.

For example, RAS values that fall within the range 0 to 19, may be assigned one star. RAS values that fall within the range 20-44, may be assigned two stars. RAS values that fall within the range 45-54, may be assigned three stars. RAS values that fall within the range 55-69, may be assigned four stars. RAS values that fall within the range 70-100, may be assigned five stars so that a five star rating corresponds to a highly accurate performance.

The RAS values may be made to fit on a defined curve, such as a bell curve. For example, 10% may be assigned a 5 star rating, 20% may be assigned a 4 star rating, 40% may be assigned a 3 star rating, 20% may be assigned a 2 star rating, and 10% may be assigned to a 1 star rating. Other distributions may also be used.

According to another embodiment, the present invention provides analysts, directors of research, a firm's external relations departments, brokers, and other entities a set of tools to measure and manage various performance metrics of one or more analysts (or other sources). The quantitative metrics of the present invention may provide objective ratings of analyst performance, which may include the accuracy of earnings estimates, the profitability of buy/sell/hold recommendations, and/or other predictions and performance metrics.

The present invention provides valuable tools for improving, reviewing and analyzing the accuracy of estimates and other indicators of accuracy. A user of the analyst measurement tool may track estimates by checking for outdated estimates, view current and historical estimates (or other predictions) that significantly vary from the mean or other threshold value, and/or monitor how one or more analysts' estimates compare to the high, low, mean and/or other calculated estimates. Also, an analyst may identify and correct errors in the IBES database. After reviewing data, an analyst may alter estimates or other predictions, correct errors, and compare performance to other analysts or sources. In addition, an analyst or other entity may evaluate and learn from historical data, which may be categorized and sorted based on various defined factors. Further, an analyst or other entity may review personal estimates and recommendations using estimate information, accuracy ratings, charts and other tools of the present invention.

The analyst measurement tool of the present invention may be used to view, analyze and calculate various analyst (or source) information, such as current data, historical data, performance metrics, predefined triggers, and other relevant data. Current data may include analyst or source information, which may encompass one or more earnings events followed by an analyst (or source), recommendation data, comparison information, and other current data for one or more analyst (or source). Current data may be displayed according to various defined time periods to enable comparison among different quarters, years, or other defined time periods (e.g., this quarter, next quarter, this year, and/or next year). Current data may also be presented in various chart formats, which may include a graph of one or more selected analyst estimates (or other current data). A graph of calculated measures may also be displayed, such as a high estimate, a median estimate, and/or a low estimate to enable detailed comparisons. Other relevant current data may also be shown.

Performance data may involve various measures of one or more analyst (or source) performance with respect to earnings events estimates or other predictions. Performance data may include calculations based on historical data for one or more analysts (or sources). This may involve calculating and/or determining the accuracy of one or more analysts' predictions of one or more selected earnings events for a defined time period. Accuracy of estimates for one or more analysts may be one factor in determining analyst (or source) performance data. The length of analyst (or source) coverage, among other factors, may also contribute to performance data and analysis. Performance data may be displayed for individual analysts, sets of analysts, user selected analysts, or analysts within a firm or other entity. Other combinations of source data are also available for display and/or analysis. For one or more analysts (or sources), performance data may be displayed for one or more earnings events followed by the selected one or more analysts. Performance data may include an accuracy score, a relative accuracy rating, an accuracy rank, average absolute error, actual earnings, and other accuracy related data. Performance data may be calculated and displayed for one or more selected time periods wherein the time periods may be defined by the user. Performance data may also be displayed in a graphical chart. Furthermore, one or more analysts (or sources) recommendation data with respect to earnings events may be displayed wherein recommendation data may include buy/sell/hold recommendations.

According to another embodiment, the present invention may send alerts or reminders informing analysts of the occurrence of specific events or highlighting potential issues associated with estimates. These alerts or reminders may be referred to as "mine-ders alerts" or "mine-ders" in accordance with an embodiment of the present invention. According to one embodiment of the present invention, mine-ders alerts may serve as a mechanism for flagging potential data issues without requiring the user to daily or periodically check for certain trends or events. By identifying events that are considered important to a user, the user may be automatically notified of one or more mine-ders alerts that indicate that one or more events have occurred. In response, the user may acknowledge the occurrence of the one or more identified events, make modifications to the user's estimate or perform other operations. Various modes of notification may be selected by the user for delivery or notification of mine-ders alerts information. In addition, mine-ders alerts may be displayed to the user when the user accesses the present invention.

Figure 27:
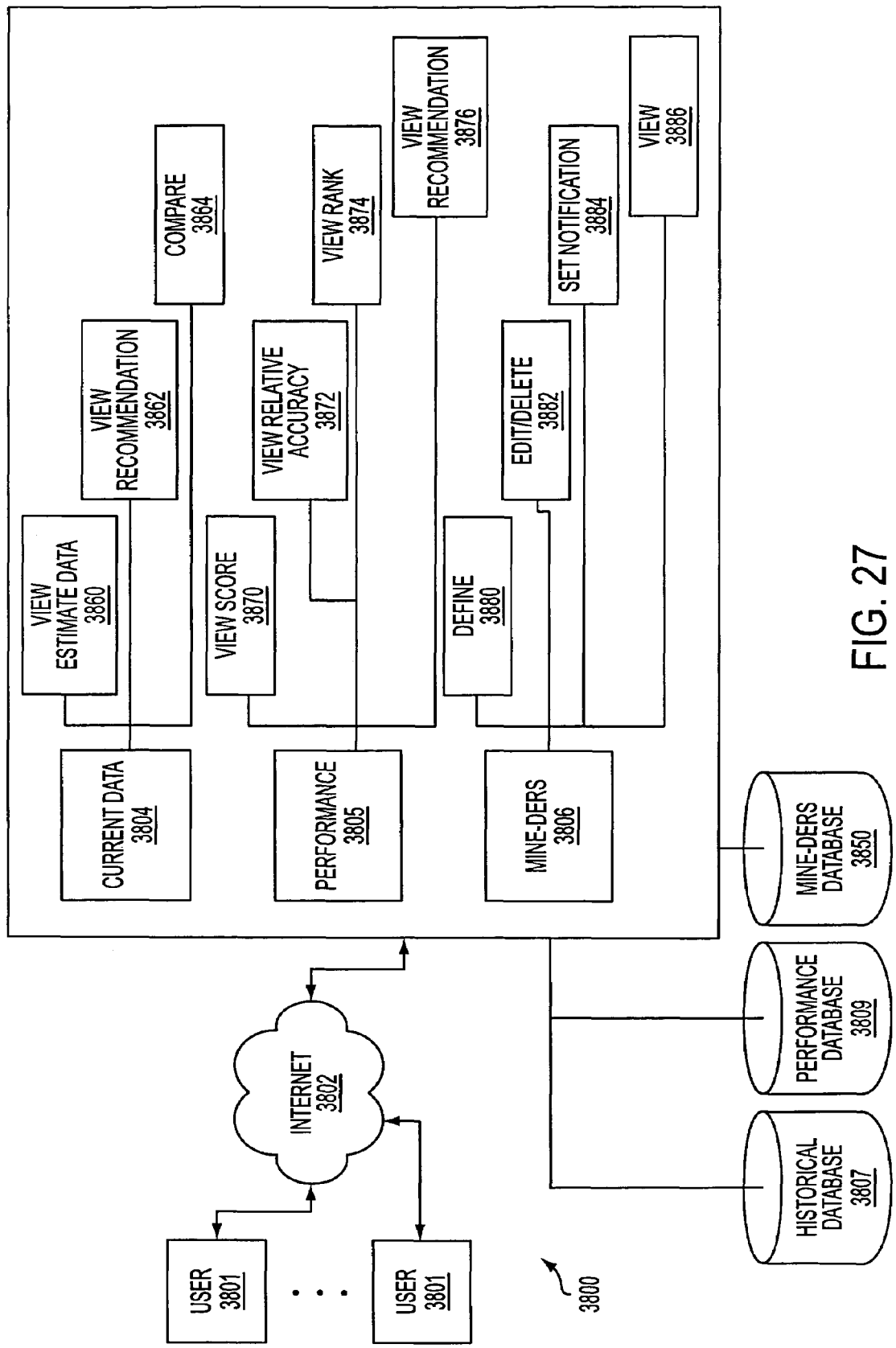
FIG. 27 is an example of a block diagram of an analyst measurement tool system according to an embodiment of the present invention.

FIG. 27 illustrates an example of an analyst measurement tool according to an embodiment of the present invention. One or more users 3801 may access the analyst measurement tool of the present invention through the Internet 3802 or other method. One or more users 3801 may include analysts, individuals or other entities who may desire to view, measure, and/or analyze data from various sources concerning performance and other metrics. Analyst measurement tool 3803 may enable the user to view various information related to individual analysts and other sources concerning current data 3804, performance data and/or metrics 3805, mine-ders alerts 3806, and other information. Databases may include Historical Database 3807, Performance algorithms and calculations Database 3809, and Mine-ders Database 3850. Other databases and information may also be included.

Current Data module 3804 may provide various forms of current estimate and other prediction data for one or more analysts or sources. Current data may include estimate data, recommendation data, and other data as of the current date. For example, current data may include estimate data 3860 for one or more selected or defined analysts or sources. Estimate data may encompass estimates for one or more earnings events for a defined period of time. Recommendation data 3862 may include buy/sell/hold recommendations as well as other recommendations. A compare option 3864 enables the user to view one or more analysts' estimates as compared to other estimates, mean values, consensus values for other one or more earnings events, stocks, and/or stock sets for one or more defined periods of time.

Performance data 3805 may include various forms of analysis of historical and other data which may be used to derive performance metrics for one or more analysts with respect to one or more earnings events, for one or more defined periods of time. Performance data may be viewed for one or more selected analysts, sources, a selected firm, entity or other groupings. Performance data may be viewed for various levels of time periods (e.g., fiscal quarters, fiscal years). For example, performance data may include accuracy scores 3870 wherein accuracy scores may be calculated in accordance with relative accuracy score algorithms, as discussed above. Other performance data may also include relative accuracy ratings 3872, performance ranking 3874, analyst recommendation 3876, as well as other performance metrics. Relative accuracy ratings may serve as an indication of an analyst's accuracy as compared to other analysts (or sources). Performance ranking information informs the user of an analyst's rank as compared to a total number of analysts following a particular earnings event. Analyst recommendation information relates to buy/sell/hold and other recommendations for one or more earnings events.

Mine-ders alerts may be defined for various events or conditions where one or more users may be notified of the occurrence of the defined events or conditions. Notification may be established through various methods. For example, notification may be defined or selected by the user or predetermined by the system of the present invention. The user may also view mine-ders based on various factors. For example, a user may view a list of active or inactive mine-ders alerts. Further, the mine-ders alerts may be sorted according to various user defined or selected factors or preferences. This feature enables the user to maintain and track current and past mine-ders alerts. At 3880, a user may define various conditions and events for notification. According to one example, Database 3850 may provide the user with a template or list of triggers to select from. Also, users may define personalized mine-ders alerts.

For example, a mine-der alert may be sent to an analyst or other assigned entity when the analyst's estimate is more than a defined number of days (e.g., 100 days old). This type of mine-der alert informs the user that it may be time for an update. This feature minimizes the number of outdated and old estimates.

Also, a mine-der alert may be triggered when the analyst's estimate is more than a defined number of standard deviations away from the mean. For example, if an analyst's estimate is more than 2 standard deviations away from the mean, a mine-der alert may be triggered and sent to the user. This type of mine-der alert informs the user that an analyst's estimates are straying away from the consensus, which may warrant estimate re-evaluation.

As another example, a user (e.g., an analyst) may be alerted when a cluster (or revision) has occurred and the analyst has not yet revised. Clusters may be defined as the occurrence of a significant number of analysts revising their estimates in a short time period. This often occurs during the release of company news, changes in the industry, earnings releases, and other issues that affect future earnings. A cluster may serve as an indication of the flow of new information into the marketplace characterized by analysts revising as a group. A feature of the present invention provides a method for systematically detecting revision clusters where the cluster's begin date may be used as a filter. Those analysts who have not revised their estimates may then be notified that there is potentially material company-related news, which could affect EPS. This feature also helps clients identify which estimates have been updated since the recent news or other events. Other conditions may be set and other triggers may be used. Mine-ders alerts may be modified by the analyst or other authorized entity for customization.

According to another embodiment of the present invention, mine-ders alerts may be displayed by a symbol for clear identification. As illustrated in detail below, a mine-der alert may be represented by a symbol, such as a yellow triangle, for example. The symbol may provide a hyperlink to more detailed mine-ders information, such as trigger dates, graphical data and other information.

Mine-ders conditions and other related features may be modified by the user at 3882. At 3884, the user may define one or more methods of notification. For example, when an event or condition occurs, the user may be notified via email with a link to the present invention, Internet, an instant messaging system, cell phone, PDA, pager, phone, or other methods of communication. In addition, the user may be notified of mine-ders alerts by accessing the web-site of the present invention. For example, upon accessing the present invention, the user may receive a notification of the occurrence of one or more predetermined mine-ders alerts. Also, the user may access a page or portion of a page of the web-site of the present invention where mine-ders information may be displayed. The user may identify one or more preferred modes of communication for convenience and prompt notification. Also, a user may assign different modes of notification for different mine-ders, as preferred by the user. For example, the user may prefer to be notified via email when a cluster revision has occurred. Thus, varying degrees of importance may dictate the varying types of notification.

At 3886, the user may select to view mine-ders alerts that are associated with one or more selected analysts. Also, mine-ders alerts associated with a firm, a defined entity, or other grouping may be displayed. The user may sort mine-ders through various factors and categories for analysis and comparison.

The present invention may be used to view the EPS forecast performance of a firm, analyst, or other defined group or entity to check the accuracy and timeliness of estimates, and to compare estimates versus the consensus. To view data by analyst, a user may select a particular analyst's name (e.g., from a drop down list). To view the analyst's current estimates and/or recommendations, the user may select the appropriate name and select "Current Data". "Current Data" shows the stocks covered by the analyst, the analyst's current recommendations, the analyst's EPS estimates, and other current data. Greater detail, such as a graphical display, on a particular estimate may be viewed by selecting a hyperlinked icon (e.g., score or number). Mine-ders, which show estimates that are flagged as potentially incorrect or outdated, may also be viewed by selecting an analyst (e.g., from a drop-down list), then selecting on the "Mine-der" link. Overall performance on multiple stocks by a particular analyst may be viewable by selecting an analyst (e.g., from a drop-down list), then selecting "Performance". This option highlights an analyst's EPS forecast performance across various time periods for associated earnings events (e.g., stocks covered by the analyst).

To view firmwide data, a user may select the appropriate link under the "Firmwide" title. The firmwide view enables the user to view, compare and analyze data for one or more analysts (or sources) from a selected entity, such as a firm, group or other collection of sources. For example, the Performance page ranks some or all analysts associated with a firm for various time periods. In another example, the Mine-ders page highlights some or all the potential forecast issues for some or all analysts associated with a firm (or other defined entity). Other firmwide information may also be available.

Figure 28:
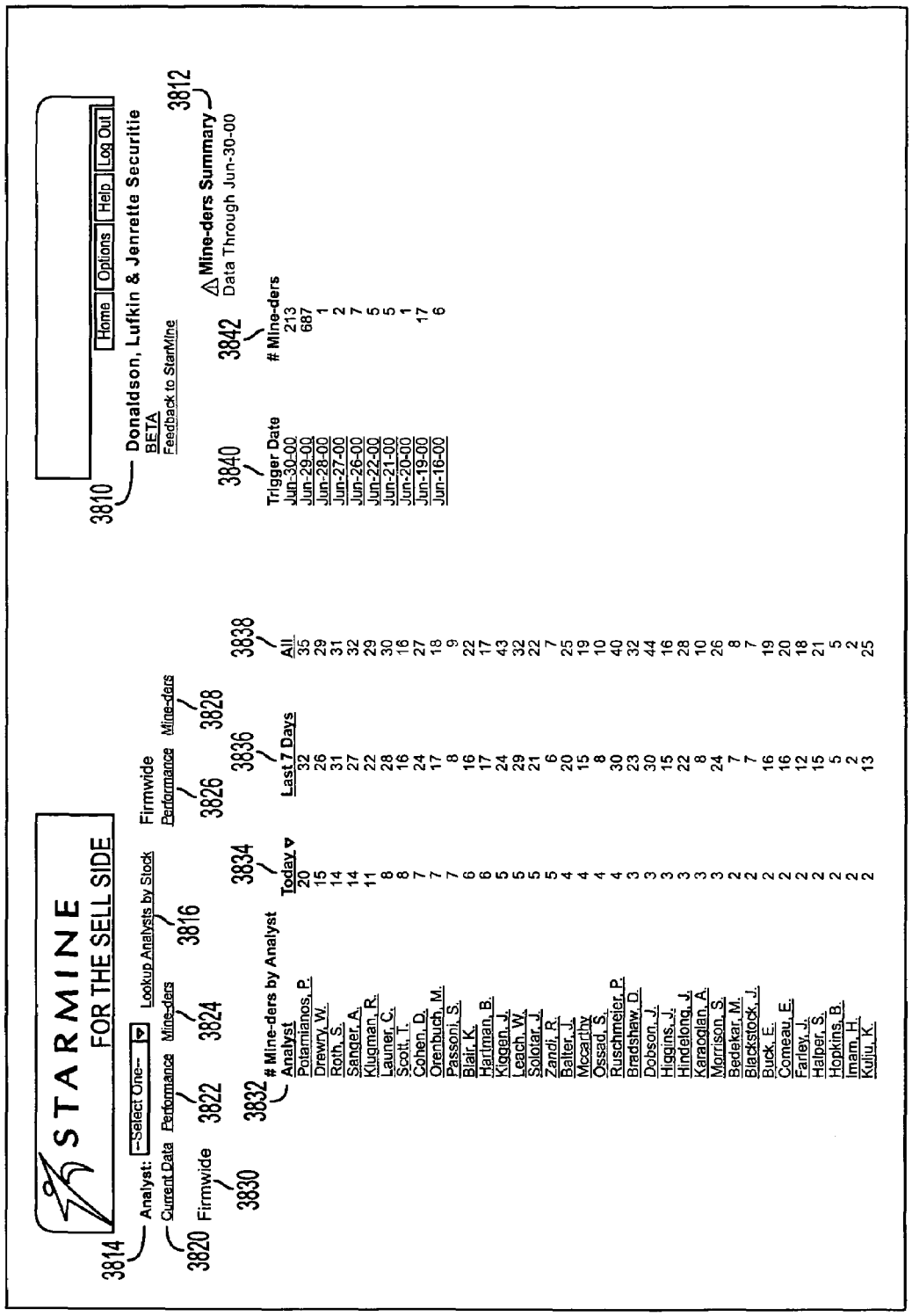
FIG. 28 is an example of alert summary information according to an embodiment of the present invention.

For each screen shot, the present invention may provide navigational features that display various information, charts, graphs and other displays. For example, as illustrated in FIG. 28, a firm or entity name may be displayed on the screen, at section 3810. A data summary section 3812 may provide a brief description of the presented data (e.g., Mine-ders Summary) and inform the user how current the data is. In this example, the data is current through Jun. 30, 2000. The user may select a specific analyst by name for detailed analysis of performance and other data. For example, the user may select an analyst by selecting a name in Analyst column 3832. Also, the user may select an analyst name by scrolling down a list at a drop down window, at 3814. Other methods of selecting may also be used. Once an analyst is selected, various viewing options are available. For example, the user may view current data, by selecting 3820; performance data, by selecting 3822, mine-ders data, by selecting 3824; and other data views. Also, the user may lookup analysts by stock, by selecting 3816.

The present invention may also provide firmwide information. For example, firmwide performance information may be available, by selecting 3826 and firmwide mine-ders information may be available, by selecting 3828. Performance information may include all analysts associated with a firm including analyst name, score, relative accuracy (in terms of star ratings), number of stocks followed by the analyst, and other information. Mine-ders information may include analyst name, number of mine-ders for each analyst and trigger date information related to mine-ders within the firm. Other firmwide data views may also be available. Section 3830 may display a brief description of the current view (e.g., firmwide, analyst name, stock ticker, etc.).

FIG. 28 is an example of a screen shot providing mine-ders summary information for a firm or other entity, according to an embodiment of the present invention. Mine-ders information for a firm may include a list of analysts, number of mine-ders associated with analysts for various time periods. Further, mine-ders may be first defined on a particular date, known as the trigger date. A trigger date may be defined as the date when the present invention flags a potential data issue thereby creating a mine-der. Analyst may utilize trigger dates to track what mine-ders were created and when the mine-ders were created. The present invention may display trigger dates and the number of mine-ders triggered on those days.

For example, FIG. 28 presents a list of analysts in column 3832 associated with the firm or entity displayed in section 3810. Today column 3834 displays the number of mine-ders associated with each analyst for the current date. In this example, the current date is Jun. 30, 2000, as shown in section 3812. In this example, analyst "Sanger, A" has 14 mine-ders for the current date. Last 7 Days column 3836 displays the total number of mine-ders associated with each analyst for the previous week (or 7 days). In this example, analyst "Sanger, A" has a total of 27 mine-ders for the previous week. All column 3838 displays the total number of mine-ders associated with each analyst. In this example, analyst "Sanger, A" has a total of 32 mine-ders. The analysts may be ranked and sorted according to the number of mine-ders as of the current date, the last 7 days or total number of mine-ders. Other views may also be available.

Further, trigger dates, which may be defined as the date when the present invention flags a potential data issue, and corresponding number of mine-ders triggered on those dates may be displayed for the firm. Analyst may utilize trigger dates to track what mine-ders were created and when the mine-ders were created. For example, Trigger Date column 3840 displays a list of trigger dates and column 3842 displays the total number of mine-ders that are triggered by that date. A user may view a detailed list of mine-ders triggered on a particular date by selecting a desired trigger date in column 3840. For example, a user may select Jun. 30, 2000 as the trigger date to view a list of all mine-ders first triggered on that date for a particular firm or entity. In addition, a mine-der alert may not always be triggered by a change in an analyst's estimate. For instance, while an analyst's estimate may stay the same and within 2 standard deviations from the mean, the consensus may move away from the analyst's estimate thereby triggering an alert even though the analyst has not made any modifications.

Figure 29:
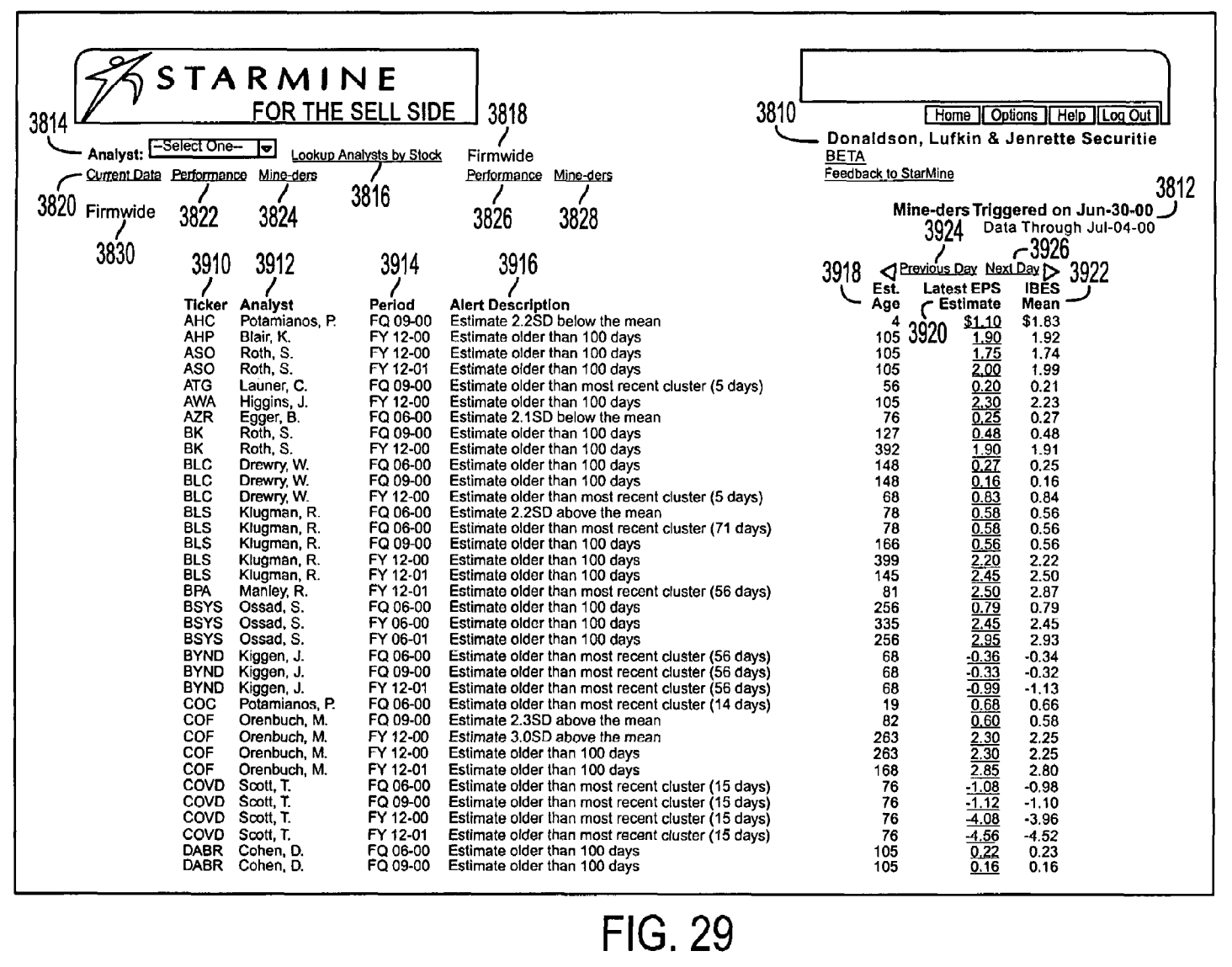

FIG. 29 provides a list of mine-ders triggered on a selected date, according to an embodiment of the present invention. In a firm or other entity, various analysts may have identified one or more mine-ders alerts to be triggered at the occurrence of defined events. The present invention enables a user to view all mine-ders alerts triggered on a particular date for an entire firm or entity. Other information may also be displayed, such as ticker symbol, analyst name, period during which mine-der was triggered, mine-der alert description, estimate age, latest EPS estimate, IBES mean and other information.

Figure 32A:
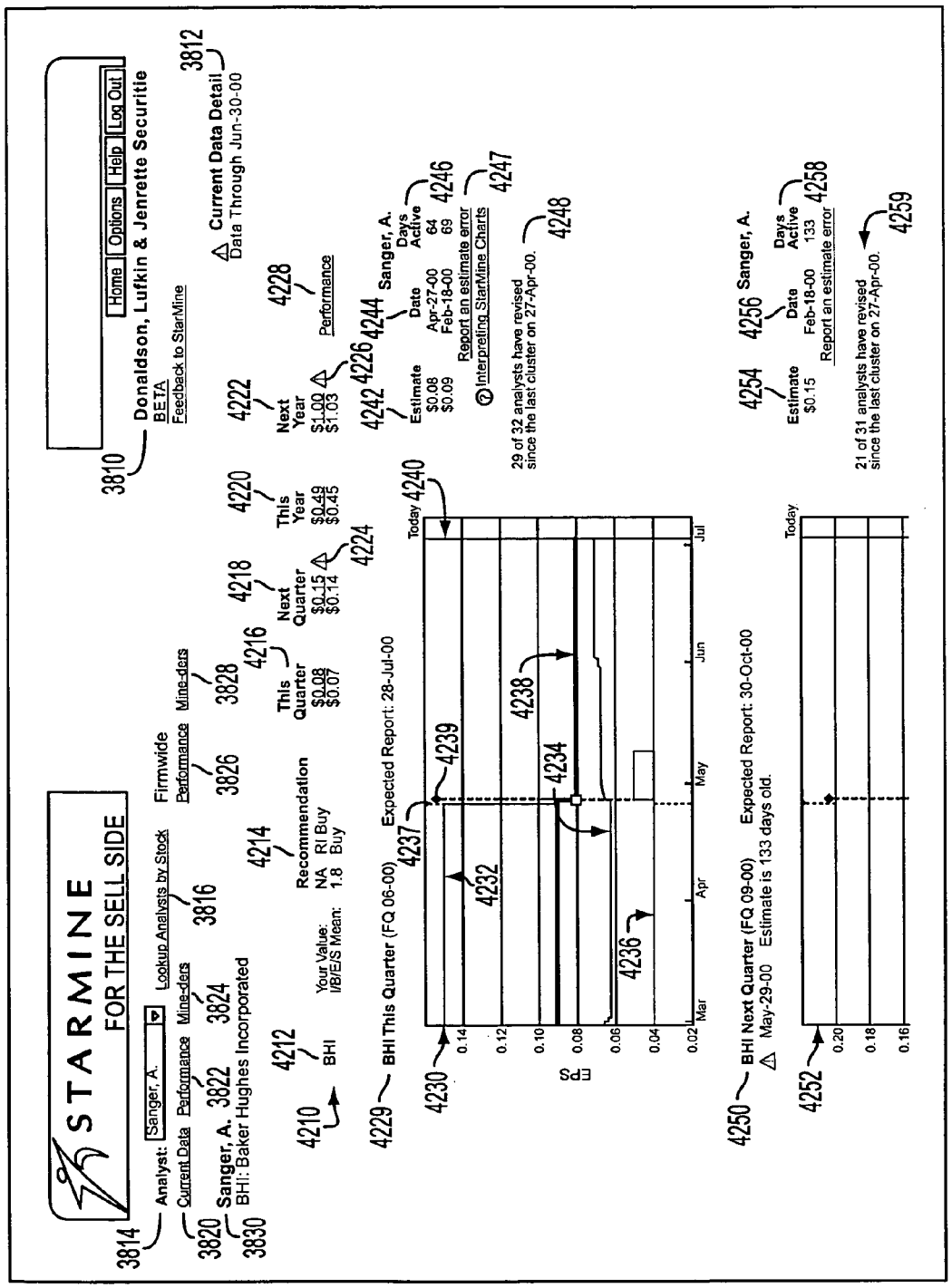
FIGS. 32a and 32b are an example of current data detail for a selected analyst according to an embodiment of the present invention.
Figure 32B:
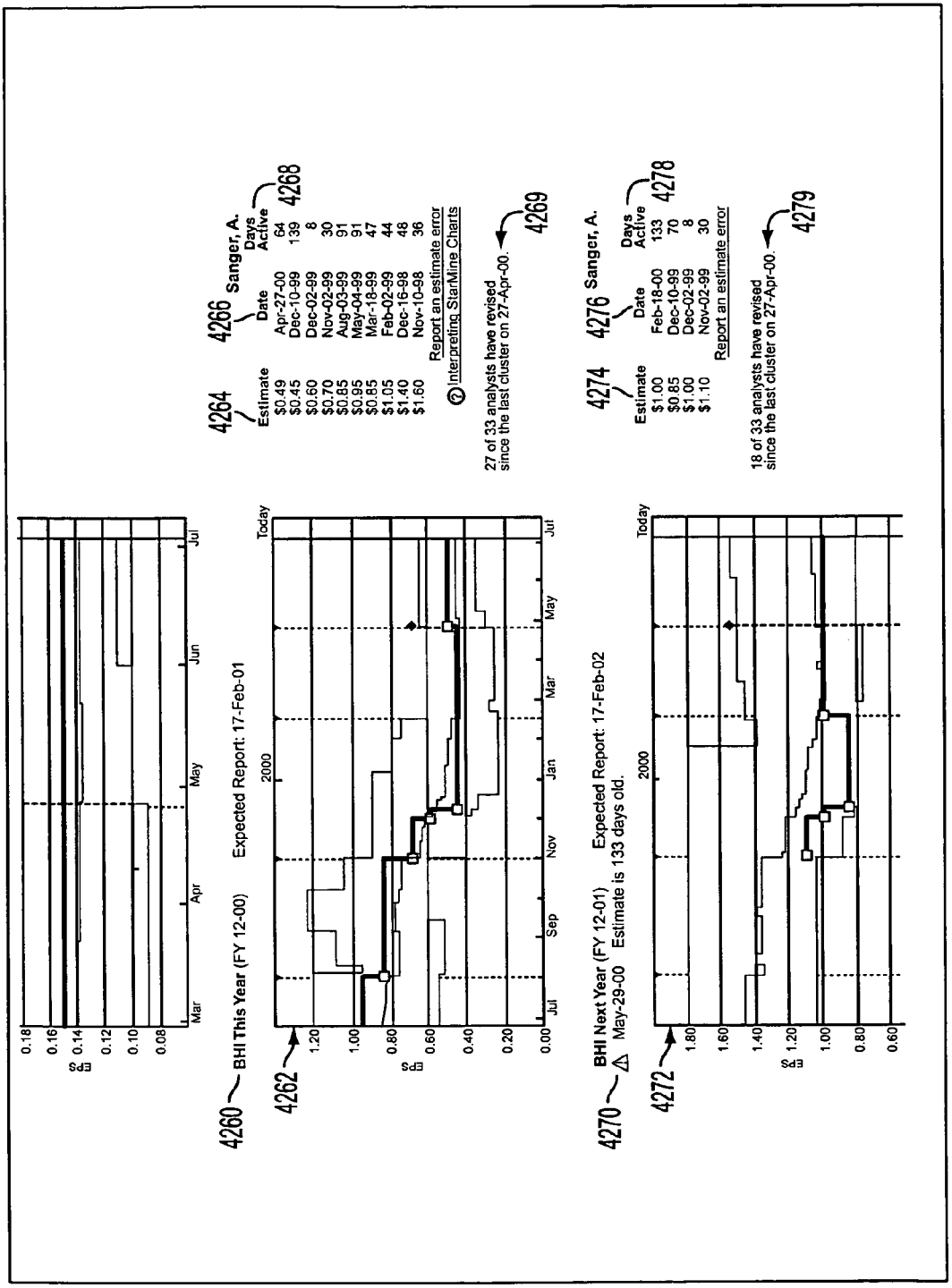

For example, by selecting a specific trigger date under Trigger Date column 3840, mine-der information for the selected trigger date may be displayed in detail, as shown by FIG. 29. Column 3910 lists the stock tickers followed by analysts in a firm. Column 3912 lists the analysts by name. The period may also be listed, in column 3914. A description of each alert that triggered an estimate may be provided in column 3916. The estimate age (e.g., days) may be displayed, in column 3918. The analyst's latest EPS estimate may be displayed, in column 3920, along with the IBES Mean, listed in column 3922. Navigational options may be available to view Mine-ders information triggered on other days, as well. For example, Previous Day as well as Next Day Mine-der information may also be displayed by selecting, 3924 and 3926, respectively. In addition, by selecting an estimate under column 3920, the user may view current data detail, as illustrated in FIGS. 32*a* and 32*b* described in detail below.

Figure 30:
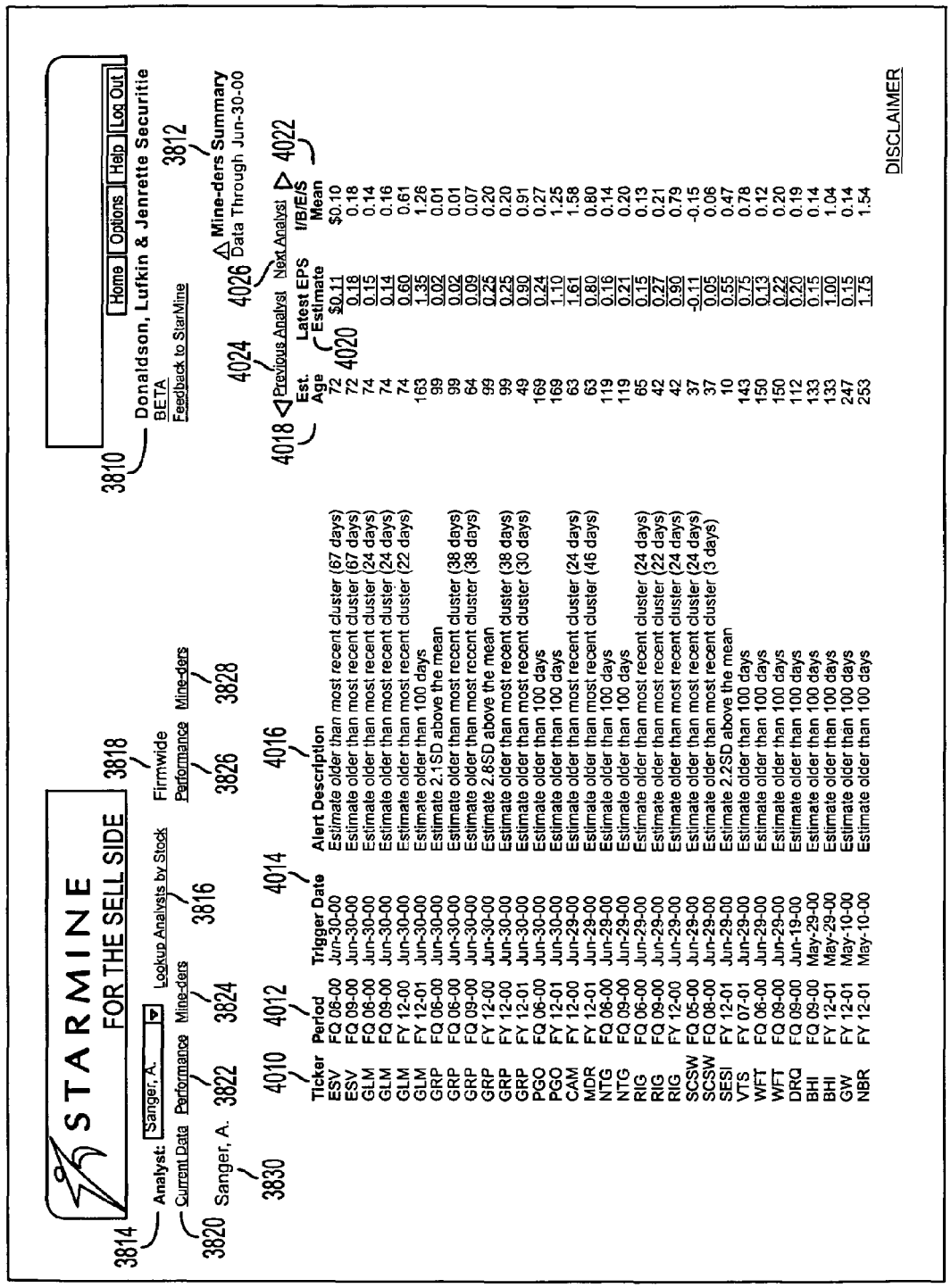
FIG. 30 is an example of a summary of alerts for a selected analyst according to an embodiment of the present invention.

Mine-der information for a particular analyst may be displayed, according to an embodiment of the present invention. Once an analyst has been selected, a list of mine-ders associated with that analyst may be displayed, as shown in FIG. 30. A user may select an analyst from column 3832 or the user may select an analyst from a scroll down list in 3814 and select Mine-ders at 3824 to view a detailed list of mine-ders for the selected analyst. Mine-ders summary information may include ticker symbol, period, trigger date, alert description, estimate age, latest EPS estimate, IBES mean and other information.

In the example of FIG. 30, analyst "Sanger, A" has been selected. Column 4010 may list the stock tickers having a mine-der alert associated with the stock ticker. The period may also be listed, in column 4012. The date that an alert has been triggered may be listed in column 4014. A description of each mine-der alert may be provided in column 4016. The estimate age may be displayed in days, in column 4018. The analyst's latest EPS estimate may be displayed, in column 4020, along with the IBES Means, as listed in column 4022. Navigational options may be available to view Mine-ders information associated with other analysts. Previous Analyst as well as Next Analyst Mine-ders information may also be displayed by selecting, 4024 and 4026, respectively. In addition, by selecting an estimate under column 4020, the user may then view current data detail, as illustrated in FIGS. 32*a* and 32*b* described in detail below. As indicated in section 3830, the mine-ders data may be specific to a selected analyst.

In some instances, there may be situations where an analyst stands by his or her estimate despite receiving notification of the occurrence of certain events. For example, an analyst may receive a mine-der alert informing the analyst that an estimate is more than a defined number of days old, such as 100 days old. However, the analyst may choose to continue to stand by this estimate. In this case, the mine-der alert may indicate analyst confirmation as of the current date so that it is visibly apparent that the mine-der alert has been recognized by the analyst. Also, when a mine-der alert has been received, the analyst may delay the reception of the same mine-der alert for a predetermined number of days or other time period. The analyst may also ignore or dismiss the alert. Alerts may be displayed in different colors or in different symbols depending on the type of action taken. When data has been updated in response to an alert, the alert may disappear until another alert is triggered.

In addition, different entities may acknowledge mine-ders alerts. A mine-der alert may display a change in status (e.g., color or symbol) depending on who reviewed the mine-der alert. For example, if an analyst acknowledged the mine-der alert, the mine-der alert may be displayed as one symbol or color. If a research director or other entity acknowledged the mine-der alert, the mine-der alert may be displayed as a different symbol or color. Other variations may be implemented.

FIG. 31 provides an example of viewing current data of a selected analyst, according to an embodiment of the present invention. The Current Data view for a selected analyst may show the stocks covered by the analyst, the analyst's current recommendations, and the analyst's EPS estimates. The analyst's estimates may be further broken down by time period, such as quarter and year.

The user may select Current Data at 3820 to view data associated with an identified analyst. Current data may include the analyst estimates as compared to the IBES mean for stocks followed by the analyst. The analyst estimates may also be compared to other measures of estimates, such as enhanced composite estimates of the present invention, as discussed above. This view may also display symbols indicating a mine-ders alert associated with an estimate. In this example, analyst "Sanger, A" has been selected. Under column 4110, a list of stock tickers followed by the selected analyst may be displayed. Under column 4112, a set of recommendations may be presented for each stock. Each set of recommendations may include the analyst's value and the IBES mean. The analyst's values may be compared to other measures. In some circumstances, different firms may implement different recommendations and values. To establish standardization, these recommendations may be converted to a standard scale, to indicate positive and negative recommendations. For example, a scale of 0 to 5 may be used. In this example, a lower number may indicate a more positive recommendation while a higher number may indicate a negative recommendation.

For example, for the stock ticker "BHI", the analyst has assigned a recommendation of "1.0 RI Buy" and the IBES mean has assigned a recommendation of "1.8 Buy". Other possibilities may include Strong Buy, Market Performance, Sell, Hold, and other recommendations. Under column 4114, the analyst estimate and the IBES mean may be presented for this quarter. Also, the analyst estimate and the IBES mean may be presented for the next quarter, in column 4116. Under column 4118, the analyst estimate and the IBES mean may be presented for this year. Also, the analyst estimate and the IBES mean may be presented for the next year, in column 4120. Other periods of time may also be used. Column 4122 allows the user to view performance detail data for each stock, as described in FIG. 35 below by way of example.

A symbol 4126 may be used to indicate that a company has recently reported earnings (e.g., within a defined number of days). For example, this company has recently reported earnings for stock GRP within the last 15 days. In addition, another symbol may be used to indicate an associated mine-ders alert for a particular estimate. This symbol may comprise a yellow triangle with an exclamation point. Other symbols may also be used to designate an associated mine-der. In the example of FIG. 31, a mine-der, as indicated by symbol 4124, may be associated with the analyst's estimate of 0.15 for stock BHI under Next Quarter column 4116. Other mine-ders may also be defined and set. By selecting the mine-der 4124 or an analyst estimate, detailed current data may be displayed, as shown in FIGS. 32a and 32b, for the associated stock.

FIGS. 32a and 32b may display current data detail information according to an embodiment of the present invention. A feature of the present invention may display current data in graphical format for defined sets of time periods. Time periods may include the current quarter, next quarter, the current year, next year, and other defined ranges of time. Graphical information may include a time series illustrating a selected analyst EPS estimate, a high EPS estimate, a low EPS estimate, IBES mean and other time series for comparison and analysis of current data.

For example, current data detail regarding the stock BHI as followed by analyst "Sanger, A" may be displayed. In this example, section 4210 displays current data summary information for the selected estimate and stock. For example, column 4212 identifies the stock, column 4214 summarizes the recommendation of the analyst and the IBES mean, column 4216 displays the estimate of the analyst and the IBES mean estimate, column 4218 displays the estimates for next quarter, column 4220 displays the estimates for the current year, column 4222 displays the estimates for next year and 4228 allows the user to view analyst estimate performance information. Other information may also be available in section 4210.

Symbols 4224 and 4226 indicate to the user that these estimates have been assigned mine-ders alerts. By selecting these mine-ders alerts, the user may view current data associated with the mine-der alert. For example, when alert 4224 is selected, the user may view summary section 4250, chart 4252 and a detailed description of the alert. A chart view for each time period (e.g., this quarter, next quarter, this year, next year) shown in section 4210 may be displayed below, as shown by chart 4230, 4252, 4262 and 4272.

Summary section 4229 briefly describes the current data in chart 4230. In this example, chart 4230 displays current data regarding stock BHI for the current quarter (FQ 06-00) with an expected report at Jul. 28, 2000. Chart 4230 may display a high EPS estimate as shown by 4232, a low EPS estimate as shown by 4236, a IBES mean as shown by 4234, and the analyst's EPS estimate as shown by a 4238. Symbol 4237 marks the date of company's previous quarterly earnings. Symbol 4239 marks the begin date of a major estimate revision cluster of several analysts. The current date is shown by vertical line 4240.

Additional detailed current data information may be displayed. For example, estimate information for chart 4230 may be displayed under Estimate column 4242, the associated date under Date column 4244, and the number of days active under column 4246. Other information may also be displayed. Section 4247 enables a user to easily report errors or other data issues to IBES or other entity. By selecting 4247, the user may supply information related to the error, such as the nature of the error, analysts involved, brokerage involved, and quarters/years where the error occurred. Also, in section 4248, detailed cluster information may be presented. In this example, 29 of the 32 analysts have revised since the last cluster on Apr. 27, 2000.

Summary section 4250 and chart 4252 may display current data detail information related to a mine-der alert as indicated by symbol 4224 in section 4210. Summary section 4250 may provide a brief description of the alert including a trigger date (e.g., May 29, 2000). For example, the alert associated with this estimate is that the estimate is over 100 days old, or the estimate is 133 days old. Additional detailed current data information may be displayed. For example, estimate information for chart 4252 may be displayed under Estimate column 4254, the associated date under Date column 4256, and the number of days active under column 4258. Other information may also be displayed. Also, in section 4259, cluster information may be presented. For example, in this example, 21 of the 31 analysts have revised since the last cluster on Apr. 27, 2000.

Similarly, current data detail may be displayed for stock BHI for this year as summarized in summary section 4260 and graphical displayed in chart 4262. Other information may further be displayed under Estimate column 4264, Date column 4266, Days action column 4268 and cluster section 4269.

Also, current data detail may be displayed for stock BHI for the next year as summarized in summary section 4270 and graphical displayed in chart 4272. For example, the alert associated with this estimate is that the estimate is over 100 days old, or the estimate is 133 days old. The existence of an alert for the estimate may be indicated by symbol 4226 in section 4210. Other information may further be displayed under Estimate column 4274, Date column 4276, Days action column 4278 and cluster section 4279.

Another view available to the user is the performance view, according to an embodiment of the present invention. Performance for each analyst may be based on the relative accuracy of the analyst's estimates as compared to reported actuals, the relative accuracy of the consensus as compared to reported actuals, and the aggregate of an analyst performance across multiple stocks and periods. Analysts may be measured according to how far their estimates vary from the reported actual EPS and the consensus on a daily basis (or other time interval). A relative accuracy score may then be calculated for every day an estimate is valid. The scores may then be averaged over the days within a fiscal period (e.g., 91 for quarters and 365 for years) and aggregate over the total number of periods the analyst covered a particular stock in order to obtain an overall score. After applying the scores to an algorithm that accounts for the length of time a stock was covered during a period (by quarter or year) and the number of stocks covered, an overall relative accuracy score may then be mapped to a star rating or other method of assigning symbols indicating an analyst's performance in terms of relative accuracy.

Figure 33:
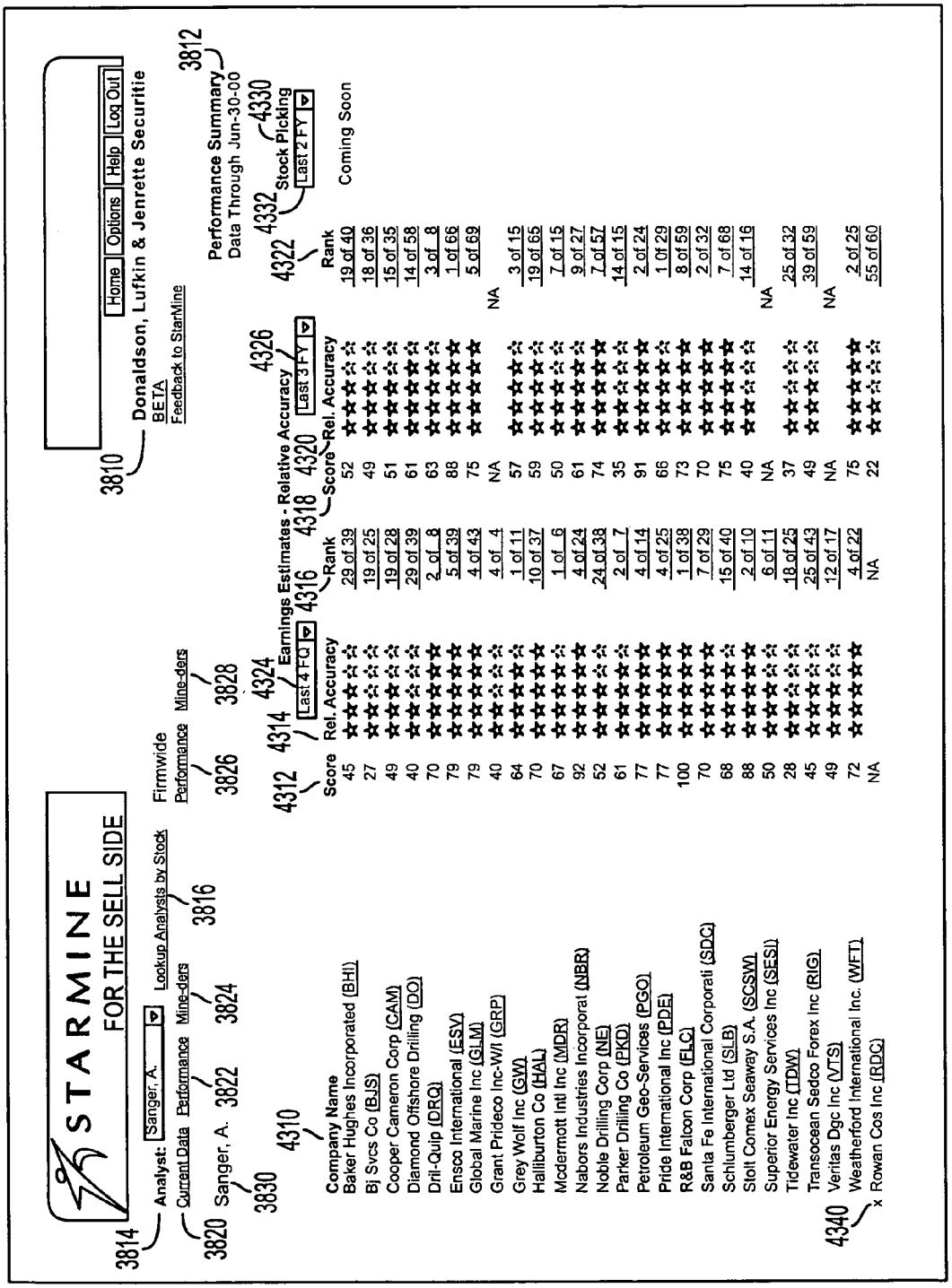
FIG. 33 is an example of performance summary information for a selected analyst according to an embodiment of the present invention.

FIG. 33 displays performance data for a selected analyst, according to an embodiment of the present invention. Performance data may include relative accuracy scores and star ratings which represent the accuracy of the analyst's previous estimates. These scores and star ratings may also take into consideration the length of coverage (e.g., the number of periods). Further, star ratings may involve mapping a range of relative accuracy scores to a number of stars, as a measure of relative accuracy. Other metrics, symbols, and ranges may be used to designate relative accuracy of analysts. Accuracy scores and star rating may be calculated in accordance with the formulas discussed above.

For example, FIG. 33 displays company and associated stock ticker followed by the selected analyst in column 4310. The relative accuracy score information may be displayed for a selected time period, in 4324. A time period for analysis and comparison may be selected. In this example, the selected period is the last 4 fiscal quarters. Other time periods may include the last fiscal quarter, last 8 fiscal quarters, last fiscal year, last 2 fiscal years, last 3 fiscal years, 1999 and 2000. Other time periods may also be identified. Relative accuracy scores for stocks followed by the analyst may be listed in column 4312 for the selected time period. A relative accuracy star rating may be displayed in column 4314. The selected analyst's ranking for each stock may be displayed in column 4316. The analyst's rank and total number of analysts following the stock is shown. In this example, analyst Sanger is ranked $29^{th}$ out of 39 for the stock "BHI".

Another time period may be simultaneously selected for comparison and analysis. In this example, the last three fiscal years has been selected in 4326. Column 4318 displays a relative accuracy score for a second time period (e.g., the last three fiscal years). Relative accuracy star rating 4320 may be displayed for the second time period as well as the ranking of the selected analyst 4322. In addition, a symbol may be used to indicate that there are no currently active estimates or recommendations. This symbol may comprise an "x" or other identifier, as shown by symbol 4340. As illustrated, some analysts from firms may be listed as "N/A". When viewing the performance of analysts by stock, the analysts who are ranked below the mean may be anonymous to outside firms. In order words, according to an embodiment of the present invention, a user may view the performance of all the analysts in the user's firm, but may be restricted in viewing only analysts with better than average performances in other firms.

The present invention may receive earnings per share ("EPS"), recommendation data and/or other information from IBES through databases of stock earnings estimates and recommendations. There may be instances where an analyst and/or broker name is not be provided. For example, an analyst and/or broker may be displayed as "undisclosed", "not participating" and/or "NA". Other terms and/or phrases may also be used depending on the status of the analyst and/or broker or for the purpose of remaining anonymous. For example, some analysts and/or brokers may not agree to be publicly rated or reveal their identify. Other circumstances may exist as well.

According to the present invention, the identity and/or associations (e.g., broker, etc.) of an analyst may be hidden. This enables estimate information to be displayed and/or analyzed without relying on IBES information. Thus, a user of the present invention may not need an IBES license or other authorization. Rather, estimate and/or other information may be available through the website of the present invention.

For example, there may be various retail brokers and other entities that may want access to detailed earnings estimates and other data via providers, but may not have access and/or authorization to such data. Brokers and other affiliations may not give providers access to research data (e.g., estimates, recommendations, notes and other data) to competing brokers and other entities. By withholding analyst names and other identifiers in analyst-by-analyst research pages, detailed information may be displayed to various users (e.g., investment advisors) who may otherwise not be able to see such data. Other applications and variations may be used.

The stock picking capability of the present invention measures the relative and absolute profitability of analyst's recommendations, as shown by 4330 and 4332.

Figure 34:
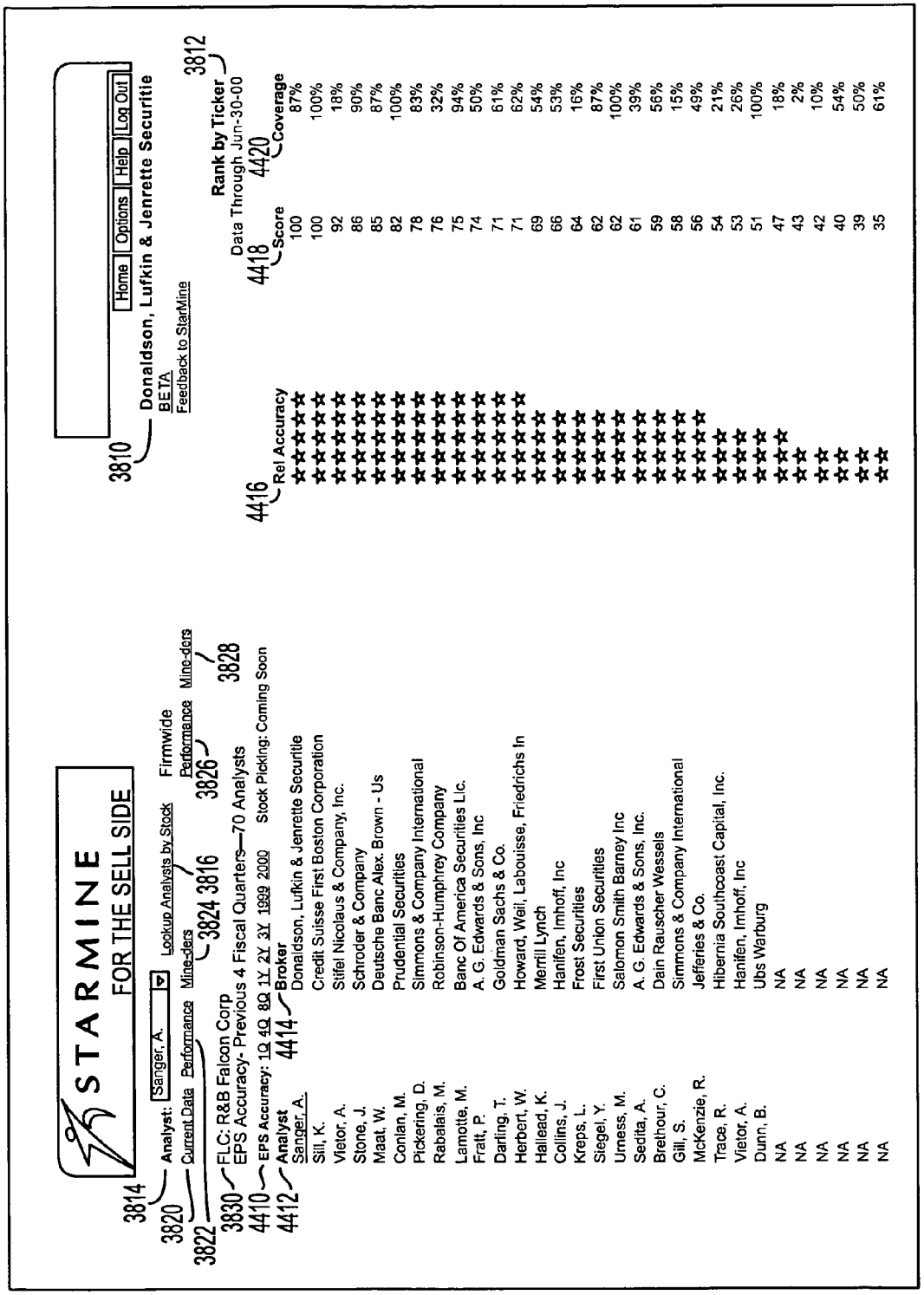
FIG. 34 is an example of ranking of analysts for a selected stock ticker according to an embodiment of the present invention.

For example, relative performance data for a stock may be displayed by selecting on a ranking score, according to an embodiment of the present invention. For example, a user may desire to view more detailed performance information in relation to the analyst's score of 100 with an associated 5 star ranking. The selected analyst, Sanger, A, has a ranking of 1 out of 38 for R&B Falcon Corp (FLC). By selecting this analyst's ranking in column 4316, the user may view a rank of all analysts following the associated ticker, as shown in FIG. 34.

Analyst estimates for stock may be ranked in relation to other analysts who follow the same stock. The ranking of relative accuracy may be based on relative accuracy scores calculated for each analyst for each stock that is followed.

This feature of the invention provides a useful measure of accuracy and assessment of relative performance for various stock events. While a star rating provides a clear measure of relative accuracy, the analyst rank for a stock provides a more detailed indication of an analyst's standing and performance with respect to other analysts. Also, a relative accuracy score may be given more depth and insight when presented with the analyst's actual rank out of a total number of analysts who follow the stock.

According to another embodiment of the present invention, relative analyst performance data may be obtained for a particular stock. This feature of the present invention may enable users to select a stock followed by an analyst and view the analyst's ranking in relation to other analysts who follow the stock. Other information may include broker affiliation, star rating, relative accuracy scores as well as coverage time. Brokerage affiliation may include a firm name or other identifier. Star rating may include a 0 to 5 star rating, for example, as a measure of accuracy. RAS values may provide a more detailed measure of accuracy for each analyst's performance. The coverage time may represent the percentage of time the analyst has publicized a forecast over an evaluation period. The higher percentage, the longer the forecast has been active.

FIG. 34 provides an illustration of a ranking of analysts for a selected stock ticker, according to an embodiment of the present invention. This view displays a list of all analysts who have submitted estimates for the stock from all brokerage firms and other entities. Also, this feature of the invention enables the user to view where the selected analyst stands in relation to all other analysts. In this example, analyst "Sanger, A" is ranked first, as shown in column 4412. The affiliated broker or other entity may be displayed in column 4414. The analyst's relative accuracy star ranking may be shown in column 4416 in descending order. Other views may also be available. Also, the score of each analyst may be displayed in column 4418. In addition, the coverage percentage may be shown in column 4420. In this example, analyst "Sanger, A" has been covering this stock for 87% of the time. Section 4410 enables the user to select different time periods. In this example, the selected period is the last 4 fiscal quarters. Other time periods may include the last fiscal quarter, last 8 fiscal quarters, last fiscal year, last 2 fiscal years, last 3 fiscal years, 1999 and 2000. Other time periods may also be identified.

According to another embodiment of the present invention, an analyst's performance with respect to a specific stock may be displayed. Performance data for an analyst's estimates may be displayed by time periods within fiscal periods. This feature of the invention enables a user to view an analyst's performance for a series of time periods for a particular stock. This simplifies comparison within time periods of an analyst's performance. Also, trends in an analyst's earnings estimates may be more easily visible. Performance data may include a relative accuracy score, a relative accuracy star rating, rank (including rank and total number of analysts), coverage time, average absolute error, actual amount and other information. This information may be formatted according to defined time periods. For example, time periods may include fiscal quarters, fiscal years, or other defined time frames.

Figure 35:
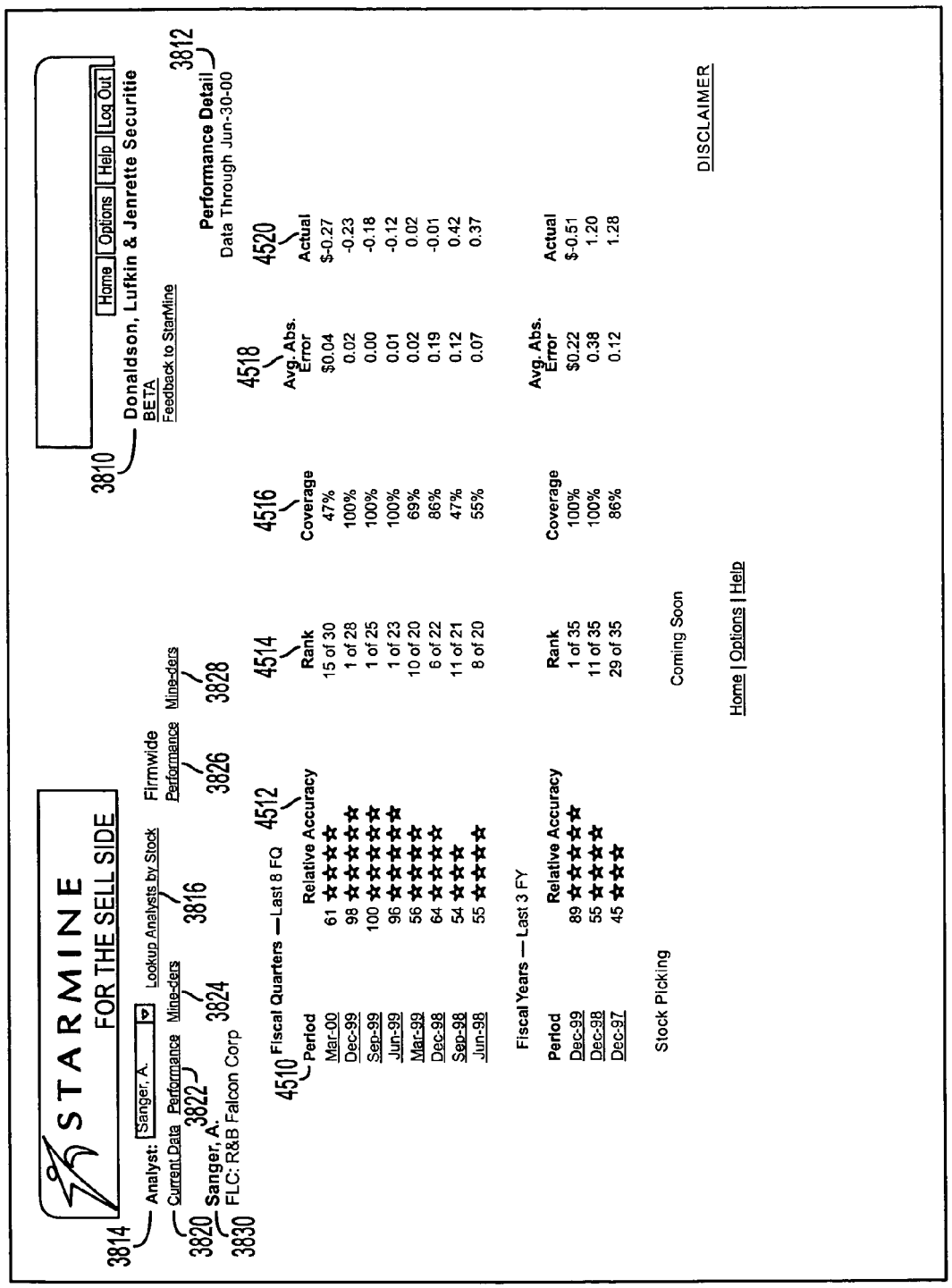
FIG. 35 is an example of performance detail information for a selected analyst and an selected stock ticker according to an embodiment of the present invention.

For more detailed performance information, the analyst "Sanger, A" in column 4412 may be selected in FIG. 34, according to an embodiment of the present invention. FIG. 35 displays performance detail for the selected analyst for defined time periods, such as fiscal quarters and fiscal years. In addition, from FIG. 33, the user may select a stock ticker of interest to view performance detail, as shown in FIG. 35. For example, the user may select (FLC) in column 4310 to view performance detail as shown in FIG. 35.

FIG. 35 displays a breakdown of the selected analyst's performance for a particular stock. In this example, the analyst's performance in predicting a particular stock may be displayed for the last eight fiscal quarters. The periods may be listed in column 4510. The analyst's score and relative accuracy star rating may be displayed in column 4512. The ranking and total number of analysts may be shown in column 4514. The amount of analyst coverage may be shown in column 4516. An average absolute error amount may be calculated and displayed in column 4518 while the actual amount may be shown in column 4520. The average absolute error may be the average of the absolute error of an analyst estimate as compared to the reported actual across the evaluation period. Also, detailed information for the last three fiscal years may be displayed.

The scores displayed in FIG. 35 may be used to calculate accuracy scores for a defined time period. For example, analyst Sanger's score for the last 4 quarters is 100, as shown in FIG. 34. This score may be calculated in accordance with the formulas discussed above where the number of periods is taken into consideration. For example, analyst Sanger was assigned scores of 61, 98, 100 and 96 for last four quarters. In accordance with the formulas discussed above, analyst Sanger's relative accuracy score is 100 for the last four quarters.

Stock recommendation information may be displayed according to another embodiment of the present invention. This feature of the invention may provide analyst recommendations for a particular stock for a period of time. Stock recommendations may include strong sell, sell, hold, buy and strong buy. This feature of the invention enables a user to view recommendations by an analyst as compared to the consensus, mean or other measure, such as high and low estimates. Also, actual earnings for a stock may be graphically shown as well. This feature enables a user to compare the recommendations of an analyst with the actual earnings of the stock for simultaneous time periods.

Figure 36:
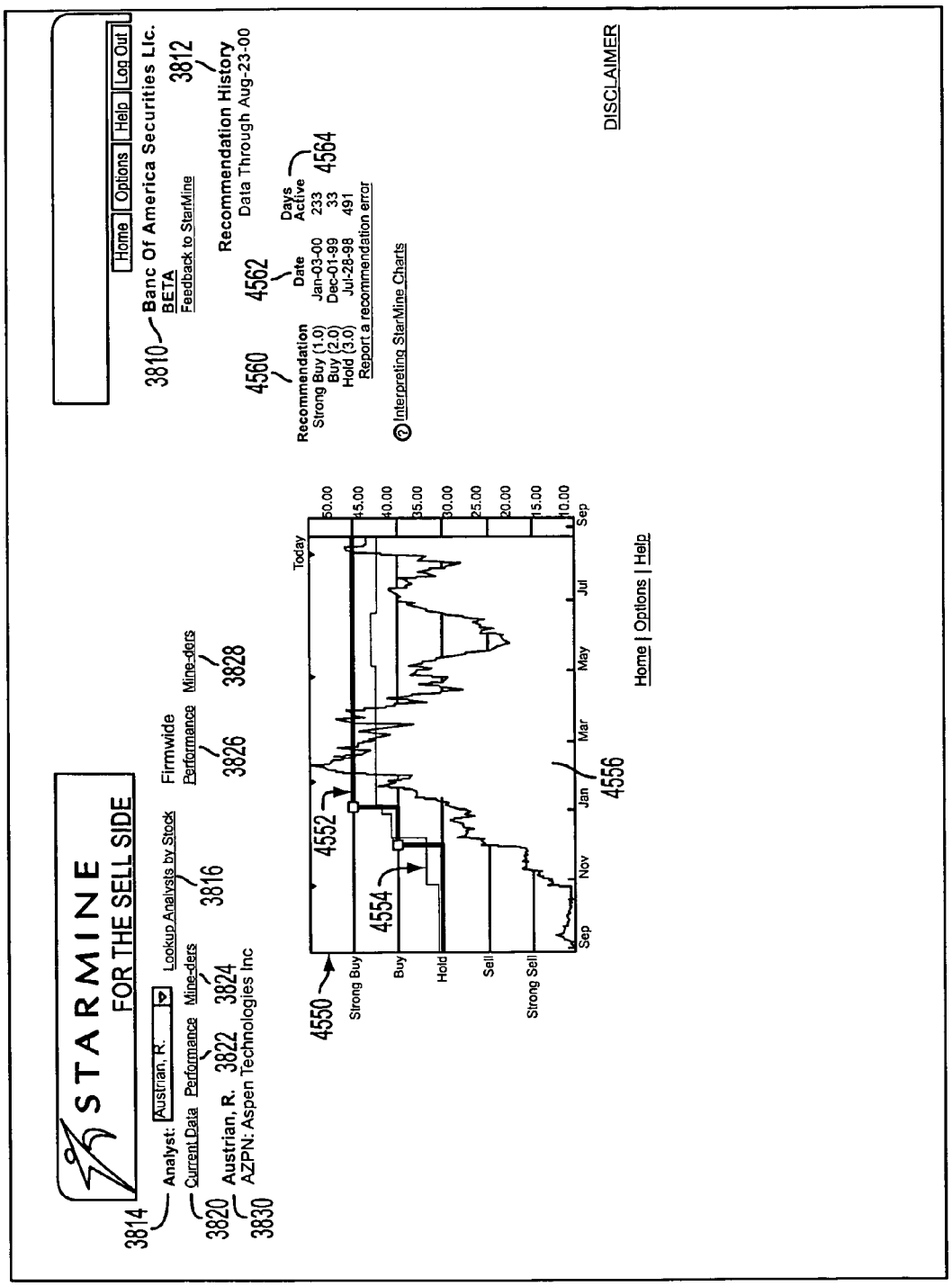
FIG. 36 is an example of a recommendation history for an analyst according to an embodiment of the present invention.

FIG. 36 illustrates an example of stock recommendation data, according to an embodiment of the present invention. In this example, a selected analyst's past recommendations for a particular stock may be graphically displayed, as shown in chart 4550. An analyst's recommendations may be displayed by 4552, which may be compared to a mean recommendation as shown by 4553. Recommendations may be translated by viewing the left side of chart 4550, as strong sell, sell, hold, buy, and strong buy. Other recommendations may be used, such as a numerical scale, symbols or other indicators. The actual performance of the stock may be chart as shown by 4556. The actual earnings may be translated by viewing the right side of chart 4550. In addition, detailed recommendation information may be displayed. For example, column 4560 may provide an analyst's recommendations; column 4562 may display the date at which the recommendations were made, and column 4564 may show the duration of the recommendation.

The present invention may provide a graphical illustration of an analyst's performance for a time period for a particular stock. A chart illustrating the analyst's estimates in relation to a high EPS estimate, a low EPS estimate, a IBES mean may be displayed. Also, the actual reported EPS of the company may also be shown for comparison. Detailed performance information, such as period end date, reported date, star rating, analyst rank, coverage period, average absolute error, and actual amount may be displayed as well. Other performance data may also be included. Further, estimate detail may be shown in conjunction with the graphical display. This performance information enables the user to conduct detailed analysis of individual analysts for specific stock events for a selected time period. Comparisons to mean values may also be graphically analyzed.

Figure 37:
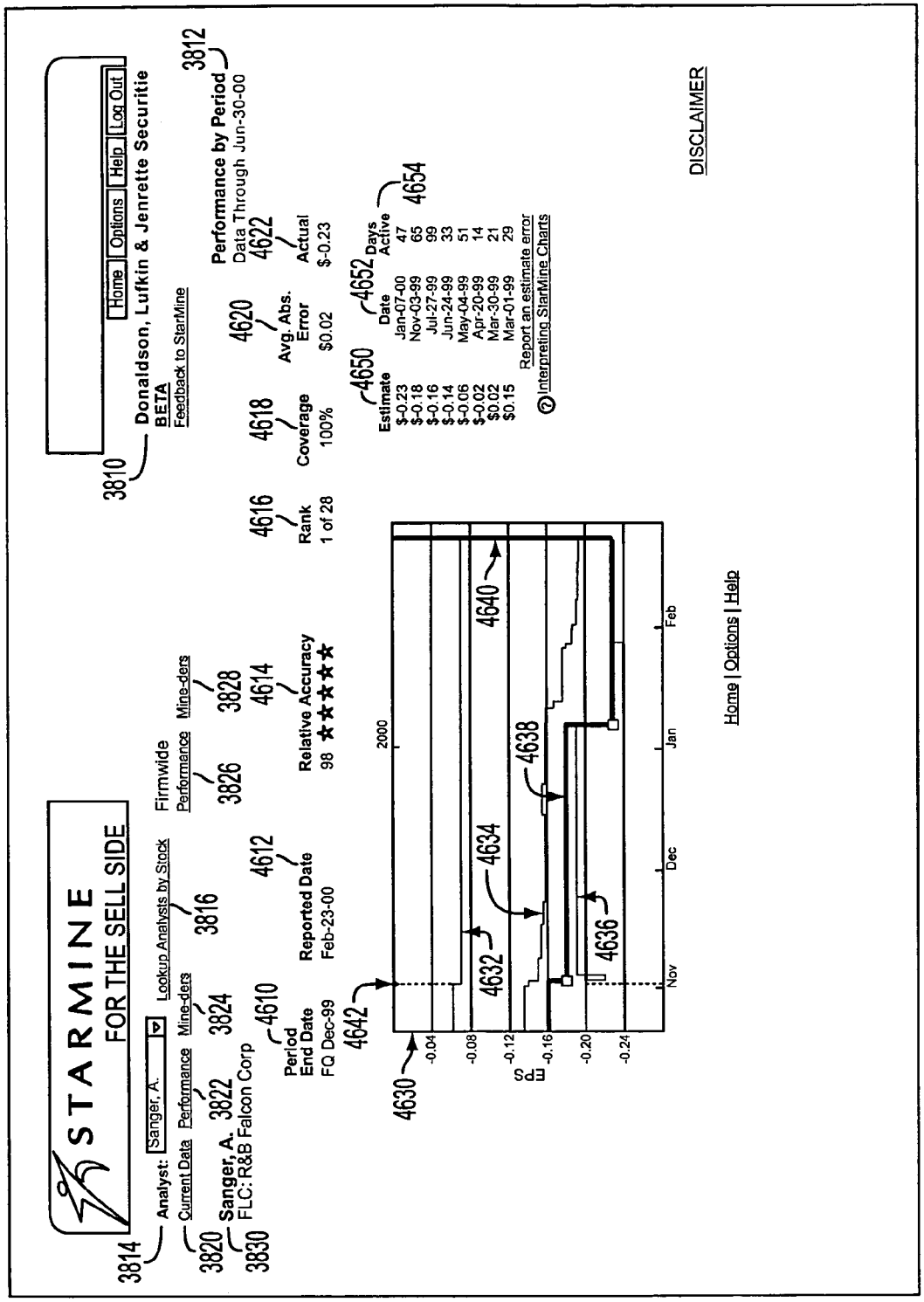
FIG. 37 is an example of detailed performance data for a selected period according to an embodiment of the present invention.

Detailed performance data of a selected period may be displayed in FIG. 37. For example, the period "December 1999" may be selected from FIG. 35 for a more detailed analysis of analyst Sanger's performance during this specific period for the stock "FLC", as shown in FIG. 37. Column 4610 displays the period end date. In this example, the period end date of "FQ December 1999". The reported date is shown in column 4612. The analyst's relative accuracy score and star rating for this period is displayed in column 4614. The analyst's rank is shown in column 4616. The percentage of coverage for the stock is shown in column 4618. The average absolute error is shown in column 4620 and the actual value is shown in column 4622. Chart 4630 graphically displays the analyst's performance in relation to the mean estimate and the high and low estimates as well as the actual value. For example, chart 4630 may display a high EPS estimate as shown by 4632, a low EPS estimate as shown by 4636, a IBES mean as shown by 4634, and the analyst's EPS estimate as shown by a 4638. Symbol 4642 marks the date of company's previous quarterly earnings. The dark vertical line 4640 indicates the actual reported EPS of the company being reviewed on the date reported. As shown in chart 4630, the analyst's estimate 4638 matches the actual reported earnings 4640. In addition, column 4650 presents detailed estimate information. The date for each estimate may be presented in column 4652 along with the number of days active in column 4654.

Performance data for all analysts of a firm or other entity may be displayed. This information may include analyst name (or other identifier), relative accuracy score (or other measure of accuracy), star rating, number of stocks followed and other information. This information may be displayed for various time periods, such as fiscal quarters and years. Firmwide performance data enables a user to analyze relative performance within a group, such as a firm. A relative accuracy score provides a more detailed measure of accuracy. For example, the top 20 analysts may be assigned a rating of 5 stars. However, within the 20 analysts, the relative accuracy scores range from 70 to 100. The number of stocks is another factor that may be considered in evaluating analyst performance. For example, an analyst with a higher number of stocks may be given more weight when considering the analyst's accuracy score and rating.

Figure 38A:
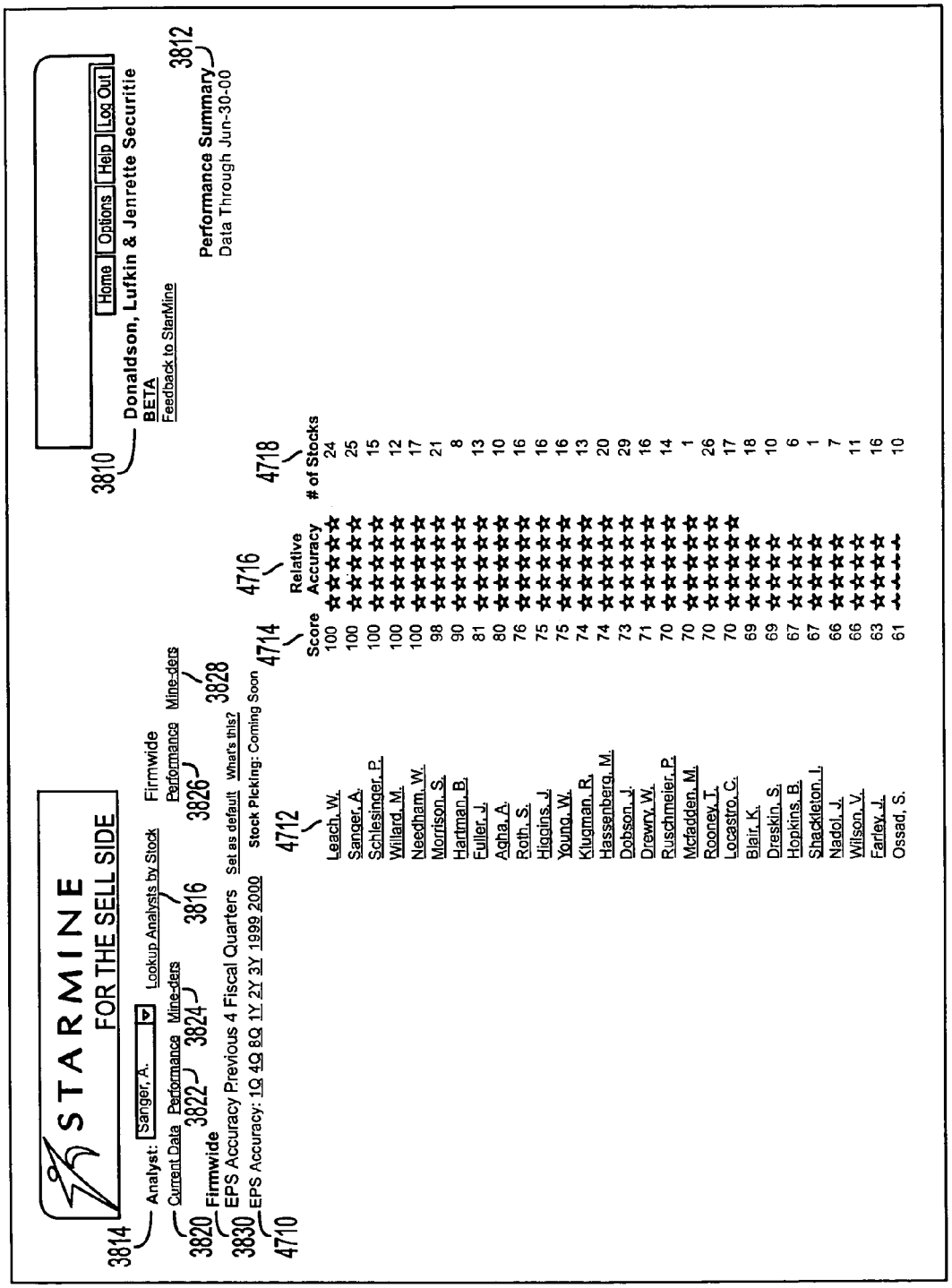

FIGS. 38a and 38b illustrate an example of performance data on a firmwide basis, according to an embodiment of the present invention. This view may be accessed by selecting Firmwide Performance at 3826. Section 4710 enables the user to select a desired period. In this example, the performance data is shown for the previous 4 fiscal quarters. Other periods may be selected, such as last quarter, last 8 quarters, last year, last 2 years, last 3 years, for the year 1999 and for the year 2000. Other periods may also be used. Also, the user may customize this view by setting defaults. For example, by selecting "Set As Default" 4720, the user may set a period as the default period where the default period will be shown when selecting "Firmwide Performance" in the future. This may be useful if the user generally wishes to view 1Y or 3Y summaries, for example, instead of the 4Q default. Column 4712 presents a list of all the analysts associated with the current firm listed in 3810. The score of each analyst may be shown in column 4714. The analyst's relative score may be shown as a star rating in column 4716. The number of stocks that are followed by each analyst may be displayed in column 4718. This enables a research director or other entity to manage and analyze the performance of each analyst. In this example, the analysts are ranked according to relative accuracy. Other views may be available.

According to another embodiment of the present invention, a user may lookup an analyst by entering a specific stock ticker. By selecting 3816, a user may enter a specific stock ticker at box 4810, as show in FIG. 39. In addition, by selecting 4812, the user may lookup a specific analyst.

Figure 40:
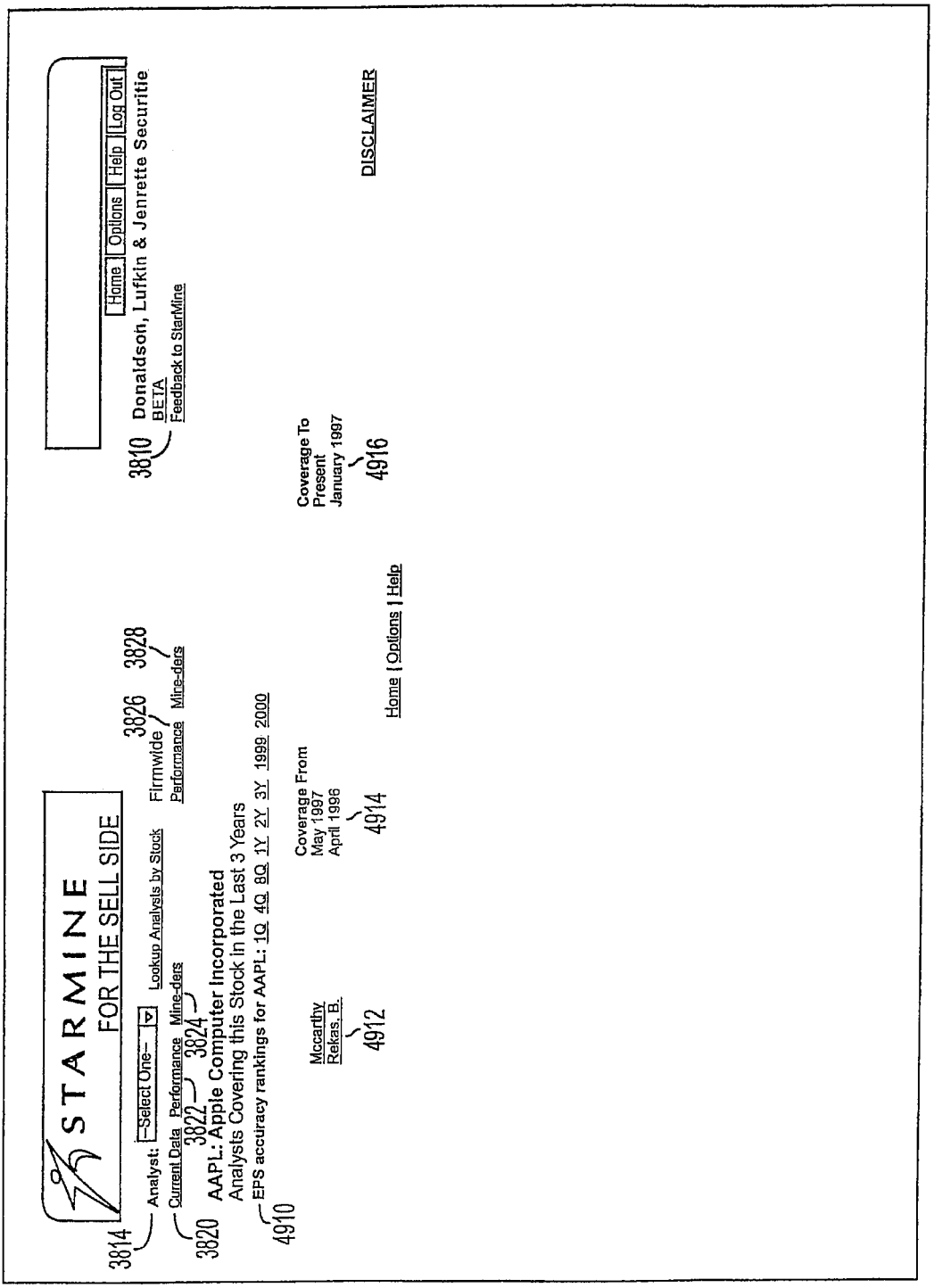
FIG. 40 is an example of a display of analysts of a firm with estimates for a selected stock according to an embodiment of the present invention.

FIG. 40 displays analysts from a specific firm or other entity that follow the specified stock ticker, according to an embodiment of the present invention. Column 4912 may display the analysts who follow the specified stock in the identified firm. A coverage begin date may be displayed under column 4914 and a coverage end date may be displayed in column 4916. An analyst's performance detail data may be viewed by selecting an analyst, similar to that described by way of example in FIG. 35.

Section 4910 enables the user to select a desired period to view analyst ranking for the specified ticker. A period may be selected, such as last quarter, last 4 quarters, last 8 quarters, last year, last 2 years, last 3 years, for the year 1999 and for the year 2000. Other periods may also be used. An analyst ranking by ticker may be displayed by selecting a desired period in section 4910, similar to that described by way of example in FIG. 34.

FIG. 41 illustrates an example of an option screen in accordance with an embodiment of the present invention. By selecting options bar 5010, the user may specify viewing options. In addition, the user may identify a preferred default view at startup, at 5012. For example, the user may select firmwide mine-ders as the default or analyst current view for a selected analyst. Other default view may be available. Also, data viewing options are available at 5014. For example, the user may exclude all inactive analysts. Other viewing options may be available. The user may then submit the options at selecting button 5016.

In some instances, an analyst may confirm previous estimates instead of modifying an estimate. This type of action may be defined as reiterations. According to an embodiment of the present invention, reiterations may be graphically displayed to indicate that the analyst has confirmed the previous estimates. This feature of the present invention may be used in determining whether an estimate is outdated, for example.

There may be instances where a chief analyst or other source may announce a market call or other predictions. Market calls may indicate price movement and other price trends. Market calls may not occur according to a periodic schedule, but rather market calls may be announced at various times during a fiscal period.

According to an embodiment of the present invention, enhanced composite estimates may be used to project and predict a company's earnings. Enhanced composite estimates may factor in the timeliness and historical accuracy of each analyst following a stock to predict company earnings. Other characteristics may also be considered. Traditionally, many investors use consensus estimates, which include the simple average of all analyst estimates. The consensus places equal weight on each analyst's estimate, regardless of the age of the estimate or whether the analyst is a seasoned veteran with a great track record or a rookie. Thus, the consensus fails to take into consideration varying factors and attributes of analysts and prior historical data. Enhanced composite estimates may be significantly more accurate because these calculations take into account the historical accuracy of analyst, the age of the estimates, the experience of the analyst, the issuing brokerage firm, and other factors. Enhanced composite estimates may also include sophisticated logic to detect a series of analyst revisions that may be indicative of future revisions. Enhanced composite estimates may assist investors identify stocks with high probabilities of earnings surprises and analyst revisions, which are major drivers of stock prices.

Figure 42:
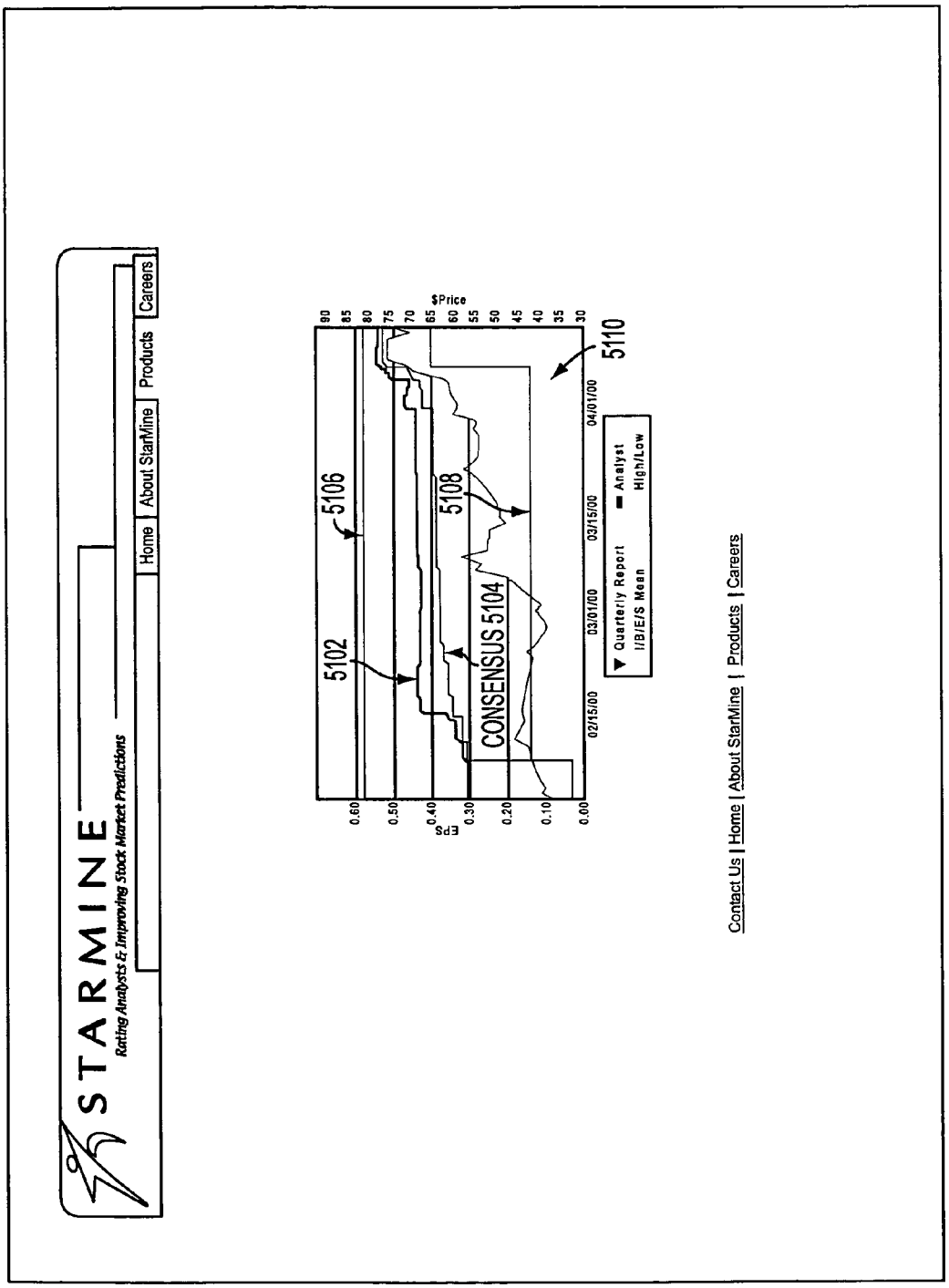
FIG. 42 is an illustration of an enhanced composite estimate as applied to a stock event according to an embodiment of the present invention.

FIG. 42 is an example of an illustration of an enhanced composite estimate as applied to a stock event according to an embodiment of the present invention. According to the present invention, the wider the variance between the enhanced composite estimates and the consensus, the more likely there will be further analyst revisions or an earnings surprise. In this example, the enhanced composite estimates, as shown by 5102, diverges sharply from the consensus, as shown by 5104, around the time period near Feb. 15, 2000. On that date, this stock was trading near $43 when the news was announced that the company would generate sequentially higher first quarter sales due to a strong demand for the company's products. Over the next day, 3 of the 17 analysts covering the stock revised their estimates upward, driving the enhanced composite estimate 21.5% ($0.076) higher than the consensus estimate for the current quarter. By the close of trading on Apr. 12, 2000, when the company announced a positive earnings "surprise," the stock was trading at $76. Investors who bought the stock when the enhanced composite estimate signal appeared would have gained almost $33 (77%) in about two months. As illustrated, enhanced composite estimates may serve as indicators of changes in the consensus and predictors of earnings surprises.

In addition, the enhanced composite estimates 5102 may be compared to other calculated or derived values, such as a high estimate 5106 and a low estimate 5108. Also, stock prices may be displayed simultaneously, as shown by 5110. Stock values and other indicators may be displayed along the right side of the display. Also, EPS values may be displayed on the left side of the display as well. This further provides the user with tools to compare and analyze analyst estimates.

According to another embodiment of the present invention, bold estimates made by analysts (or other sources) may be displayed. A bold estimate may be an estimate that deviates significantly from the consensus on a stock, stock sets, and/or other earnings events. For example, recent bold estimates made by one or more top performing analysts (e.g., five star analysts) may be highlighted by the present invention. In another example, the present invention may display bold estimates by five star (or top performing) analysts for each stock on a stock's Research Summary page.

As discussed above, relative accuracy scores measure the accuracy of each analyst's forecasts as compared against fellow analysts (or sources). For an analyst (or other source) to receive a high score, the analyst (or source) may make estimates that are both significantly different from and more accurate than other analysts' estimates. Top performing analysts (e.g., those that receive five stars) may have deviated from the consensus in the past and have been significantly more accurate than the other analysts. Generally, high-scoring analysts in the past are likely to continue to be high-scoring analysts. Thus, when a five star (or top performing) analyst makes a bold call, this often signals a major opportunity on the stock (or earnings event). Often five star analysts are the first to revise estimates. If other analysts follow these five star analysts, the consensus estimate may continue to move toward the five star analyst's estimate where the stock price often follows. In short, bold estimates by five star (or top performing) analysts may provide guidance to investors and others.

According to another embodiment of the present invention, portfolio returns for one or more analysts may be calculated. A portfolio return may measure how much investors would have made had they built a portfolio around some or all of the analyst's picks. For example, the portfolio return may be calculated based on investing $1000 in each "buy" recommendation, $1500 in each "strong buy" recommendation, and short selling $1000 in each "sell" recommendation. Other values may be assigned to other recommendations. The present invention may rebalance the portfolio at predetermined time intervals (e.g., at the end of every month) and/or on the date of any recommendation change (or other event). The present invention may measure the portfolio return of all or some stocks (or earnings events) an analyst (or source) covers and/or the returns for portfolios based on stocks within specific industries. The present invention may also calculate each analyst's profitability for single stocks and/or stock sets. This adjusted return may measure an analyst's ability to time when to buy and sell a specific stock and/or stock sets. The return may indicate how much investors would have made had they bought the stock when the analyst recommendation was "buy" and shorted the stock when the analyst recommendation was "sell". For example, the present invention may adjust the return to give bonus points for market outperformance while the recommendation was "strong buy" and the risk-free rate while the recommendation was "hold".

Figure 43:
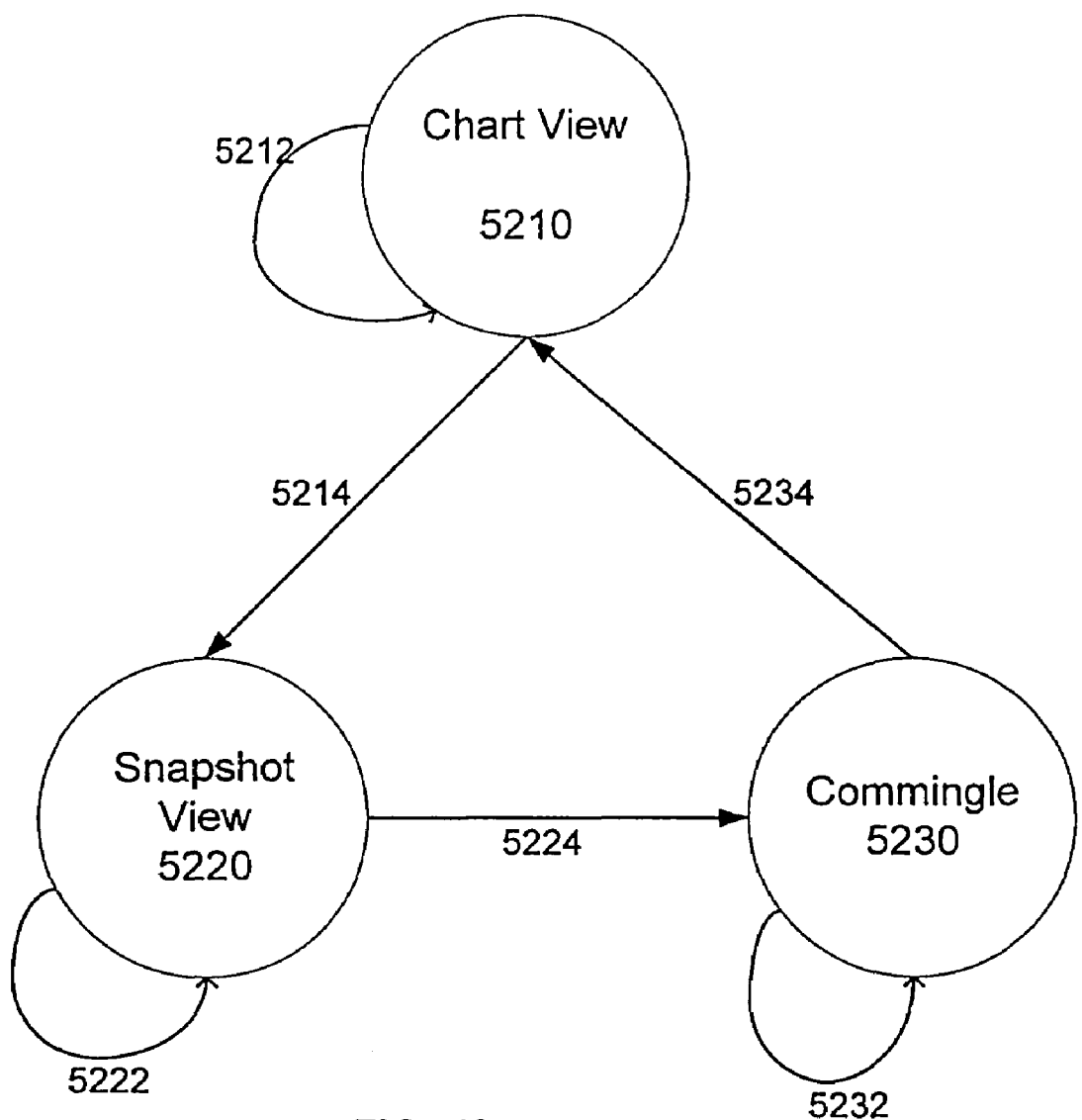
FIG. 43 is an example of a state diagram illustrating a commingling function, according to an embodiment of the present invention.

FIG. 43 is an example of a state diagram illustrating commingling of estimate and other data, according to an embodiment of the present invention. The present invention provides analysis, charting and modeling capabilities on detailed analyst, estimate and other data. Other viewing and analysis options may also be provided. The present invention may provide a comprehensive visual on an earnings event (e.g., stock), enabling the user to analyze historical as well as current data, on an analyst by analyst basis, for example. Other types of data may also be commingled and/or analyzed. For example, analyst estimates may be displayed as time series in a chart view, enabling the user to visualize and compare current and historical estimates of a source of estimate data (e.g., an individual analyst) to current and historical estimates of a calculated estimate (e.g., consensus), Smart-Estimates, user-defined models, other analysts, groups of analysts and/or other source(s). The chart view may provide a comprehensive look at estimate data for a particular earnings event. Comparisons to actual reported earnings and other calculated values may also be visualized and/or displayed simultaneously. In another example, a snapshot view may provide detailed data for each selected source of estimate for a particular point in time, which may be user defined. Categories of detailed data may include current data, historical data, performance data, model factor data, assigned weights and/or other estimate data. Further, the user may toggle between the chart and snapshot view to visualize (e.g., simultaneously view) and analyze various types of estimate data, analyst data and/or model performance data. Thus, the present invention provides (and/or simultaneously displays) detailed analyst-by-analyst estimate data (e.g., forecasts on stocks) alongside each analyst's objective track record and/or other performance data.

A user may access analyst, estimate and/or other types of data in various forms where data may be analyzed from different perspectives thereby gaining multiple levels and degrees of analysis and interpretation. A user may access a chart view, as illustrated by Chart View 5210. The Chart View may graphically represent historical data for earnings event as a time series of earnings estimates and revisions for each analyst selected, for a selected period of time, for a selected earnings event. Other information may also be graphically displayed, such as actual reported earnings data, calculated estimates, SmartEstimate results, model results, and other data. The Chart View may also graphically display price information for a selected earnings event.

Various internal transitions may occur within the Chart View 5210, as represented by 5212. For example, a user may select and de-select to display various sources, such as analysts, calculated values, models, and other sources for display in the Chart View. A user may specify various viewing options, such as different time periods, level of detail, etc. The Chart View may also display detailed data for a particular time period, such as an "As of Date" by which various calculations may be made. For example, the "As of Date" may be represented by a symbol (e.g., a vertical bar) which may select a particular date by enabling the user to move the symbol to a desired date. Thus, calculated summary and other information may be determined as of a selected date (e.g., "As of Date"), range of dates or other time period. Other information may also be displayed for the selected date(s) or time period.

Through Transition Link 5214, the user may view detailed estimate data in a SnapShot View, as represented by 5220. SnapShot View 5220 may provide details correlated and/or related to the data graphically displayed in Chart View 5210. For example, the SnapShot view may provide detailed estimate data as of the "As Of Date", which may be selected in the Chart View. For example, estimate data, such as current estimates, for each analyst may be displayed in the Snapshot View for a selected time frame, such as the "As of Date".

Various internal transitions may occur within the Snapshot View 5220, as illustrated by 5222. For example, a user may select a different viewing factors, such as a different earnings event, different event periods, time frames (e.g., "As of Date"), etc. A different user-defined model may also be selected for analysis and interpretation. Other internal transitions may also occur within Snapshot View 5220.

Transition link 5224 illustrates the user's ability to commingle various forms of analyst, estimate and other data based on various factors, which may include user-defined factors. The user may view and analyze various types of data, such as current data, historical data, performance data and model factors data. Other data may also be analyzed and viewed according to the present invention. For example, current data for an analyst (or source) for a selected event (e.g., earnings event) may include current estimate data, current estimate date, estimate age (e.g., number of days associated with the current estimate), and other current information. Historical data may include previous estimate data, previous estimate date, age of the estimate, change from the last estimate and other historical information. Performance data may include various forms of accuracy, estimate age, experience, broker information, and other performance metrics and data.

Users may use a modeling functionality of the present invention to build and backtest custom models for generating enhanced composite estimates for predicting earnings estimates and other events. Users may combine a variety of factors in the models and assign different weights and criteria for each factor. For example, factors may include estimate age, major revisions detection, analyst accuracy, analyst experience, brokerage firm and other factors that may be user-defined.

Model factors and weights may be displayed for each factor selected and assigned a weight by the user. Exclusions and other weighting information may also be displayed for analysis and comparison. The commingling feature of the present invention enables the user to compare various forms of data to make determinations and gain insight regarding estimates, analysts and/or other sources of data, future events, predictions, performance metrics, accuracy indicators, etc. Data may be displayed for other user-defined conditions.

Various internal transitions may occur within Commingling 5230, as illustrated by 5232. The user may alter values, weights and other criteria in determining important factors in the development and refining of a user-defined model. For further comparisons and analysis, the user may view and modify the data by accessing the chart and/or snapshot view, as discussed above.

Thus, the present invention may provide a method and system for simultaneously displaying accuracy indicators (e.g., ratings, etc.) and analyst estimates (e.g., earnings, revenue, target price, cash flow, etc.), on an analyst by analyst basis, for user selected analysts. Also, analyst recommendation data (e.g., buy/sell/hold) and performance indicators (e.g., stock picking track records) may also be commingled or simultaneously displayed, on an analyst by analyst basis. Other data may be commingled in accordance with the present invention.

The present invention provides a user with the ability to view various forms of data in different forms of display. The present invention further enables users to view, compare and analyze various types of data, such as current data, historical data, performance data, and/or model factor data. Other information may also be available. By enabling a user to compare and analyze various types of data under varying user-defined conditions, the user may perform improved analysis in making determinations, such as what factors are important in predicting future events (e.g., earnings events). The present invention enables users to make detailed comparisons and make informed decisions regarding earnings and other events.

Figure 44:
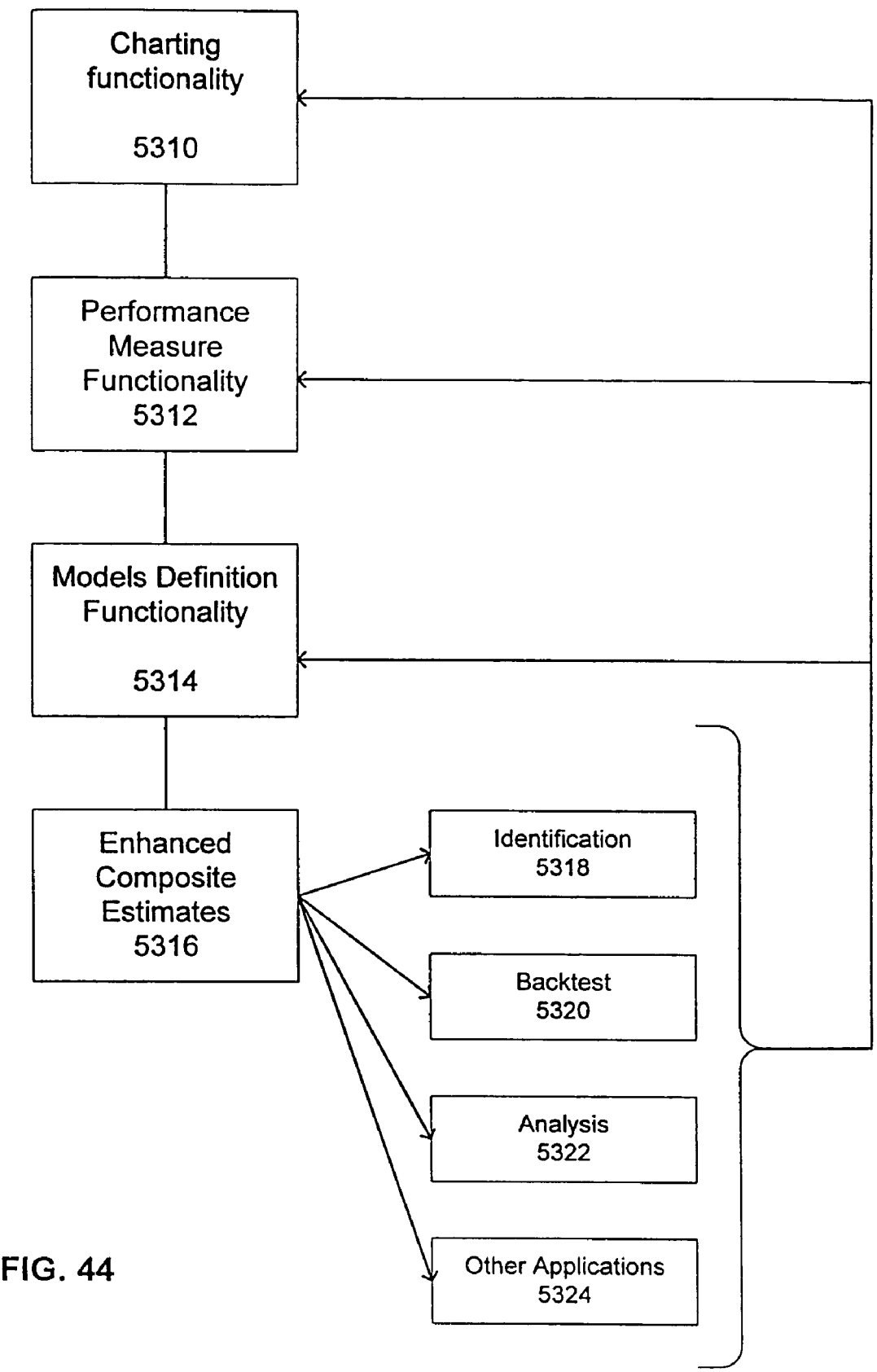
FIG. 44 is an example of an overview of various functions, according to an embodiment of the present invention.

FIG. 44 is an example of an overview of various functions of the present invention, according to an embodiment of the present invention. The present invention may provide various viewing and analysis functions, such as Charting functionality 5310, Performance measure functionality 5312, Model definition functionality 5314, Enhanced Composite Predictions generating functionality 5316 and various applications which may include one or more of Analysis 5318, Backtest 5320, Identify 5322, and other applications 5324. Other functions may be incorporated in accordance with the present invention. Each function may interact with the other functions for detailed analysis and viewing options.

For example, the present invention may enable a user to simultaneously view analyst track records (and/or other performance data) alongside each estimate. The present invention further enables the user to simultaneously view each of the factors (or selected factors) that are involved in computing an enhanced composite prediction (e.g., SmartEstimate), such as accuracy rating, experience of the analysts covering a stock, reputation of the analyst's association (e.g., broker) and other factors. Also, user defined and other weights assigned to each factor may be displayed. Unlike a "black box" model, the present invention provides a "clear box" model, giving the user direct and enhanced insight into the how and why of the components of an enhanced composite prediction (e.g., SmartEstimate).

As shown in FIG. 44, Charting functionality 5310 may provide a Chart view, a Snapshot view, commingling of various types and forms of data and other charting and/or analysis functions. The present invention may display analyst (or source) estimates as time series, enabling the user to visualize and compare one or more selected analyst's (or source's) current and historic estimates to those of the consensus (or other calculated measure), enhanced composite predictions (e.g, SmartEstimates), other analysts and/or sources. The chart may reveal at a glance a comprehensive picture on one or more earnings events (e.g., stock). The user may specify viewing options, such as time frame, level of detail and other preferences.

Performance measure functionality 5312 enables a user to measure and/or view the performance of analysts (or sources) based on criteria defined (or selected) by the user, such as the time period being measured and the forecast horizon of analyst estimates. The user may further sort the relative ratings of analysts following a given earnings event (e.g., stock) to generate rankings, or view an analyst's (or source's) overall performance on one or more earnings events (e.g., stocks) followed. For example, performance data may involve accuracy data of an analyst's estimates in terms of earnings estimate accuracy score (e.g., RAS) and/or rating data and the accuracy of the analyst's estimates ranked with those of other analysts, for one or more selected events. In addition, analyst recommendation data and performance data may be displayed. For example, information regarding a selected analyst's stock picking and earnings estimates accuracy for a particular event for selected time periods may be displayed. Other viewing options may be available.

Models definition functionality 5314 enables users to define and build custom models for generating enhanced composite predictions, which may include forecasts for earnings events. Users may combine a variety of factors in models and assign different weights and criteria for each factor. Performance data (e.g., analyst track record data) may be leveraged to generate models for providing profitable market predictors (e.g., predictions of earnings that may be more accurate than the consensus or other calculated estimates). For example, performance data generated by 5312 may enable users to generate better forecasts by placing more weight on individual analysts with certain performance data, e.g., superior track record, accuracy, recency of estimates, etc.

By applying a user-defined model to historical and/or current estimate data, a user may view and analyze enhanced composite predictions, as made available by 5316. Enhanced composite predictions may be considered more accurate in predicting future earnings events because the user may place greater weight on factors that contribute to better earnings forecasts. Factors may include one or more of the historical accuracy of each analyst, the age of the estimate, timeliness, the experience of the analyst, the issuing brokerage firm and other factors. Enhanced composite predictions may further include sophisticated logic to detect a series of analyst revisions that may be indicative of future revisions and/or other future events. The enhanced composite predictions may be indicators of changes in the consensus and predictors of earning surprises.

Applications for enhanced composite predictions (e.g., SmartEstimates) may include, among others, Identification 5318, Backtest 5320, Analysis 5322, and other applications 5324. Results of the applications may be reapplied and refined through the various functionalities available through the present invention.

Identification of earnings events may be available to the user, as illustrated by 5318. Enhanced composite predictions (e.g., SmartEstimates) may assist users (e.g., investors, researchers, etc.) to identify earnings events (e.g., stocks) with high probabilities of earnings and other major drivers of stock prices. For example, stocks with positive surprises tend to have above-average relative stock performance and stocks with negative surprises tend to underperform the market. The present invention may highlight, indicate or enable a user to identify a selection of positive and negative surprise candidates on a periodic or other basis. Thus, a user may use enhanced composite predictions to generate investment ideas and assist in timing trades of stocks. For example, when an enhanced composite estimate deviates significantly (e.g., a predetermined amount) from the consensus (or other calculated measure), this deviation may indicate one or more of a surprise, further analyst revisions or other earnings related event. Thus, the present invention may enable users to identify and backtest relevant and/or important factors in creating improved earnings estimates.

In addition, the user may backtest the user-defined model through 5320. Enhanced composite predictions may be applied to historical estimate data for viability and accuracy. For example, the backtesting capability may enable the user to measure the performance (e.g., accuracy) of one or more models by viewing, analyzing and refining the factors, weights and other features of the backtest function against historical data where actual earnings may be compared to the resulting enhanced composite predictions for defined time periods.

Analysis and/or revisions may be available through Analysis 5322. Enhanced composite predictions may be applied to various forms of data, which may be defined by the user. Enhanced composite predictions may provide users with insight into future earnings predictions. Results of a user-defined module may be further analyzed through the charting functionalities and other graphic tools, including the chart and snapshot views, among others. A detailed analysis of the various types of data, including estimate current data, historical data, performance data, factors and/or factor weights may be viewed and analyzed for further revisions.

The present invention may be used to quantify how accurate and timely each analyst (or source) is relative to other analysts (or sources) covering an earnings event. Enhanced composite predictions may enable users to place more weight on certain factors, such as timely estimates, from the more accurate analysts (or sources). Enhanced composite predictions may take into consideration recent revision clusters, brokerage firms issuing each estimate, the experience of each analyst (or source) and other factors. In addition, enhanced composite predictions may be re-calculated on a periodic or other basis.

The present invention further enables modification, reiterations, and other views to be accessed through various functions available to the user, which may include Charting Functionality 5310, Performance Measure Functionality 5312, Models Definition Functionality 5314 and/or other functions, as discussed above. Thus, results may be refined and reapplied to other user defined variables. The present invention provides a useful analysis and viewing tool to analysts and other users.

Other embodiments and uses of the invention will be apparent to those skilled in the art from consideration of the specification and practice of the invention disclosed herein. Accordingly, the specification and examples set forth above should be considered exemplary only. The scope of the invention is only limited by the claims appended hereto.

What is claimed is:

1. A computer-implemented method for displaying information relating to one or more analysts' estimates for one or more future events, comprising:

retrieving, from a database operatively connected to a computer, information relating to one or more analysts' historical estimates for one or more historical events, and information relating to the one or more analysts' current estimates for one or more future events;

determining, by the computer, an indication of historical accuracy for the one or more analysts based, in part, on the information relating to the one or more analysts' historical estimates for the one or more historical events;

receiving a selection of a security from a user via a graphical user interface in communication with the computer; and displaying simultaneously, on a display device operatively connected to the computer, for the user-selected security, on an analyst by analyst basis, only for analysts from among the one or more analysts that have a current estimate for the user-selected security, and whose historical accuracy satisfies a predetermined threshold:
  i) an indication of historical accuracy for an analyst; and
  ii) the analyst's current estimate for a future event for the user-selected security.

2. A computer-implemented method for displaying information relating to one or more analysts' estimates for one or more future events, comprising:

retrieving, from a database operatively connected to a computer, information relating to one or more analysts' historical estimates for one or more historical events, and information relating to the one or more analysts' current estimates for one or more future events;

determining, by the computer, an indication of historical accuracy for the one or more analysts based, in part, on the information relating to the one or more analysts' historical estimates for the one or more historical events;

receiving a selection of a security from a user via a graphical user interface in communication with the computer; and displaying simultaneously, on a display device operatively connected to the computer, for the user-selected security, on an analyst by analyst basis, only for analysts from among the one or more analysts whose historical accuracy for the user-selected security satisfies a predetermined threshold:
  i) an indication of historical accuracy for an analyst; and
  ii) the analyst's current estimate for a future event for the user-selected security.

3. A computer-implemented method for displaying information relating to one or more analysts' estimates for one or more future events, comprising:

retrieving, from a database operatively connected to a computer, information relating to one or more analysts' historical estimates for one or more historical events, and information relating to the one or more analysts' current estimates for one or more future events;

determining, by the computer, an indication of historical accuracy for the one or more analysts based, in part, on the information relating to the one or more analysts' historical estimates for the one or more historical events;

receiving a selection of a security and one or more of the analysts from a user via a graphical user interface in communication with the computer; and displaying simultaneously, on a display device operatively connected to the computer, for the user-selected security, on an analyst by analyst basis, for the user-selected analysts:
  i) an indication of historical accuracy for an analyst and
  ii) the analyst's current estimate for a future event for the user-selected security.

4. A computer-implemented method for displaying information relating to one or more analysts' estimates for one or more future events, comprising:

retrieving, from a database operatively connected to a computer, information relating to a plurality of analysts' historical estimates for one or more historical events, and information relating to the plurality of analysts' current estimates for one or more future events;

determining, by the computer, information relating to a consensus estimate for the one or more future events, wherein the consensus estimate is determined from the plurality of analysts' current estimates for the one or more future events;

determining, by the computer, an indication of historical accuracy for the plurality of analysts based, in part, on the information relating to the plurality of analysts' historical estimates for the one or more historical events;

receiving a selection of one or more of the plurality of analysts from a user via a graphical user interface in communication with the computer; and displaying simultaneously, on a display device operatively connected to the computer, on an analyst by analyst basis, for the user-selected analysts:
  i) an indication of historical accuracy for an analyst;
  ii) the analyst's current estimate for a future event; and
  iii) a graphical indication of whether the analyst's current estimate for the future event is above or below the consensus estimate for the future event.

5. The method of claim 4, wherein the estimates include at least quarterly or fiscal earnings estimates.

6. The method of claim 4, wherein the estimates include at least revenue projections.

7. The method of claim 4, wherein the estimates include at least a security's target price.

8. The method of claim 4, wherein the estimates include at least cash flow projections.

9. The method of claim 4, wherein the estimates include at least financial predictions.

10. The method of claim 4, wherein the indication of historical accuracy for an analyst is for one or more securities, and the analyst's estimate for a future event is for one or more securities.

11. The method of claim 10, wherein the one or more securities include a set of securities in an industry.

12. The method of claim 10, wherein the one or more securities include a set of securities in a sector.

13. The method of claim 10, wherein the one or more securities include a set of securities followed by an analyst.

14. The method of claim 10, wherein the one or more securities include a set of securities followed by a brokerage firm with which an analyst is associated.

15. The method of claim 10, wherein the one or more securities include one or more user-selected sets of securities.

16. The method of claim 15, further comprising saving one or more user-selected sets of securities and reusing one or more user-selected sets of securities.

17. The method of claim 4, wherein the indication of historical accuracy comprises a performance rating.

18. The method of claim 4, wherein the indication of historical accuracy comprises a performance rating based on one or more performance metrics.

19. The method of claim 4, wherein the indication of historical accuracy comprises a performance rating based on one or more performance metrics, and the rating comprises a scale of integers from 1-N.

20. The method of claim 19, wherein N=5.

21. The method of claim 4, wherein the indication of historical accuracy comprises a relative accuracy score, comparing an analyst's accuracy relative to the accuracy of other analysts.

22. The method of claim 4, wherein the indication of historical accuracy comprises an accuracy measurement based on a performance metric aggregated over a user-selected number of quarters or fiscal periods.

23. A computer-implemented method for displaying information relating to one or more analysts' estimates for one or more future events, comprising:
- retrieving, from a database operatively connected to a computer, information relating to a plurality of analysts' historical estimates for one or more historical events, and information relating to the plurality of analysts' current estimates for one or more future events;
- determining, by the computer, information relating to a consensus estimate for the one or more future events, wherein the consensus estimate is determined from the plurality of analysts' current estimates for the one or more future events;
- determining, by the computer, an indication of historical accuracy for the plurality of analysts based) in part, on the information relating to the plurality of analysts' historical estimates for the one or more historical events;
- receiving a selection of one or more of the plurality of analysts from a user via a graphical user interface in communication with the computer; and
- displaying simultaneously, on a display device operatively connected to the computer, on an analyst by analyst basis, for the user-selected analysts:
  i) an indication of historical accuracy for an analyst;
  ii) the analyst's current estimate for a future event; and
  iii) a graphical indication of whether the analyst' s current estimate for the future event is above or below the consensus estimate for the future event and a difference between the analyst's current estimate for the future event and the consensus estimate for the future event.

24. A computer-implemented method for displaying information relating to one or more analysts' estimates for one or more future events, comprising:
- retrieving, from a database operatively connected to a computer, information relating to a plurality of analysts' historical estimates for one or more historical events, and information relating to the plurality of analysts' current estimates for one or more future events;
- determining, by the computer, information relating to a consensus estimate for the one or more future events, wherein the consensus estimate is determined from the plurality of analysts' current estimates for the one or more future events;
- determining, by the computer, an indication of historical accuracy for the plurality of analysts based, in part, on the information relating to the plurality of analysts' historical estimates for the one or more historical events;
- receiving a selection of one or more of the plurality of analysts from a user via a graphical user interface in communication with the computer; and
- displaying simultaneously, on a display device operatively connected to the computer, on an analyst by analyst basis, for the user-selected analysts:
  i) an indication of historical accuracy for an analyst;
  ii) the analyst's current estimate for a future event; and
  iii) a graphical indication of whether the analyst's current estimate for the future event is above or below the consensus estimate for the future event by a predetermined amount.

25. A computer-implemented method for displaying information relating to one or more analysts' estimates for one or more future events, comprising:
- retrieving, from a database operatively connected to a computer, information relating to a plurality of analysts' historical estimates for one or more historical events, and information relating to the plurality of analysts' current estimates for one or more future events;
- determining, by the computer, information relating to a consensus estimate for the one or more future events, wherein the consensus estimate is determined from the plurality of analysts' current estimates for the one or more future events;
- determining, by the computer, an indication of historical accuracy for the plurality of analysts based, in part, on the information relating to the plurality of analysts' historical estimates for the one or more historical events;
- receiving a selection of one or more of the plurality of analysts from a user via a graphical user interface in communication with the computer; and
- displaying simultaneously, on a display device operatively connected to the computer, on an analyst by analyst basis, for the user-selected analysts whose historical accuracy satisfies a predetermined threshold:
  i) an indication of historical accuracy for an analyst;
  ii) the analyst's current estimate for a future event; and
  iii) a graphical indication of whether the analyst's current estimate for the future event is above or below the consensus estimate for the future event by a predetermined amount.

26. A computer-implemented method for displaying information relating to one or more analysts' estimates for one or more future events, comprising:
- retrieving, from a database operatively connected to a computer, information relating to a plurality of analysts' historical estimates for one or more historical events, and information relating to the plurality of analysts' current estimates for one or more future events;
- determining, by the computer, information relating to a consensus estimate for the one or more future events, wherein the consensus estimate is determined from the plurality of analysts' current estimates for the one or more future events;
- determining, by the computer, an indication of historical accuracy for the plurality of analysts based, in part, on the information relating to the plurality of analysts' historical estimates for the one or more historical events;
- receiving a selection of one or more of the plurality of analysts from a user via a graphical user interface in communication with the computer;
- determining, by the computer, one or more of the user-selected analysts whose historical accuracy satisfies a predetermined threshold; and
- displaying simultaneously, on a display device operatively connected to the computer, on an analyst by analyst basis, for the one or more user-selected analysts whose historical accuracy satisfies the predetermined threshold:
  i) an indication of historical accuracy for an analyst;
  ii) the analyst's current estimate for a future event; and
  iii) a graphical indication of whether the analyst's current estimate for the future event is above or below the consensus estimate for the future event by a predetermined amount and a difference between the analyst's current estimate for the future event and the consensus estimate for the future event.

27. The method of claim 26, wherein an analyst is included in the group of the one or more analysts if the analyst's historical accuracy for a selected security satisfies a predetermined threshold.

28. The method of claim 26, wherein an analyst is included in the group of the one or more analysts if the analyst's historical accuracy for a selected sector satisfies a predetermined threshold.

29. The method of claim 26, wherein an analyst is included in the group of the one or more analysts if the analyst's historical accuracy for a selected industry satisfies a predetermined threshold.

30. The method of claim 26, wherein an analyst is included in the group of the one or more analysts if the analyst's historical accuracy for all securities for which the analyst has issued estimates satisfies a predetermined threshold.

31. The method of claim 26, wherein an analyst is included in the group of the one or more analysts if the analyst's historical accuracy for a user-selected group of securities satisfies a predetermined threshold.

32. A computer-implemented method for displaying information relating to one or more analysts' estimates one or more future events, comprising:

retrieving, from a database operatively connected to a computer, information relating to one or more analysts' historical estimates for one or more historical events, and information relating to the one or more analysts' current estimates for one or more future events;

determining, by the computer, an indication of historical accuracy for the one or more analysts based, in part, on the information relating to the one or more analysts' historical estimates for the one or more historical events;

determining, by the computer, a rating for the one or more analysts based, in part, on the historical accuracy determined for the one or more analysts;

receiving a selection of one or more of the analysts from a user via a graphical user interface in communication with the computer; and displaying simultaneously, on a display device operatively connected to the computer, on an analyst by analyst basis, for the user-selected analysts:
  i) an indication of historical accuracy for an analyst for one or more securities; and
  ii) the analyst's current estimate for a future event for the one or more securities, wherein the user-selected analysts are displayed in an order based on the rating determined for the user-selected analysts.

33. A computer-implemented method of displaying information relating to one or more analysts' recommendations for an action with respect to at least one security, comprising:

retrieving, from a database operatively connected to a computer, information relating to a plurality of analysts' historical recommendations for an action with respect to one or more securities, and information relating to the plurality of analysts' current recommendations for an action with respect to one or more securities;

determining, by the computer, a numerical, value associated with a consensus recommendation for the one or more securities, wherein the numerical value associated with the consensus recommendation is determined from the plurality of analysts' current recommendations with respect to the one or more securities;

determining, by the computer, an indication of historical performance for the plurality of analysts based, in part, on the information relating to the plurality of analysts' historical recommendations with respect to the one or more securities;

receiving a selection of one or more of the plurality of analysts from a user via a graphical user interface in communication with the computer;

determining, by the computer, a numerical value associated with the one or more user-selected analysts' current recommendations with respect to at least one security; and displaying simultaneously, on a display device operatively connected to the computer, on an analyst by analyst basis, for the user-selected analysts:
  i) an indication of historical performance for an analyst;
  ii) the analysts' current recommendation with respect to the at least one security; and
  iii) a graphical indication of whether the numerical value associated with the analyst's current recommendation with respect to the at least one security is above or below the numerical value associated with the consensus recommendation for the at least one security.

34. A computer-implemented method of displaying information relating to one or more analysts' recommendations for an action with respect to at least one security, comprising:

retrieving, from a database operatively connected to a computer, information relating to a plurality of analysts' historical recommendations for an action with respect to one or more securities; and information relating to the plurality of analysts' current recommendations for an action with respect to one or more securities;

determining, by the computer, a numerical value associated with a consensus recommendation for the one or more securities, wherein the numerical value associated with the consensus recommendation is determined from the plurality of analysts' current recommendations with respect to the one or more securities;

determining, by the computer, an indication of historical performance for the plurality of analysts based, in part, on the information relating to the plurality of analysts' historical recommendations with respect to the one or more securities;

receiving a selection of one or more of the plurality of analysts from a user via a graphical user interface in communication with the computer;

determining, by the computer, a numerical value associated with the one or more user-selected analysts' current recommendations with respect to at least one security;

displaying simultaneously, on a display device operatively connected to the computer, on an analyst by analyst basis, for the user-selected analysts:
  i) an indication of historical performance for an analyst;
  ii) a current recommendation of the analyst for an action with respect to the at least one security; and
  iii) a graphical indication of whether the numerical value associated with the analyst's current recommendation with respect to the at least one security is above or below the numerical value associated with the consensus recommendation for the at least one security, and a difference between the numerical value associated with the analyst's current recommendation and the numerical value associated with the consensus recommendation.

35. A computer-implemented method of displaying information relating to one or more analysts' recommendations for an action with respect to at least one security, comprising:

retrieving, from a database operatively connected to a computer, information relating to a plurality of analysts' historical recommendations for an action with respect to one or more securities, and information relating to the plurality of analysts' current recommendations for an action with respect to one or more securities;

determining, by the computer, a numerical value associated with a consensus recommendation for the one or more securities, wherein the numerical value associated with the consensus recommendation is determined from the plurality of analysts' current recommendations with respect to the one or more securities;

determining, by the computer, an indication of historical performance for the plurality of analysts based, in part, on the information relating to the plurality of analysts' historical recommendations with respect to the one or more securities;

receiving a selection of one or more of the plurality of analysts from a user via a graphical user interface in communication with the computer;

determining, by the computer, a numerical value associated with the one or more user-selected analysts' current recommendations with respect to at least one security; and displaying simultaneously, on a display device operatively connected to the computer, on an analyst by analyst basis, for the user-selected analysts:
  i) an indication of historical performance for an analyst;
  ii) the analysts' current recommendation with respect to the at least one security; and
  iii) a graphical indication of whether the numerical value associated with the analyst's current recommendation with respect to the at least one security exceeds the numerical value associated with the consensus recommendation for the at least one security by a predetermined amount, or is below the numerical value associated with the consensus recommendation by a predetermined amount.

36. A computer-implemented method of displaying information relating to one or more analysts' recommendations for an action with respect to at least one security, comprising:

retrieving, from a database operatively connected to a computer, information relating to a plurality of analysts' historical recommendations for an action with respect to one or more securities, and information relating to the plurality of analysts' current recommendations for an action with respect to one or more securities;

determining, by the computer, a numerical value associated with a consensus recommendation for the one or more securities, wherein the numerical value associated with the consensus recommendation is determined from the plurality of analysts' current recommendations with respect to the one or more securities;

determining, by the computer, an indication of historical performance for the plurality of analysts based, in part, on the information relating to the plurality of analysts' historical recommendations with respect to the one or more securities;

receiving a selection of one or more of the plurality of analysts from a user via a graphical user interface in communication with the computer;

determining, by the computer, a numerical value associated with the one or more user-selected analysts' current recommendations with respect to at least one security;

determining, by the computer, one or more of the user-selected analysts whose historical performance satisfies a predetermined threshold; and displaying simultaneously, on a display device operatively connected to the computer, on an analyst by analyst basis, for the one or more user-selected analysts whose historical performance satisfies the predetermined threshold:
  i) an indication of historical performance for an analyst based on selected criteria;
  ii) the analysts' current recommendation with respect to the at least one security; and
  iii) a graphical indication of whether the numerical value associated with the Analyst's current recommendation with respect to the at least one security exceeds the numerical value associated with the consensus recommendation for the at least one security by a predetermined amount, or is below the numerical value associated with the consensus recommendation by a predetermined amount.

37. A computer-implemented method of displaying information relating to one or more analysts' recommendations for an action with respect to at least one security, comprising:

retrieving, from a database operatively connected to a computer, information relating to a plurality of analysts' historical recommendations for an action with respect to one or more securities, and information relating to the plurality of analysts' current recommendations for an action with respect to one or more securities;

determining, by the computer, a numerical value associated with a consensus recommendation for the one or more securities, wherein the numerical value associated with the consensus recommendation is determined from the plurality of analysts' current recommendations with respect to the one or more securities;

determining, by the computer, an indication of historical performance for the plurality of analysts based, in part, on the information relating to the plurality of analysts' historical recommendations respect to the one or more securities;

receiving a selection of one or more of the plurality of analysts from a user via a graphical user interface in communication with the computer;

determining, b the computer, a numerical value associated with the one or more user-selected analysts' current recommendations with respect to at least one security; and determining, by the computer, one or more of the user-selected analysts whose historical performance satisfies a predetermined threshold; and displaying simultaneously, on a display device operatively connected to the computer, on an analyst by analyst basis, for the one or more user-selected analysts whose historical performance satisfies the predetermined threshold:
  i) an indication of historical performance for an analyst;
  ii) the analysts' current recommendation with respect to the at least one security; and
  iii) a graphical indication of whether numerical value associated with the analyst's current recommendation with respect to the at least one security exceeds the numerical value associated with the consensus recommendation for the at least one security by a predetermined amount or is below the numerical value associated with the consensus recommendation by a predetermined amount and a difference between the numerical value associated with the analyst's current recommendation and the numerical value associated with the consensus recommendation.

38. The method of claim 37, wherein an analyst is included in the group of the one or more analysts if the analyst's historical performance for the at least one security satisfies a predetermined threshold.

39. The method of claim 37, wherein an analyst is included in the group of the one or more analysts if the analyst's historical performance for a selected sector satisfies a predetermined threshold.

40. The method of claim 37, wherein an analyst is included in the group of the one or more analysts if the analyst's historical performance for a selected industry satisfies a predetermined threshold.

41. The method of claim 37, wherein an analyst is included in the group of the one or more analysts if the analyst's historical performance for all securities for which the analyst has issued recommendations satisfies a predetermined threshold.

42. The method of claim 37, wherein an analyst is included in the group of the one or more analysts if the analyst's historical performance for a user-selected group of securities satisfies a predetermined threshold.

43. A computer-implemented method for displaying information relating to security analysts' estimates, the method comprising:
- retrieving, from a database operatively connected to a computer, information relating to one or more analysts' historical estimates for one or more historical events, and information relating to the one or more analysts' estimates for one or more future events;
- determining, by the computer, an indication of historical accuracy for the one or more analysts based, in part, on the information relating to the one or more analysts' historical estimates for the one or more historical events;
- receiving a selection of one or more of the analysts from a user via a graphical user interface in communication with the computer;
- applying, by the computer, an aggregation prediction model to the one or more user-selected analysts' estimates for the one or more future events, wherein the aggregation prediction model includes one or more exclusion factors that specify criteria for excluding estimates from use in the aggregation prediction model; and
- displaying simultaneously, on a display device operatively connected to the computer, on an analyst by analyst basis, for the user-selected analysts:
  - i) an indication of historical accuracy for an analyst for one or more securities;
  - ii) the analyst's estimate for a future event for the one or more securities; and
  - iii) a graphical indication of whether the exclusion factors resulted in the analyst's estimate for the future event being excluded from use in the aggregation prediction model.

44. A computer-implemented method for displaying information relating to security analysts' estimates, the method comprising:
- retrieving, from a database operatively connected to a computer, information relating to one or more analysts' historical estimates for one or more historical events, and information relating to the one or more analysts' estimates for one or more future events;
- determining, by the computer, an indication of historical accuracy for the one or more analysts based, in part, on the information relating to the one or more analysts' historical estimates for the one or more historical events;
- receiving a selection of one or more of the analysts from a user via a graphical user interface in communication with the computer;
- applying, by the computer, an aggregation prediction model to the one or more user-selected analysts' estimates for the one or more future events, wherein the aggregation prediction model includes one or more exclusion factors that specify criteria for excluding estimates from use in the aggregation prediction model; and
- displaying simultaneously, on a display device operatively connected to the computer, on an analyst by analyst basis, for the user-selected analysts:
  - i) an indication of historical accuracy for an analyst for one or more securities;
  - ii) the analyst's estimate for a future event for the one or more securities; and
  - iii) a graphical indication of whether the exclusion factors resulted in the analyst's estimate for the future event being excluded from use in the aggregation prediction model and an indication of the criteria that resulted in the analyst's estimate for the future event being excluded from use in the aggregation prediction model if the analyst's estimate is excluded from use in the aggregation prediction model.

45. A computer-implemented method for displaying information relating to security analysts' estimates, the method comprising:
- retrieving, from a database operatively connected to a computer, information relating to one or more analysts' historical estimates for one or more historical events, and information relating to the one or more analysts' estimates for one or more future events;
- determining, by the computer, an indication of historical accuracy for the one or more analysts based, in part, on the information relating to the one or more analysts' historical estimates for the one or more historical events;
- receiving a selection of one or more of the analysts from a user via a graphical user interface in communication with the computer;
- applying, by the computer, an aggregation prediction model to the one or more user-selected analysts' estimates for the one or more future events, wherein the aggregation prediction model includes one or more weighting factors that specify criteria for applying a weight to one or more estimates used in the aggregation prediction model; and
- displaying simultaneously, on a display device operatively connected to the computer, on an analyst by analyst basis, for the user-selected analysts:
  - i) an indication of historical accuracy for an analyst for one or more securities;
  - ii) the analyst's estimate for a future event for the one or more securities; and
  - iii) a graphical indication of the weight applied to the analyst's estimate for the future event in the aggregation prediction model.

* * * * *